US011759046B2

(12) United States Patent
Benedetti et al.

(10) Patent No.: US 11,759,046 B2
(45) Date of Patent: Sep. 19, 2023

(54) USED CAPSULE DISPOSAL ASSEMBLY

(71) Applicant: ILLYCAFFE' S.p.A., Trieste (IT)

(72) Inventors: Alessandro Benedetti, Trieste (IT); Lucius Theodorus Vinkenvleugel, Borne (NL); Hermen Hendrik Pijlman, Enschede (NL); Andreas Jacobus Louis Nijsen, Enschede (NL); Marco Alexander Voogsgerd, Enschede (NL)

(73) Assignee: ILLYCAFFE' S.P.A., Trieste (IT)

( * ) Notice: Subject to any disclaimer, the term of this patent is extended or adjusted under 35 U.S.C. 154(b) by 453 days.

(21) Appl. No.: 16/982,227

(22) PCT Filed: Mar. 29, 2019

(86) PCT No.: PCT/IB2019/052607
§ 371 (c)(1),
(2) Date: Sep. 18, 2020

(87) PCT Pub. No.: WO2019/186492
PCT Pub. Date: Oct. 3, 2019

(65) Prior Publication Data
US 2021/0068580 A1 Mar. 11, 2021

(30) Foreign Application Priority Data

Mar. 29, 2018 (IT) .................. 102018000004104

(51) Int. Cl.
*A47J 31/36* (2006.01)
*A47J 31/44* (2006.01)
*B09B 3/00* (2022.01)
*B09B 101/02* (2022.01)

(52) U.S. Cl.
CPC .......... *A47J 31/3638* (2013.01); *A47J 31/44* (2013.01); *B09B 3/00* (2013.01); *A47J 31/3695* (2013.01); *B09B 2101/02* (2022.01)

(58) Field of Classification Search
CPC .... A47J 31/36; A47J 31/3638; A47J 31/3695; A47J 31/44; A47J 31/4403; B09B 3/32;
(Continued)

(56) References Cited

U.S. PATENT DOCUMENTS 7,464,470 B2   12/2008   Grosh et al.
8,549,824 B2   10/2013   Boussemart et al.
(Continued)

FOREIGN PATENT DOCUMENTS

CH           699502 A2      3/2010
DE     102016114194 B3     11/2017
(Continued)

OTHER PUBLICATIONS

International Search Report and Written Opinion for International Patent Application No. PCT/IB2019/052607, dated Jul. 30, 2019, 10 pages.

*Primary Examiner* — Reginald Alexander
(74) *Attorney, Agent, or Firm* — Armstrong Teasdale LLP

(57) ABSTRACT

A used capsule moving assembly includes a capsule blocking device leaving a capsule opening accessible, a used capsule moving device supporting the capsule blocking device and moving the capsule blocking device by taking it in front of a cutting device to partially open a capsule lid, in front of an emptying device to empty a used or extracted or exhausted substance, including used ground coffee, from a capsule body without breaking or destroying the capsule body, and in front of a capsule collection device to collect the capsule body emptied of the used or extracted or exhausted substance. The used capsule moving device displaces the capsule blocking device along a linear path at least when the capsule blocking device is placed so as to take (Continued)

the capsule body with the longitudinal capsule axis thereof in front of each of the cutting, emptying, and collection devices.

7 Claims, 54 Drawing Sheets

(58) Field of Classification Search
CPC ... B09B 3/35; B09B 2101/02; B09B 2101/10; B65B 69/005; B65B 69/0058; B65B 69/0075

See application file for complete search history.

(56) References Cited

U.S. PATENT DOCUMENTS

| 2010/0050880 | A1 | 3/2010 | Suter et al. |
| 2010/0212520 | A1 | 8/2010 | Franssen |

FOREIGN PATENT DOCUMENTS

| EP | 2158829 A1 | 3/2010 | |
| EP | 2146608 B1 | 10/2011 | |
| EP | 2291312 B1 | 7/2013 | |
| EP | 2627589 B1 | 11/2014 | |
| EP | 2964061 B1 | 2/2017 | |
| ES | 2330075 A1 | 12/2009 | |
| FR | 2916126 A1 | 11/2008 | |
| WO | 2010136601 A1 | 12/2010 | |
| WO | 2011051867 A1 | 5/2011 | |
| WO | 2014078893 A1 | 5/2014 | |
| WO | 2016020776 A1 | 2/2016 | |
| WO | 2016132389 A1 | 8/2016 | |
| WO | WO-2016120667 A1 * | 8/2016 | ........... B09B 3/0058 |
| WO | 2018029609 A1 | 2/2018 | |

\* cited by examiner

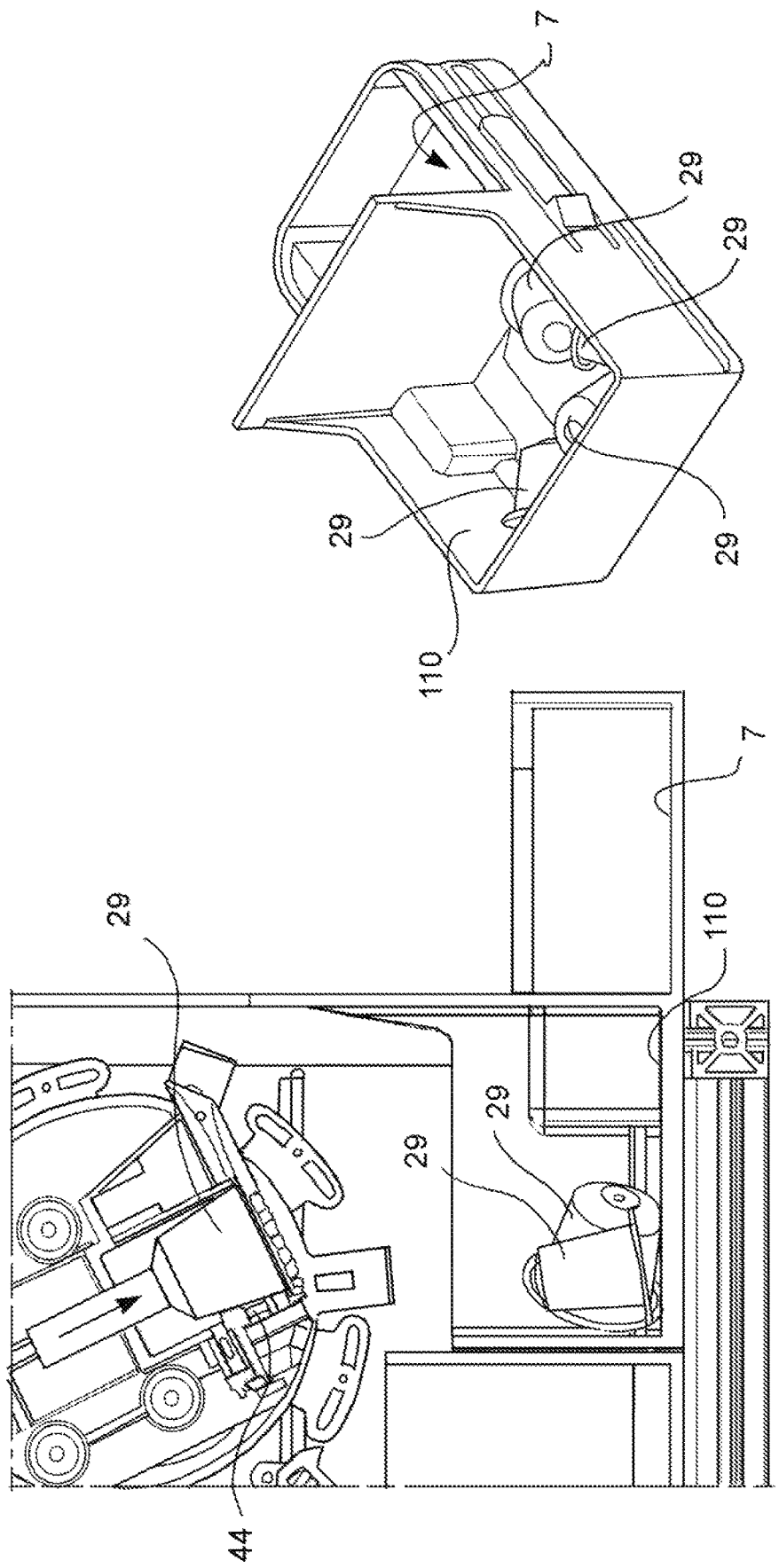

USED CAPSULE DISPOSAL ASSEMBLY

CROSS-REFERENCE TO RELATED APPLICATIONS

This application is a National Phase Application of PCT International Application No. PCT/162019/052607, having an International Filing Date of Mar. 29, 2019 which claims priority to Italian Application No. 102018000004104 filed Mar. 29, 2018, each of which is hereby incorporated by reference in its entirety.

FIELD OF THE INVENTION

The present invention relates to a used capsule disposal assembly, in particular to a used, or exhausted, capsule opening assembly, a used capsule moving assembly, as well as a coffee machine comprising such an assembly or such assemblies.

The present invention also concerns a method of extracting used coffee from a capsule body or package.

BACKGROUND OF THE INVENTION

As known, the capsules for the preparation of beverages, such as for example coffee, have a package, such as for example a capsule, containing an ingredient, a substance or content, e.g. ground coffee or tea leaves or fragments of leaves, which can be extracted by means of water (for example, but not necessarily, hot water).

Most of this content, particularly ground coffee, remains in the capsule after its use.

The capsules can be made of metal, e.g. aluminum, or synthetic and plastic materials, which materials are particularly advantageous for storing ground coffee contained therein.

It is desirable recycling the package, such as the capsule body, so as reuse the metal or plastic. However, the content remaining in the used capsule after extracting the beverage can be inconvenient for reusing the metal or plastic.

In order to solve this problem, the manufacturers of such capsules offer recycling collection sites, to collect and then send the used capsule to a central recycling plant, where a large number of capsules is shredded and the metal or plastic is separated from coffee grounds by means of processes which include crushing the capsule body, or package, and sieving the content, e.g. the used ground coffee.

These procedures, and the systems to perform them, are complex to be managed and expensive to be provided, and a strong contribution by the users is required in order the whole recycling process to be efficient.

Therefore, the need is felt to provide a device for opening the exhausted or used capsule, which can be used by the individual user of the capsule.

This type of opening devices of the used capsules is known from the background art.

For example U.S. Pat. No. 854,982, also published as EP2291312 to NESTEC SA, discloses a capsule processing machine for separating a capsule package, the capsule body thereof made of recyclable aluminum-based material, from a beverage ingredient or beverage and present inside these capsules. This machine comprises means for opening the body of the capsules which are fed to the machine and removing the ingredient of the capsule from the open capsule body. These machines have opening impactors arranged to intercept and rotate relative to the fed capsule body to provide the capsule body with an impact of sufficient force to break the capsule, destroy the capsule body and remove the used or exhausted ingredient of the capsule and separate it from the capsule body.

This known solution, although satisfactory under certain points of views, leaves the need to simply and completely separate the capsule content from the capsule body unsolved.

According to this known solution, the opening and removing means crush the capsule by mixing the used coffee with the broken pieces of the package or body of the capsule, thus making the separation between used coffee to be recycled in compostable material and the metal or plastic of the body very difficult and often incomplete because entirely and intimately surrounding them, making a complete or sufficient separation almost always impracticable.

Document EP2964061 describes a device for quickly opening coffee capsules, which comprises a first part adapted to accommodate and block a coffee capsule and a second part adapted to be coupled to and cooperate with the first part, so as to provide a male-female coupling with mutual rotation between the coupled parts. The second member is internally provided with an annular series of thin teeth which are regularly spaced apart along a circumference coinciding with the that defining the inner side of the annular edge of the coffee capsule.

A similar solution is described in document U.S. Pat. No. 7,464,470.

These solutions, although satisfactory according to some points of view, leave the need to open the capsule package in a simple and accurate manner unsolved, avoiding that broken pieces of the capsule, in particular of its cap, or lid, from mixing with extracted components, thus wasting the correct separation of contents from the package.

In fact, the lid is glued to the capsule edge of the body. The irregular strength exerted by the glue along the circumference of the capsule edge creates distortions of the lid and radial slits which can lead to the uncontrolled tear of the lid separating some lid shreds from the capsule body thus making them fall with the substance into a tray used for collecting the capsule content, preventing the correct separation of biodegradable substances from the material of the capsule package itself.

In particular, the operation of cutting the lid causes problems in preventing the puckering of the lid and the uncontrolled tear thereof. Furthermore, an irregular cut of the lid could cause problems of capsule emptying or a difficulty in removing a large amount of used coffee grounds from the capsule itself.

A similar solution is described in document EP2627589 to NESTEC SA. This solution describes a kit for opening a capsule having a cup-shaped base body provided with an opening closed by an outlet face, a cap.

In this solution, a cutting device is provided with means to mechanically associate the opening device with a capsule, manually by the consumer, without the use of tools. The cutting device comprises an opening member, integrally formed and arranged to be operated by a user and designed to open said outlet face of the capsule with a rotary cutting motion.

Document US2010050880, also published with number CH699502 and EP2158829 to INSENT GmbH, describes a device provided in a coffee machine. A capsule is arranged on a support plate and held in the upper part by a stop acting on its top. The capsule is either manually inserted or transported towards the rest of the coffee machine. For the separation of the capsule content from the package, a device is movably guided and equipped with a removal body, a plunger, which impacts on the capsule for the separation of the capsule contents. The plunger is pressed from the capsule extraction side into the capsule itself. The contents thus tear the capsule and, as soon as the lid breaks, it escapes from the capsule and falls in a container through the capsule opening. The plunger can rotate about the longitudinal axis thereof and can have removal ridges are arranged to be helically wound, thus removing the capsule contents.

This solution also leaves the need to easily and accurately open the capsule package unsolved, avoiding the broken pieces from being mixed with the extracted components, thus wasting the correct separation of contents from the package.

A similar solution is known from EP2146608 and FR2916126, WO2010136601, WO2011051867 and WO2014078893.

Document ES2330075 to Isluce SL describes a machine for the preparation by infusion of beverages from capsules containing ground coffee. The machine comprises a station for extracting the infusion, a station for breaking the capsule, a station for separating the components and feeding means which then move the capsule from the extraction station to the breaking and separation stations.

A cutting device is located near the extraction station. The cutting device consists of a circular saw with vertical axis, located below the cutting station, with the cutting edge being directed upwards and vertically displaceable to yield the cutting of the capsule bottom in order to separate the bottom wall and create an opening in the capsule from which the capsule content could fall into a tray when pushed from a punch.

SUMMARY OF THE INVENTION

It is an object of the present invention to improve the opening of the used capsule, both to avoid that different materials of the capsule body, but especially of the lid or closing film, mix with the used and compostable substance, thus making the separation and composting vain or less efficient, and to improve the opening and speeding it, thus allowing a more efficient and complete emptying thereof, while making these operations faster and thus adapted to be performed immediately after the capsule use, that is, immediately after the extraction of the beverage, such as coffee.

It is a further object of the present invention to automate the used capsule emptying operation without the need for manual operations which could be performed not always in an effective or complete manner, or even postponed in time, and then no longer performed.

It is a further object of the present invention to reduce the overall dimensions of the capsule moving assembly, especially to simplify it, in order to reduce the constructional complexity thereof, but in particular the energy consumption, thus reducing the actuation devices, but at the same time facilitating the demounting, or disassembly, of components for their maintenance and especially regular cleaning, therefore improving hygiene of use.

Moreover, it is the object of the present invention to facilitate the collection of the used substance and especially of the emptied capsule body, in order to facilitate the separate recycling of the envelope, or capsule body, after a congruous number of extractions, therefore after using a congruous number of capsules, e.g. 5 capsules, without interrupting every single extraction operation.

These and other objects are achieved by an assembly and a method as described and claimed herein.

Some advantageous embodiments are also described.

Through the embodiments described below, destroying the capsule body to separate the substance contained in the capsule from the capsule body itself and simplifying the complete or almost complete separation of used coffee from the capsule body can be avoided.

Moreover, with the invention, a large number of capsule bodies can be easily processed in a limited space. The capsule body can thus be sent to recycling, for example of metal or plastic, in a known manner, and the previously separated contents can be disposed in a different channel, for example, in the case of coffee grounds, it can also be composted.

Furthermore, with the invention, a manual operation for the separation of the capsule content and the capsule body can be avoided, and an assembly which can work autonomously, even possibly integrated in a coffee machine, can be used.

Still further, with the invention, a simple assembly, which is easy to be manufactured and easy to be maintained can be obtained.

Still further, with the invention, even in light of the limited number of components and actuators, the cleaning thereof and the cleaning of the machine as a whole can be facilitated.

BRIEF DESCRIPTION OF THE DRAWINGS

Further features and advantages of the assembly and method according to the invention will become apparent from the description provided below of preferred exemplary embodiment thereof, given by way of non-limiting example, with reference to the accompanying drawings, in which:

FIGS. 89 and 90 depict a sectioned front view and an axonometric view of a detail of the opened and emptied capsule collection device and of the capsule collection bowls;

DETAILED DESCRIPTION

Figure 1:
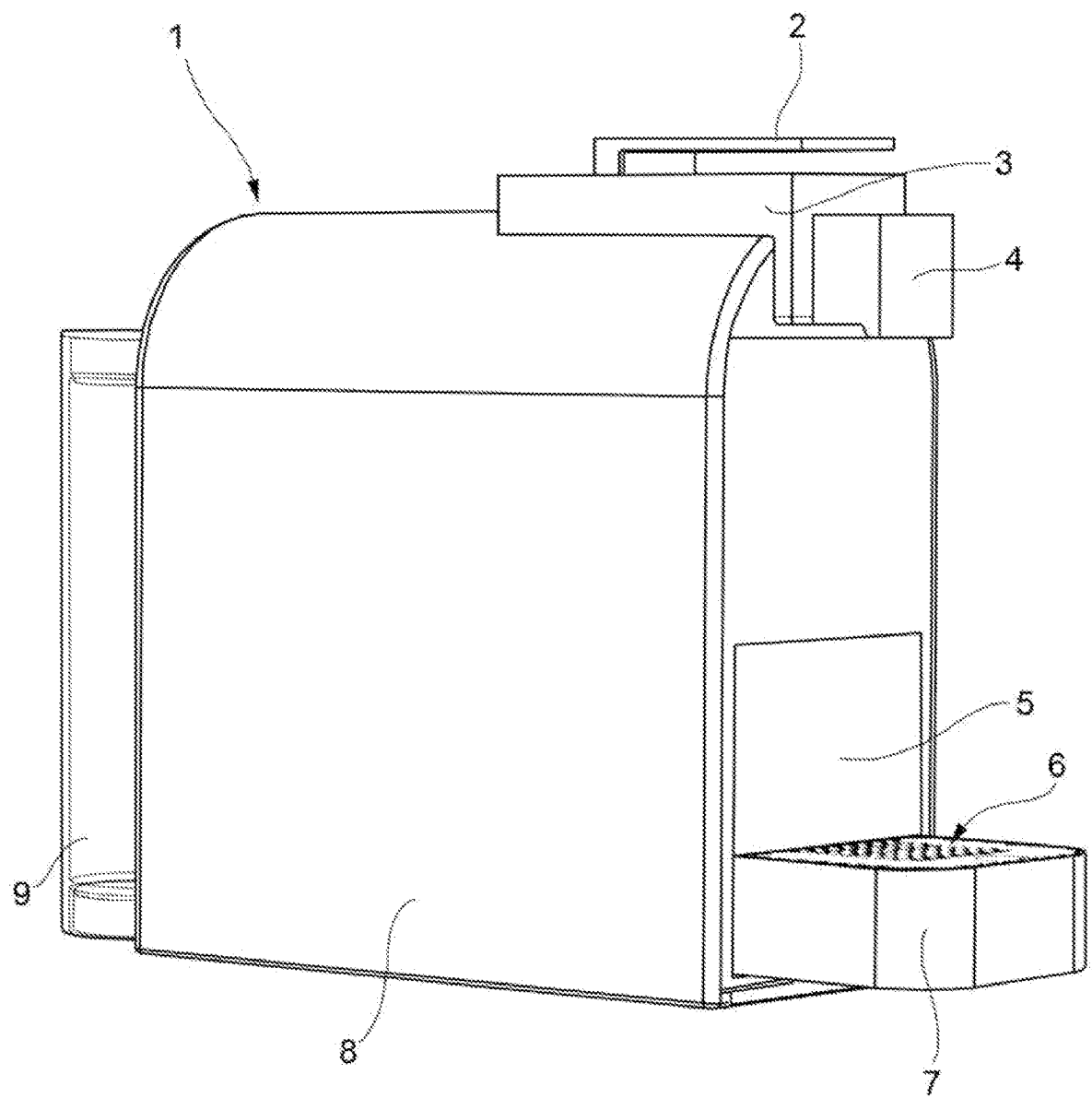
FIG. 1 is an axonometric view of an extraction machine for a beverage, for example coffee.
Figure 2:
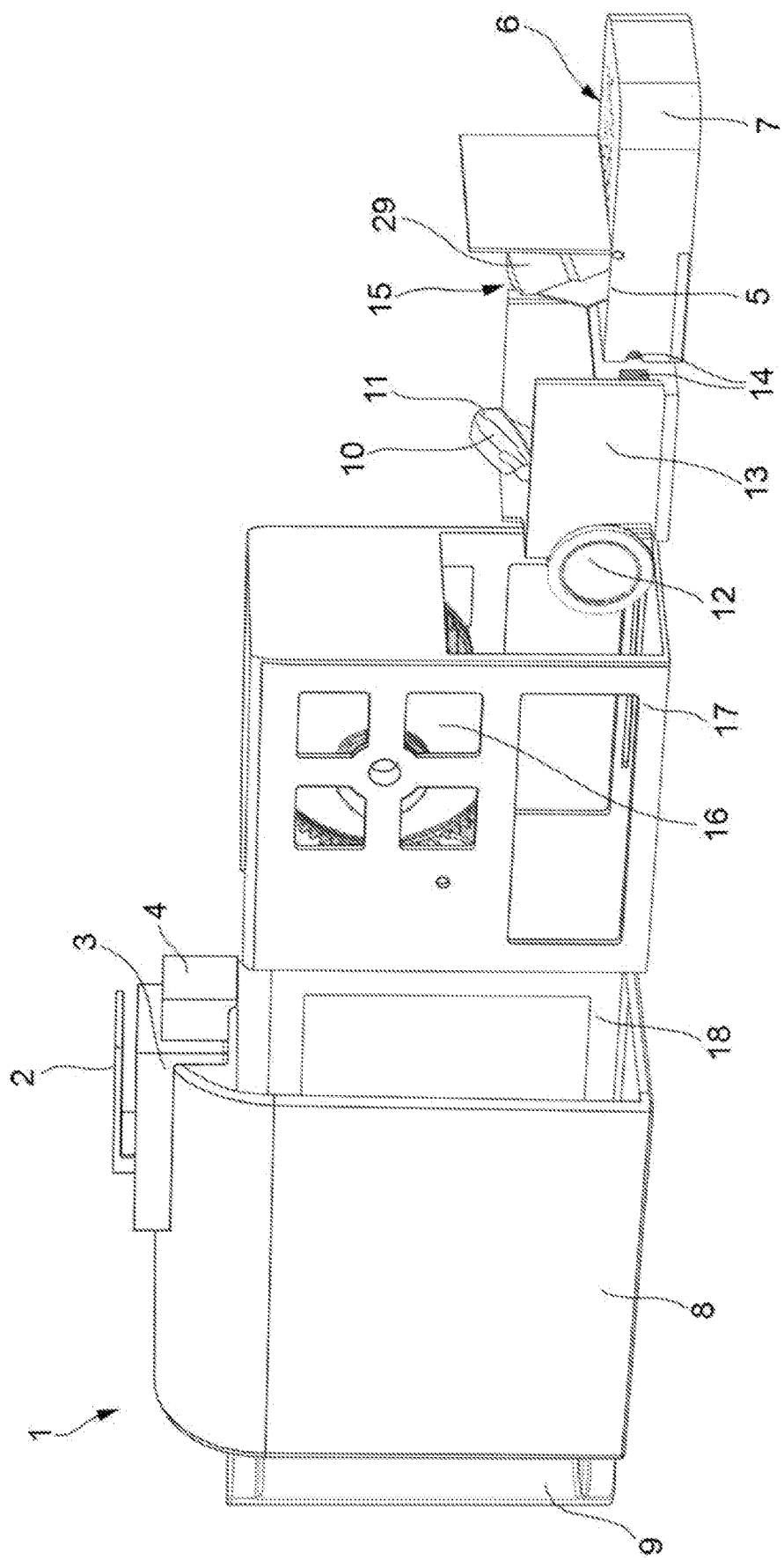
FIG. 2 shows an axonometric view of the extraction machine in FIG. 1 where the used capsule moving assembly together with the used capsule opening assembly is extracted, and the used capsule emptying assembly is further extracted and the used capsule collecting assembly is separated therefrom together with the liquid collection bowl where the cup-holding surface is present.
Figure 3:
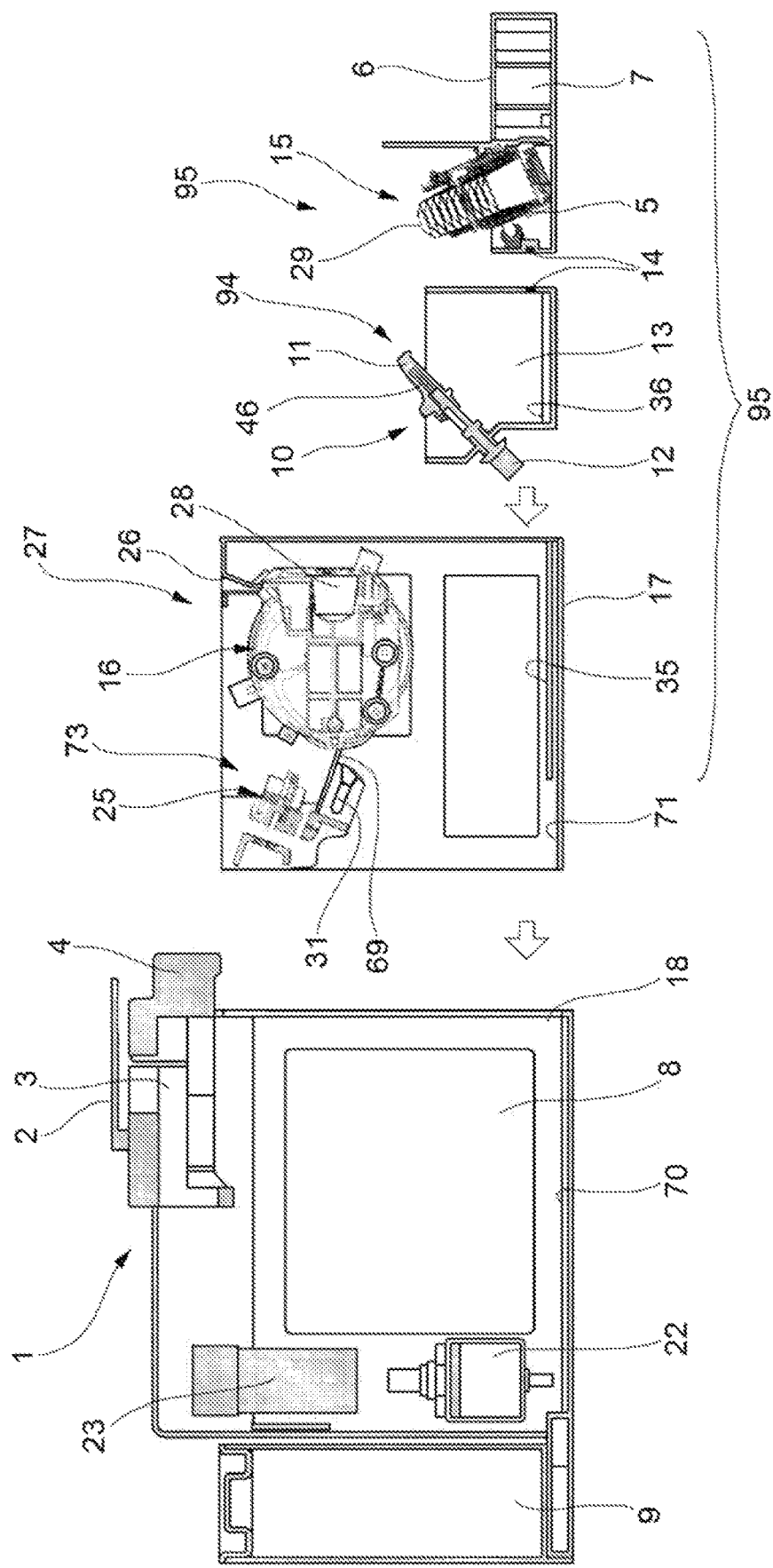
FIG. 3 is a section along a longitudinal plane of the different assemblies of the machine in FIG. 2.
Figure 4:
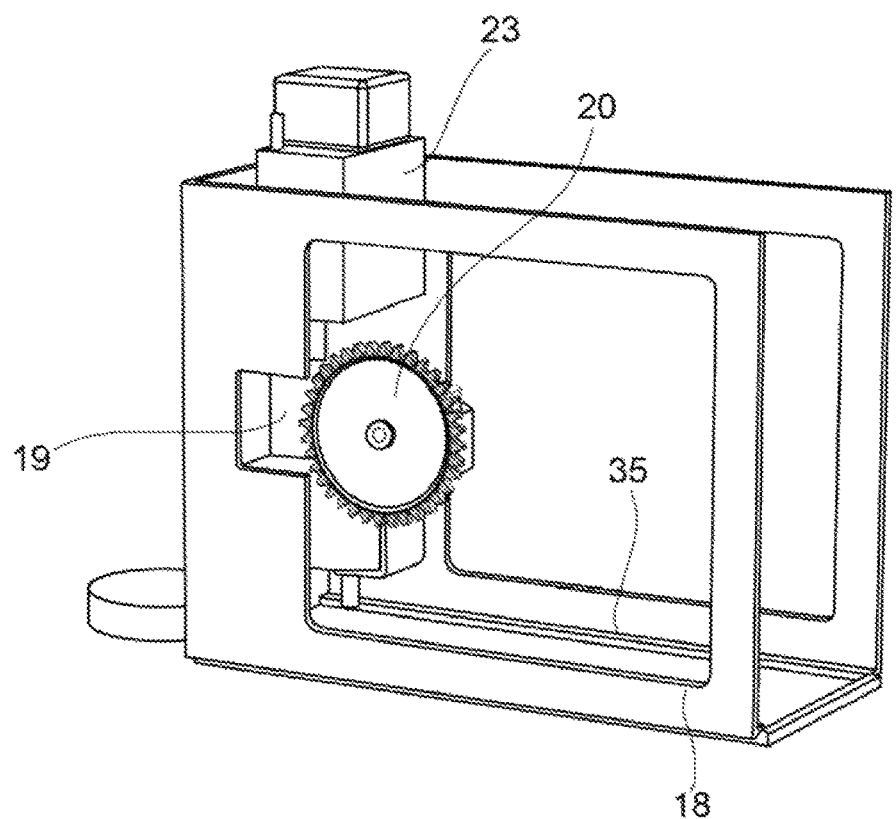
FIG. 4 shows an axonometric view of the fixed frame of the machine in FIG. 1, where the frame sliders are apparent, the primary transmission operatively connected to the actuation device, such as an electric motor, the fluid pump and the heater.
Figure 5:
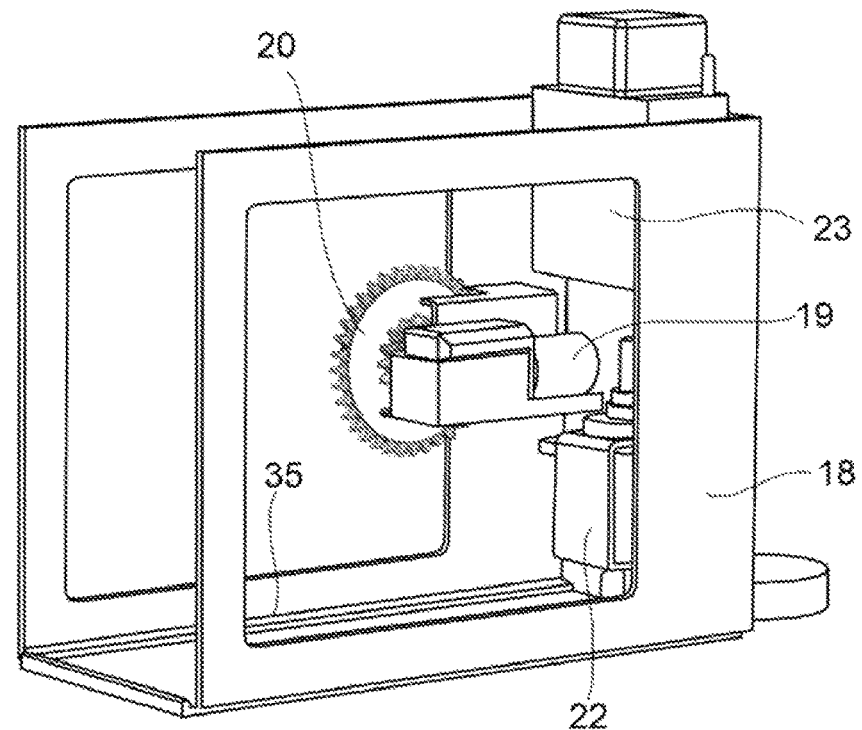
FIG. 5 is an axonometric view of the fixed frame in FIG. 4 according to a different point of view.
Figure 6:
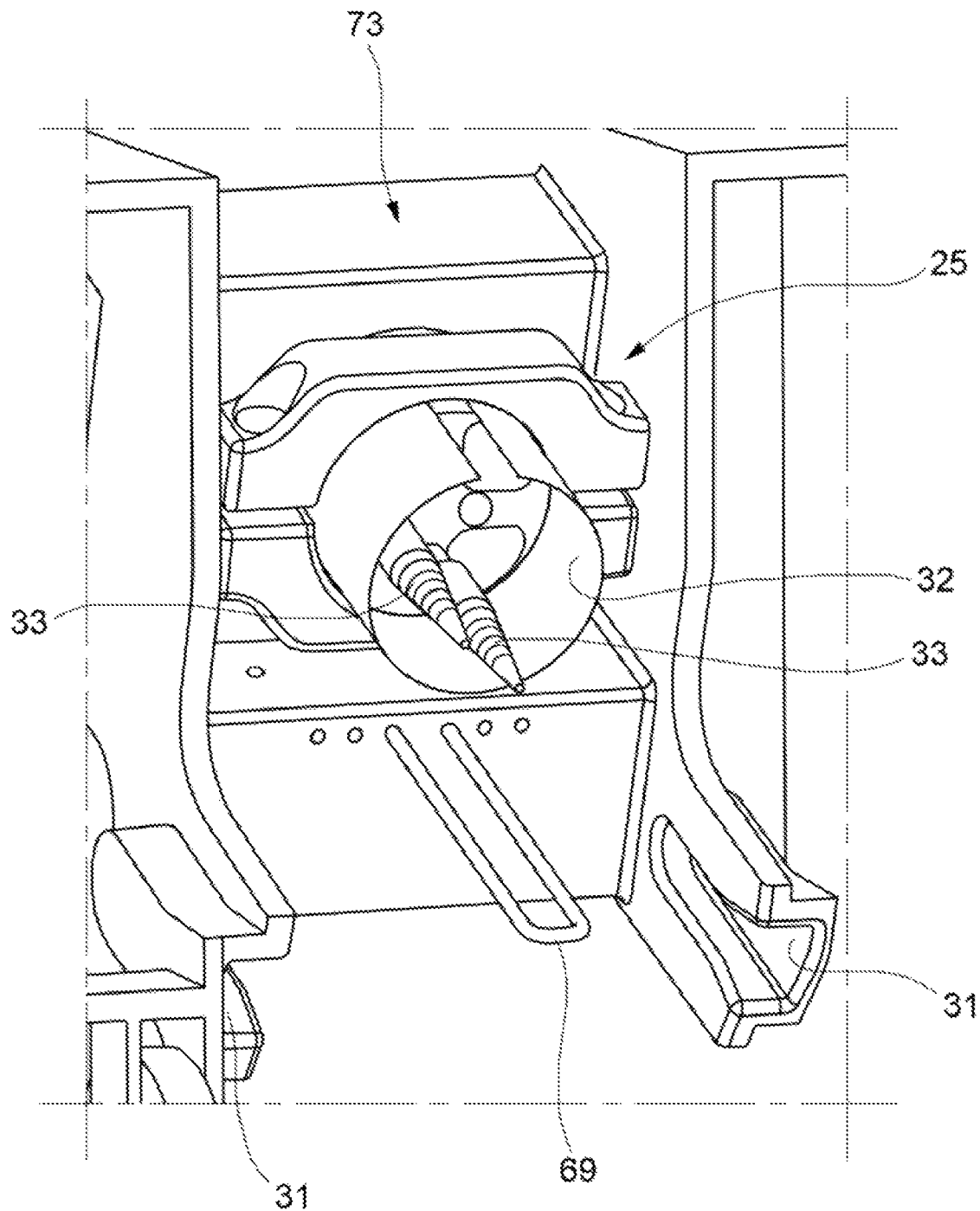
FIG. 6 shows an axonometric view of a used capsule opening assembly with the details of the used capsule cutting device or used capsule opening device and capsule cut lid folding device, as well as the accompanying guides of the linear cut carriage adapted to guide the support carriage of the capsule blocking device in its stretch of the linear cut capsule path.
Figure 7:
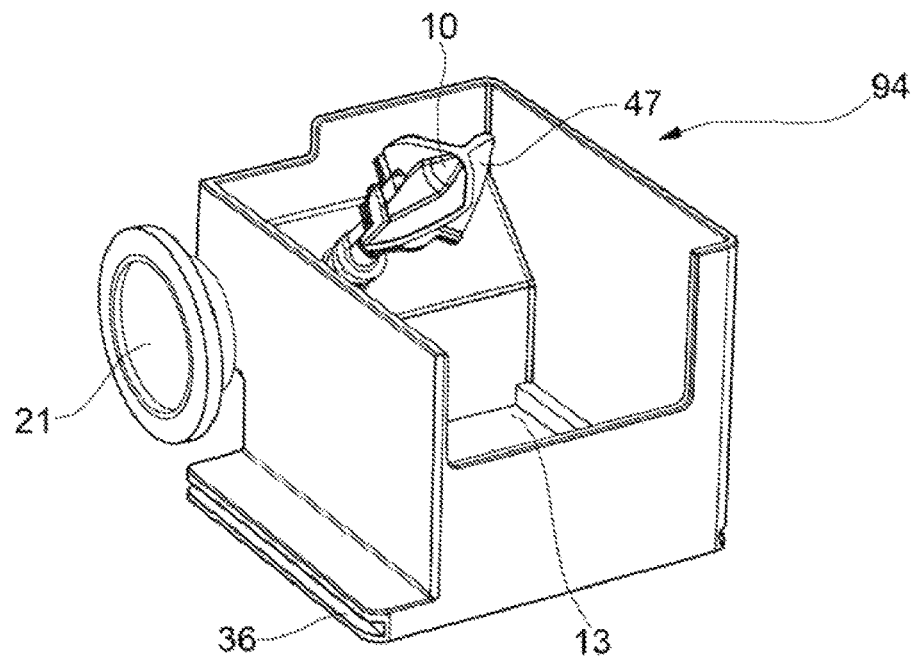
FIG. 7 is an axonometric view of a used capsule emptying assembly.
Figure 8:
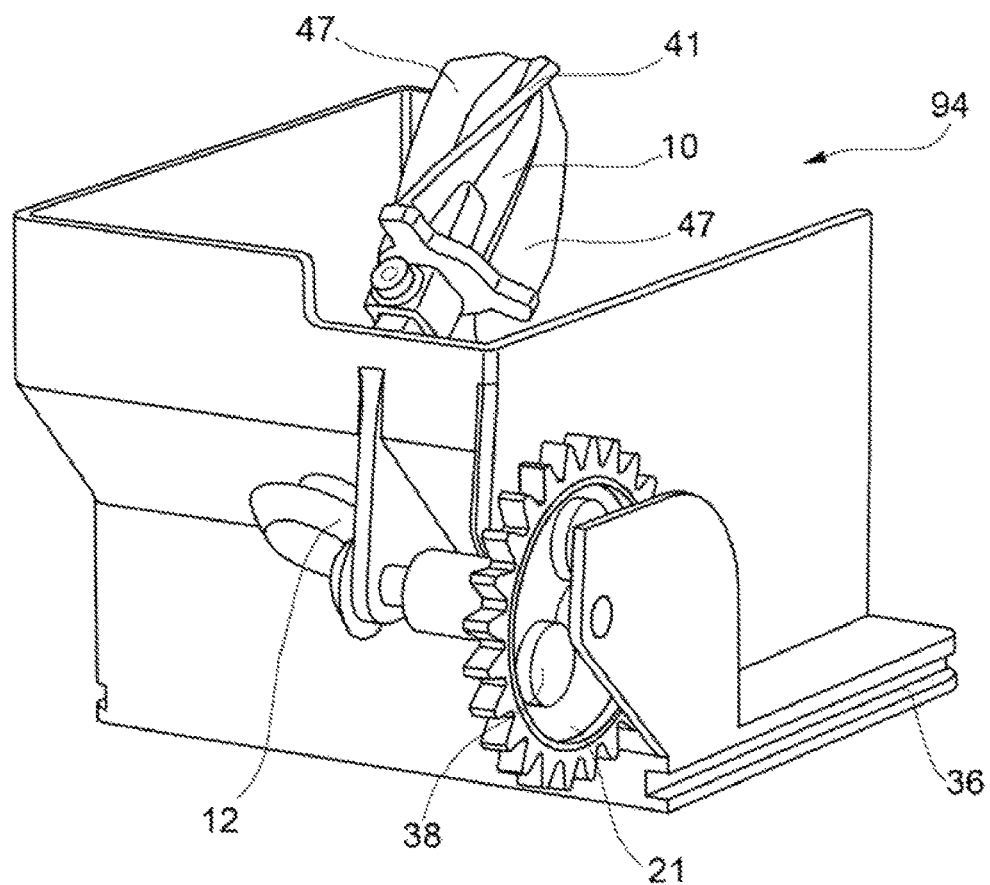
FIG. 8 shows an axonometric view of the used capsule emptying assembly in FIG. 7 according to a different view.
Figure 9:
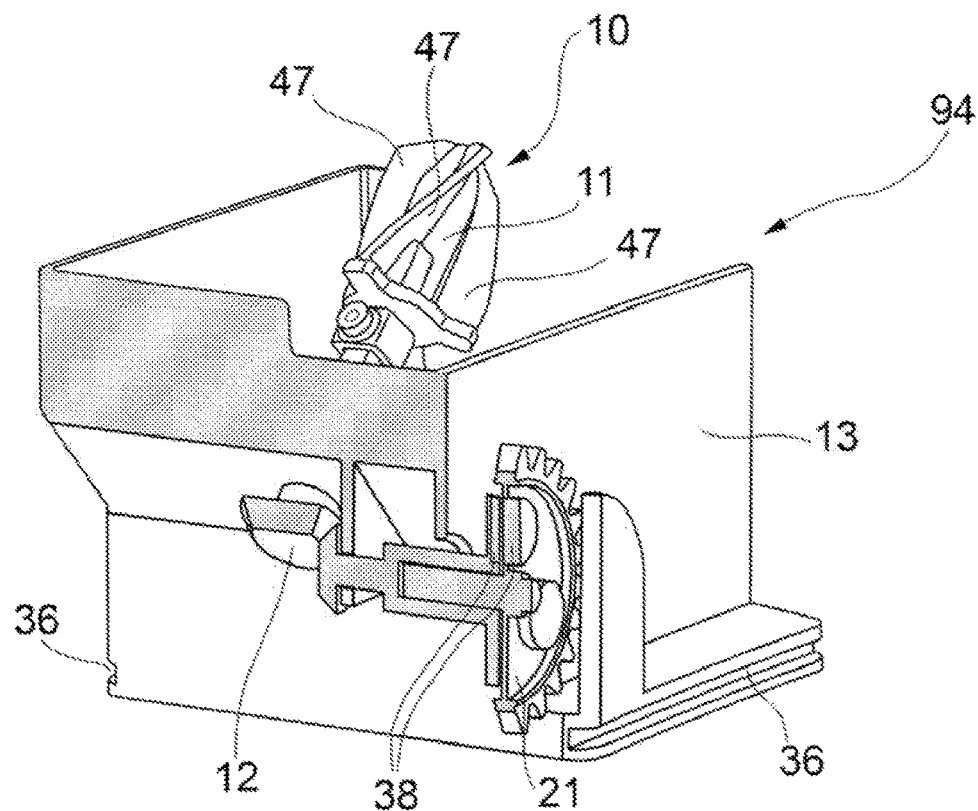
FIG. 9 is a partially sectioned axonometric view of the used capsule emptying assembly in FIG. 7.
Figure 10:
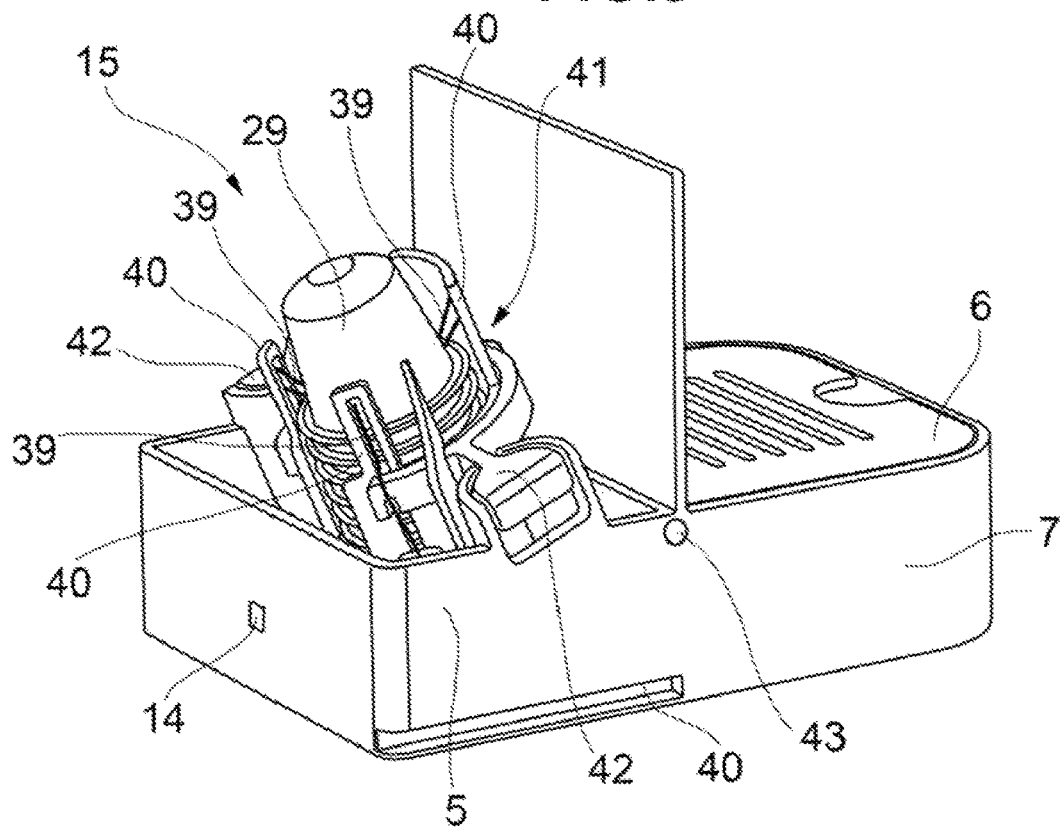
FIG. 10 shows an axonometric view of a used capsule collecting assembly.
Figure 11:
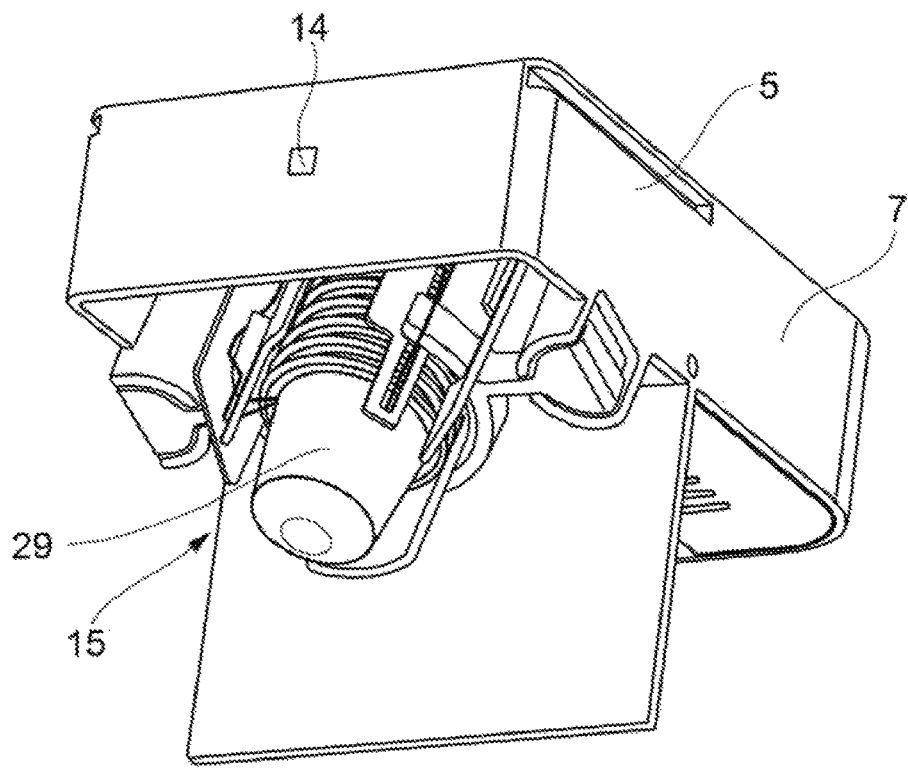
FIG. 11 is an axonometric view of the used capsule collecting assembly in FIG. 10, inverted in order to drop the opened and emptied used capsules collected if the capsule blocking device is disengaged.
Figure 12:
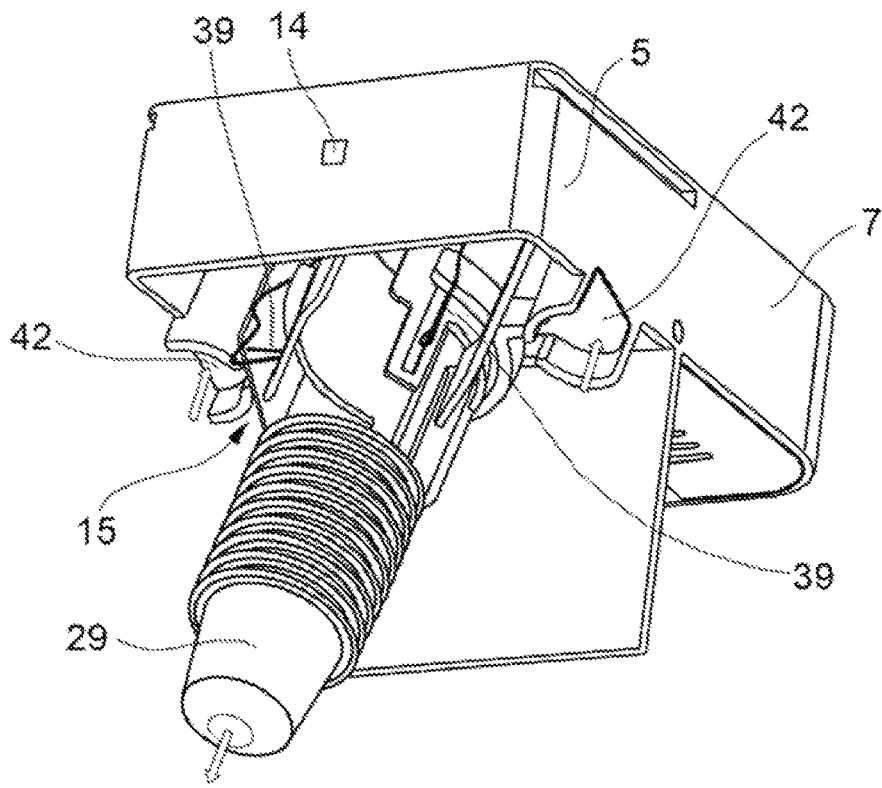
FIG. 12 shows an axonometric view of the used capsule collecting assembly in FIG. 10 inverted and in which the capsule blocking device is disengaged by activating the locking device release command.
Figure 13:
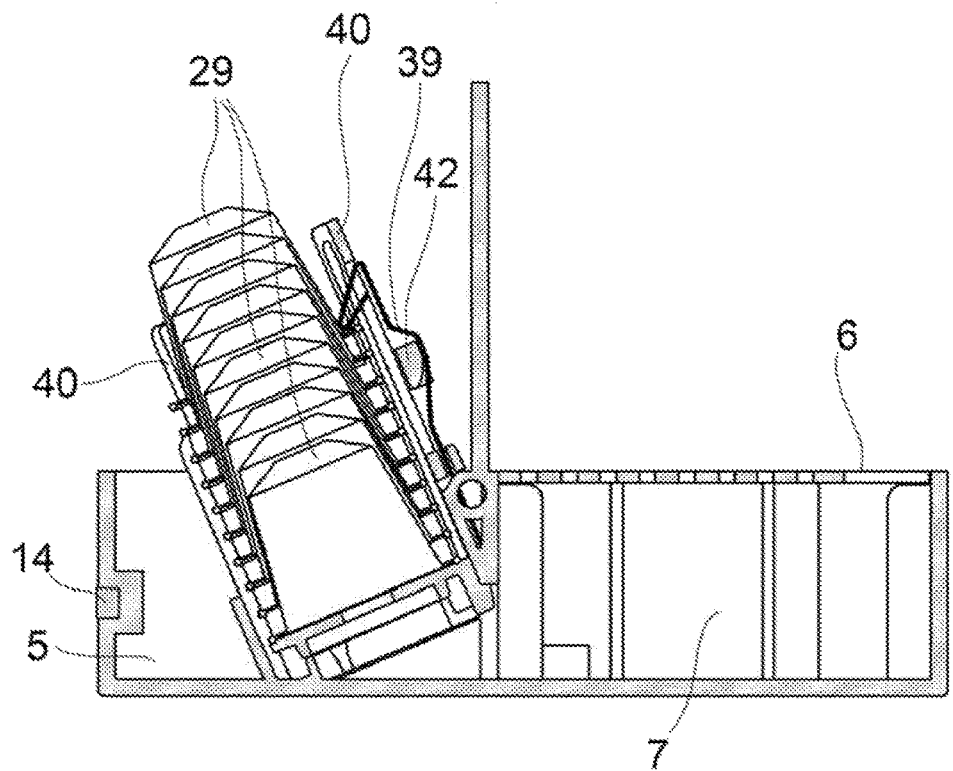
FIG. 13 depicts a longitudinal section of the used capsule collecting assembly in FIG. 10 where all devices and components contained therein are highlighted.
Figure 14:
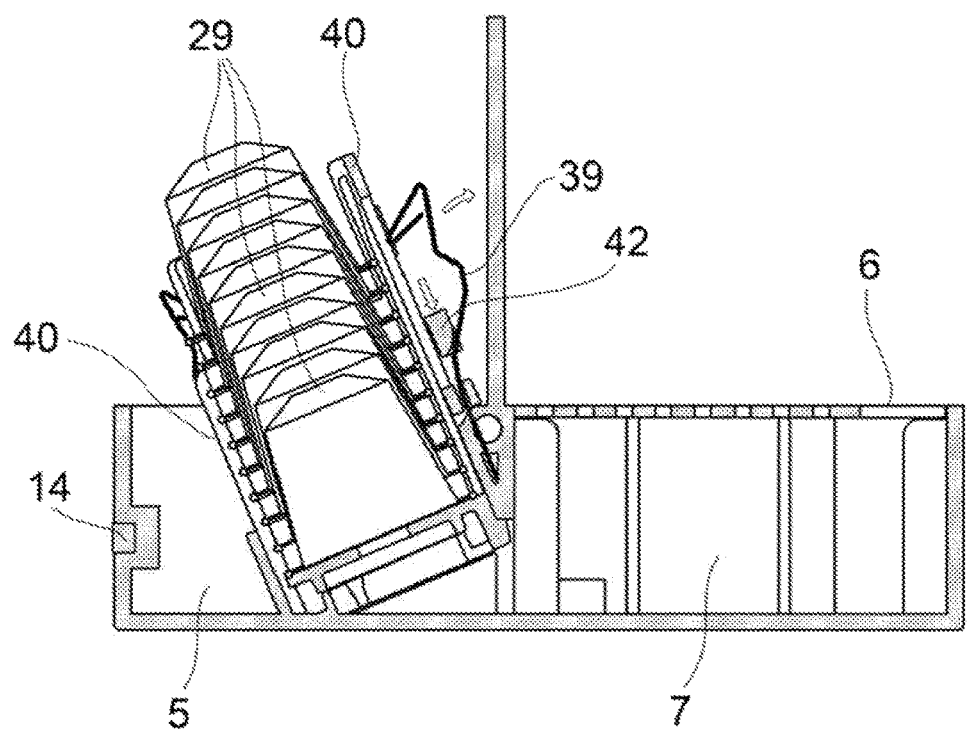
FIG. 14 shows a longitudinal section of the used capsule collecting assembly in FIG. 10 where the capsule blocking device is disengaged by activating the blocking device release command.
Figure 15:
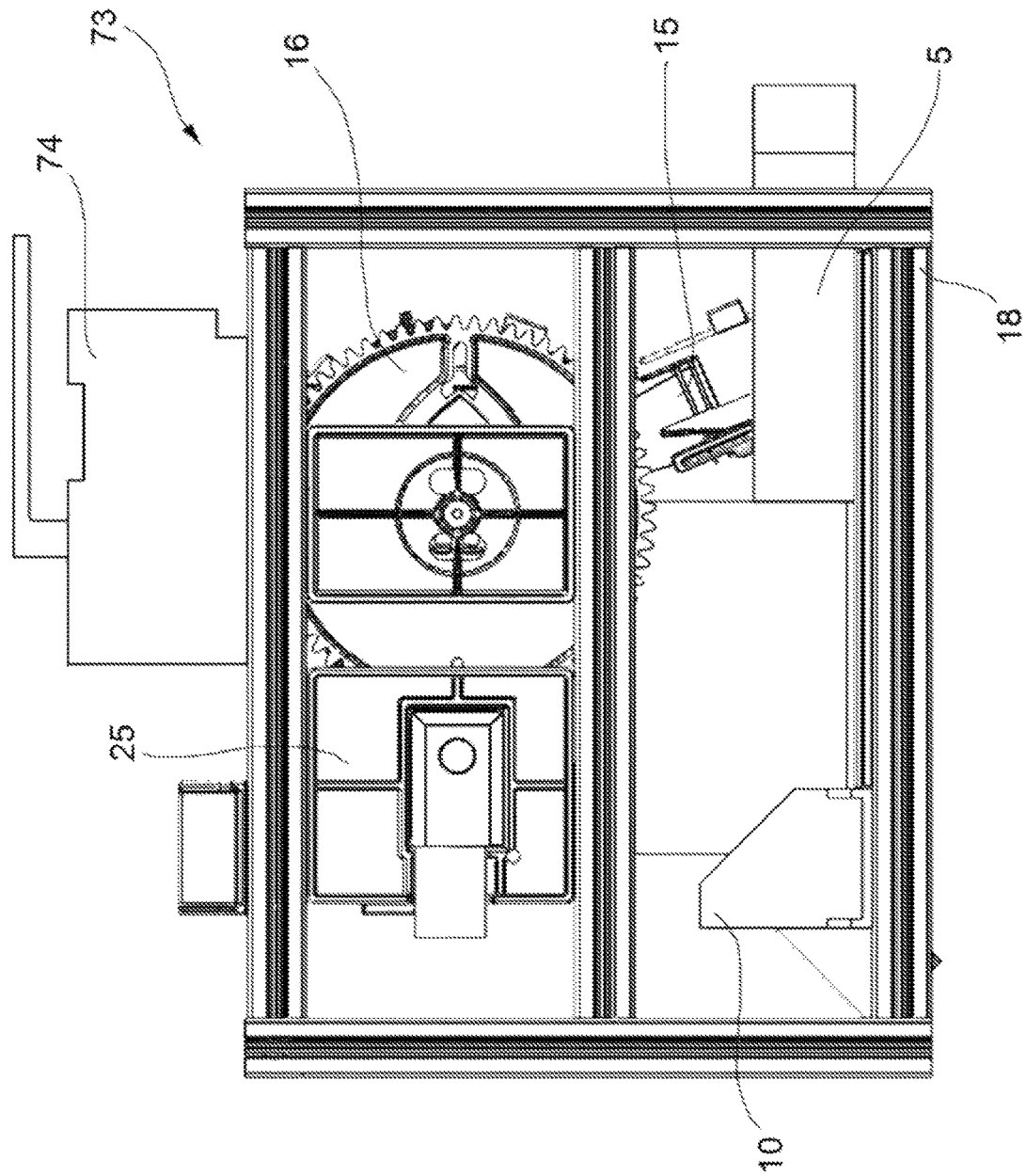
FIG. 15 is a side view of one used capsule opening assembly according to a further embodiment.
Figure 16:
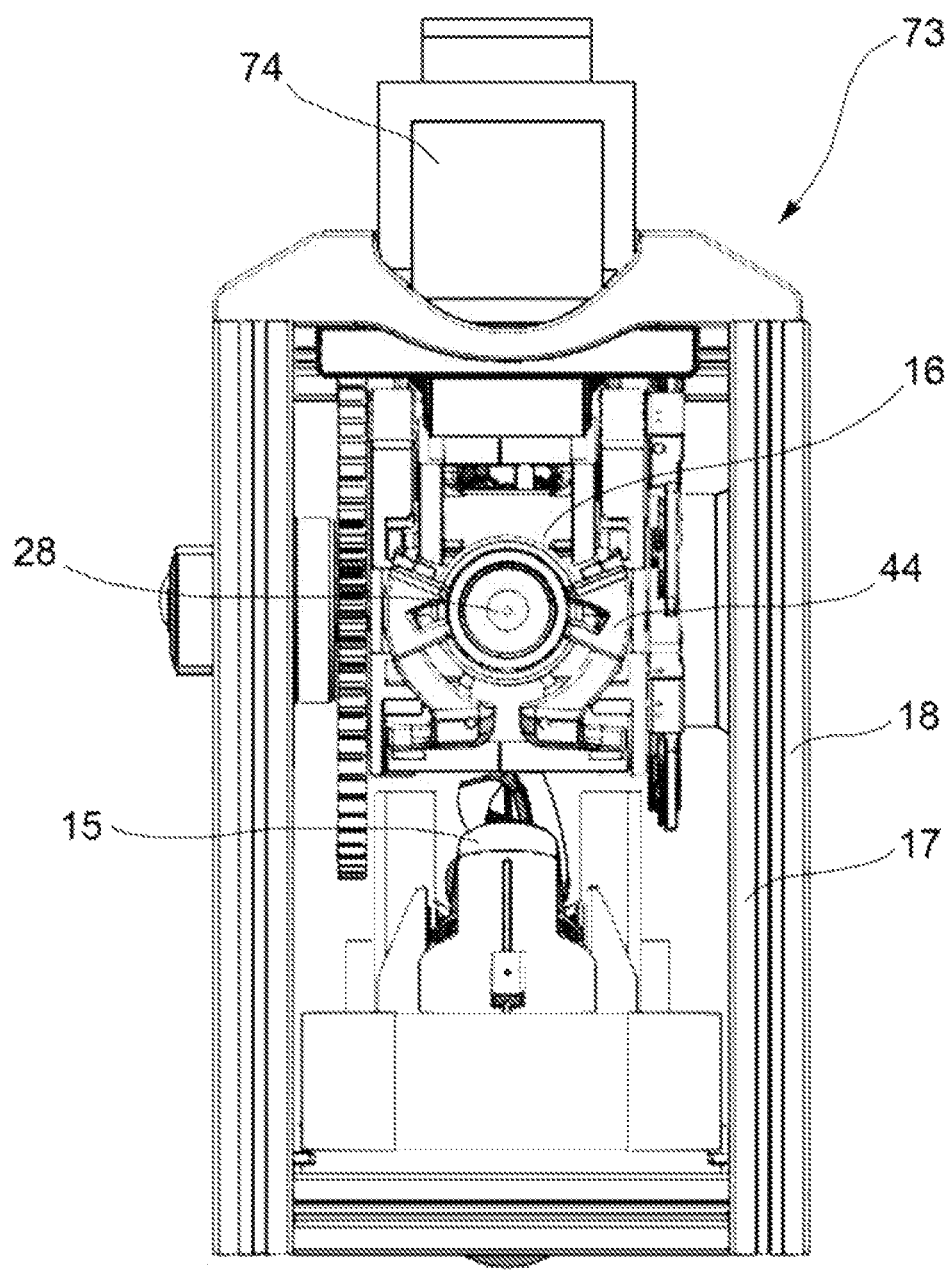
FIG. 16 shows s front view of the used capsule opening assembly in FIG. 15.
Figure 17:
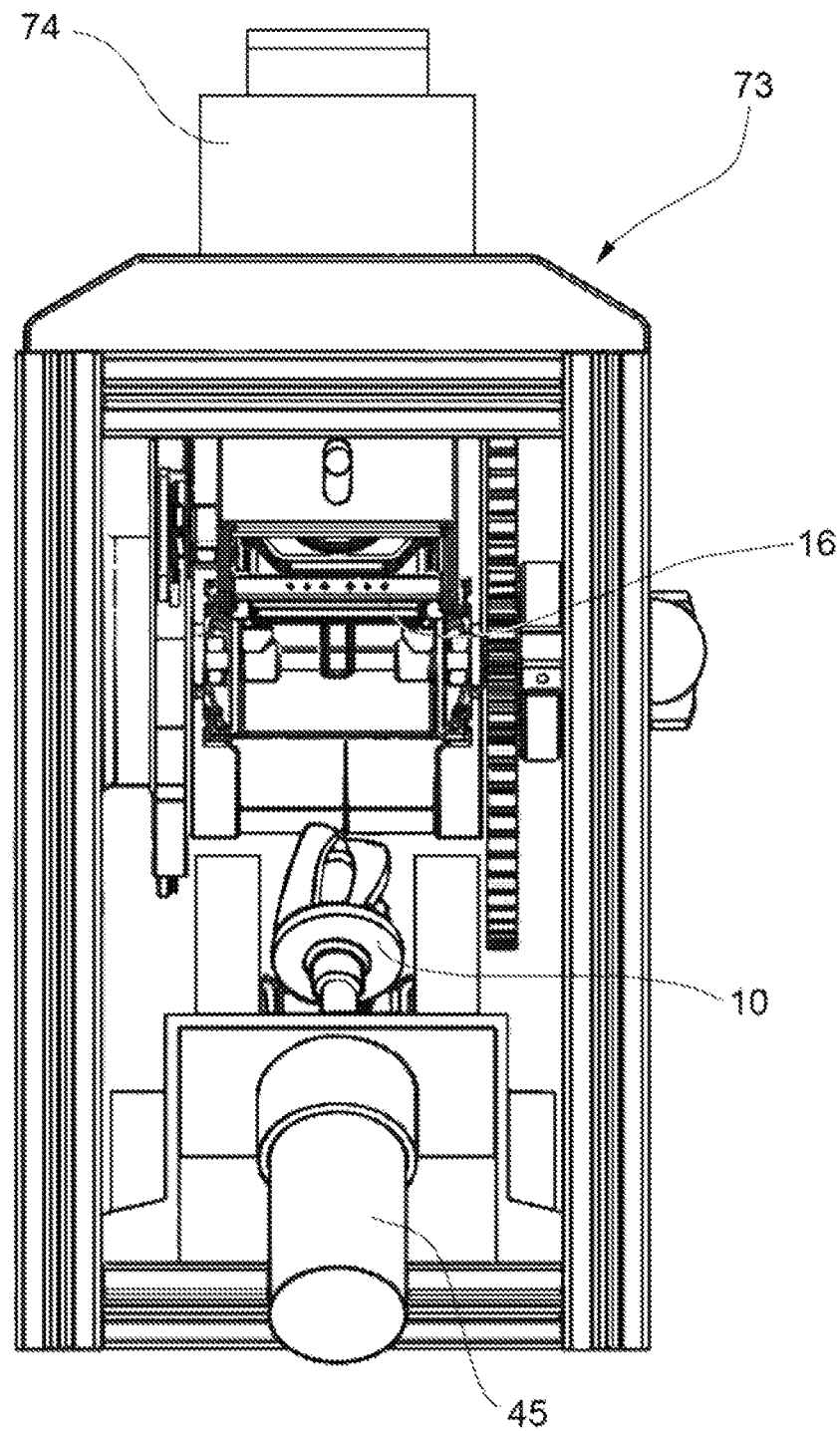
FIG. 17 is a back or rear view of the used capsule opening assembly in FIG. 15.
Figure 18:
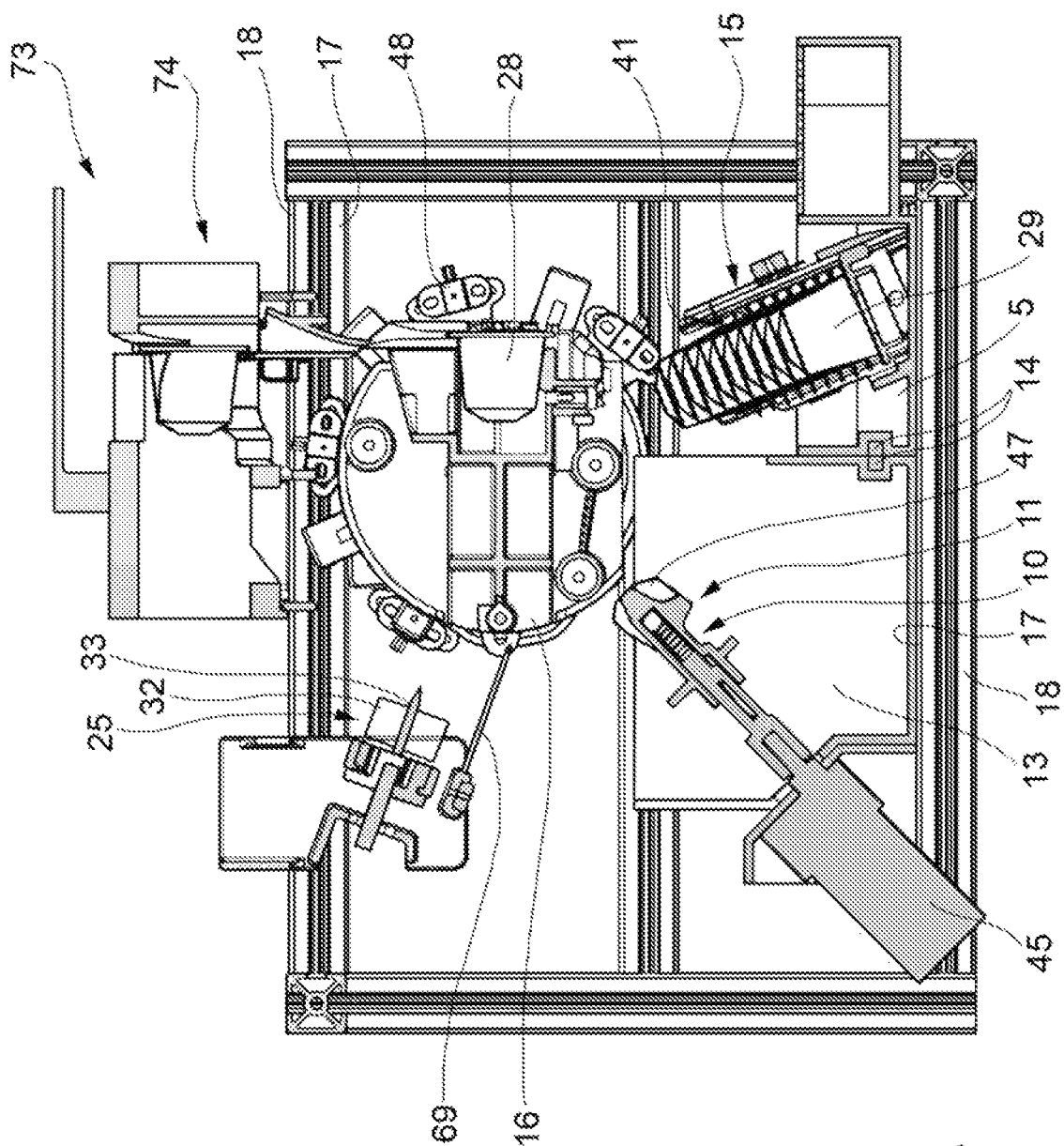
FIG. 18 shows a longitudinal section of the used capsule opening assembly in FIG. 15.
Figure 19:
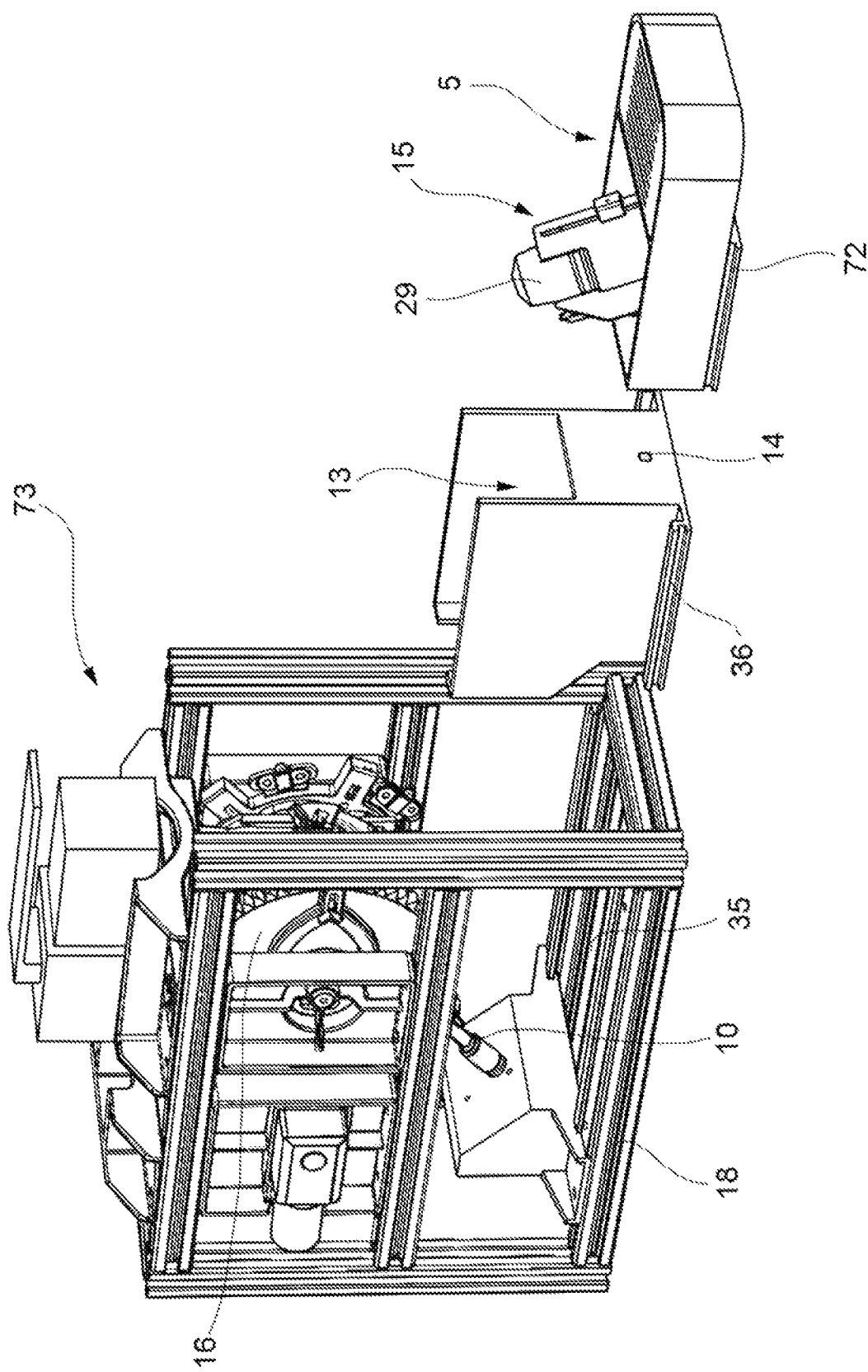
FIG. 19 is an axonometric view of the used capsule opening assembly in FIG. 15, disassembled in some of its constituent elements, in particular the used capsule collecting assembly and the extracted and used coffee collection bowl.
Figure 20:
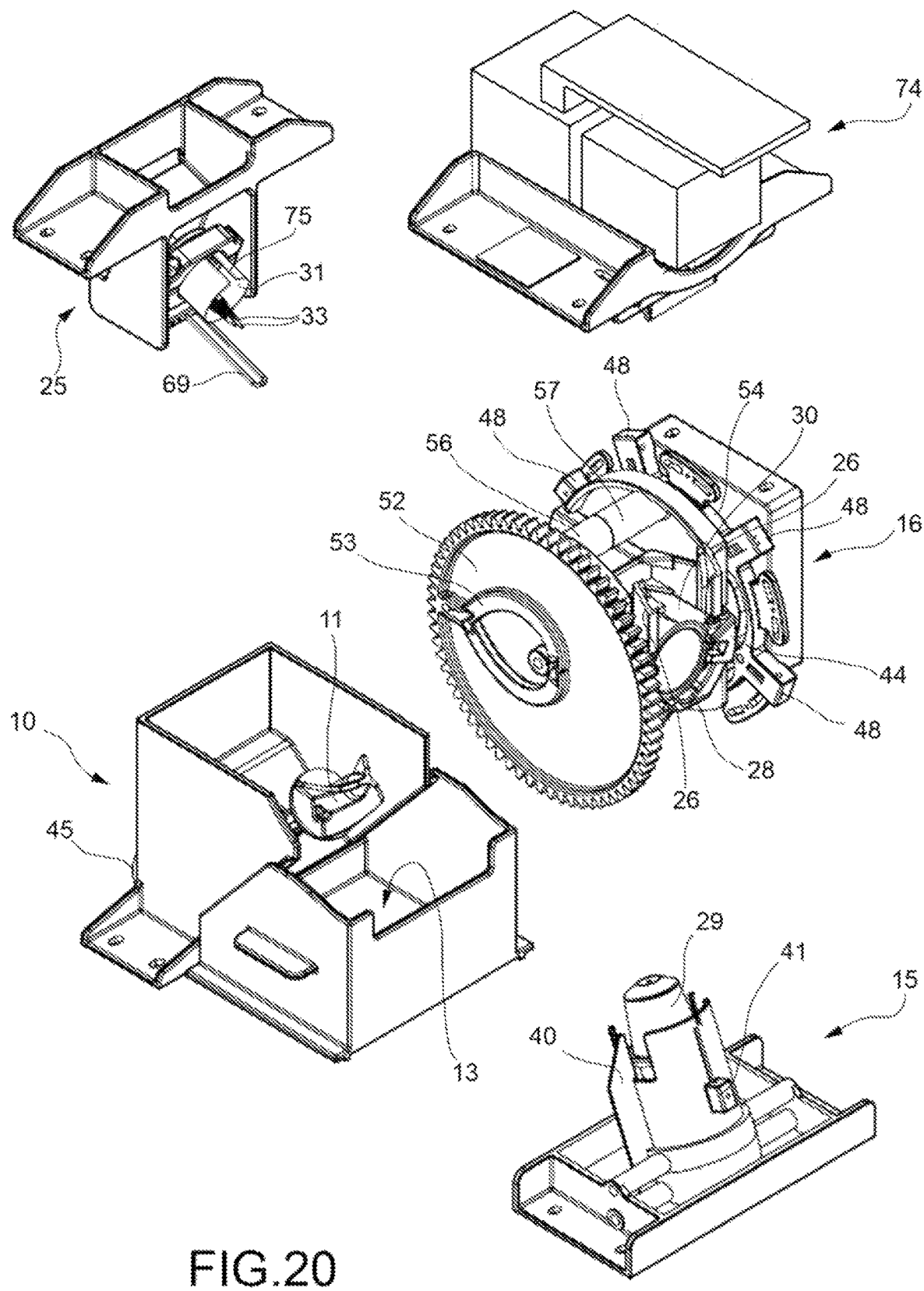
FIG. 20 shows an axonometric view with separate parts of the used capsule opening assembly in FIG. 15 without the fixed and extractable frames where a used capsule insertion device, a used capsule opening assembly, a used capsule emptying assembly, a used capsule collecting assembly and a used capsule moving assembly are highlighted.
Figure 21:
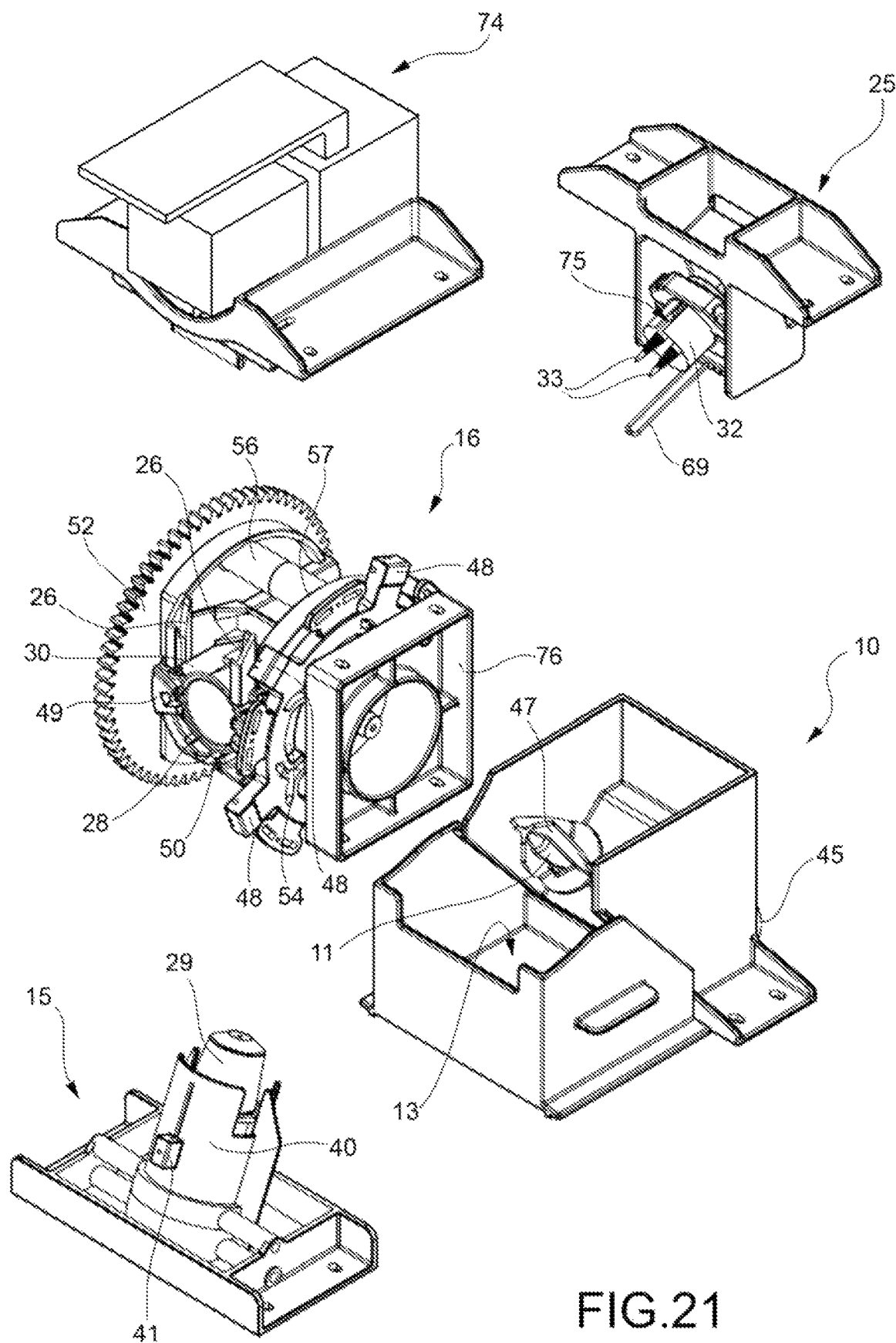
FIG. 21 depicts the assembly in FIG. 20 in a different axonometric view with separate parts.
Figure 22:
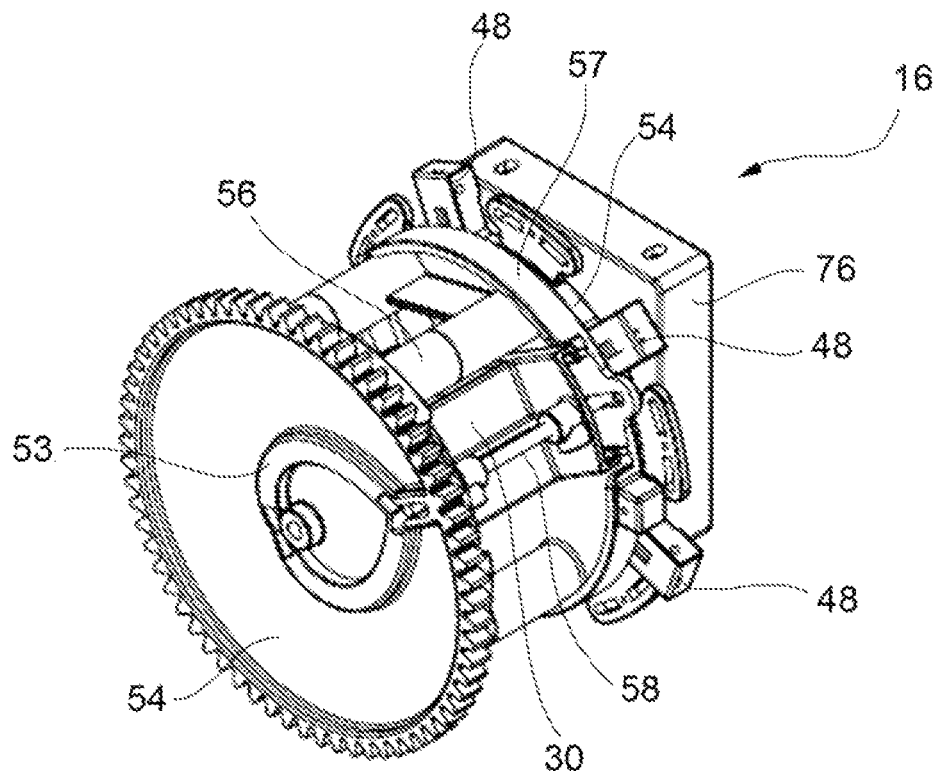
FIG. 22 shows an axonometric view of the used capsule moving assembly.
Figure 23:
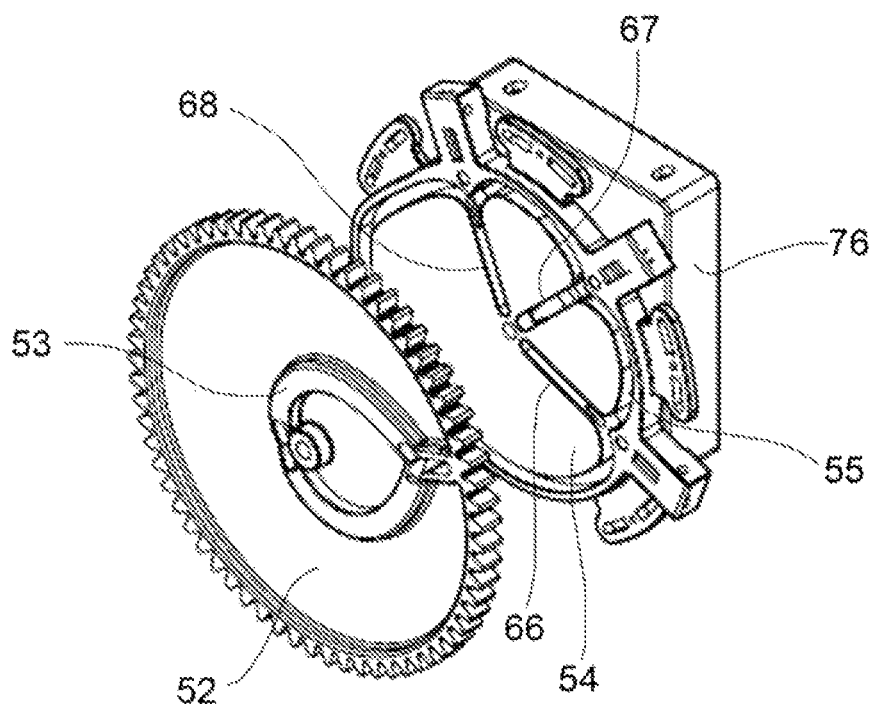
FIG. 23 is an axonometric view of the frame support of the used capsule moving device with which the second cam element, or fixed cam, is associated, where the second carriage guide is obtained, forming a linear stretch of second guide which confers a used capsule path for cutting the lid, a linear stretch of second guide which confers a used capsule path for emptying the capsule and a linear stretch of second guide which confers a used capsule path for the collection of emptied capsules, the first cam, or rotating cam, element which forms a first carriage guide being also depicted.
Figure 24:
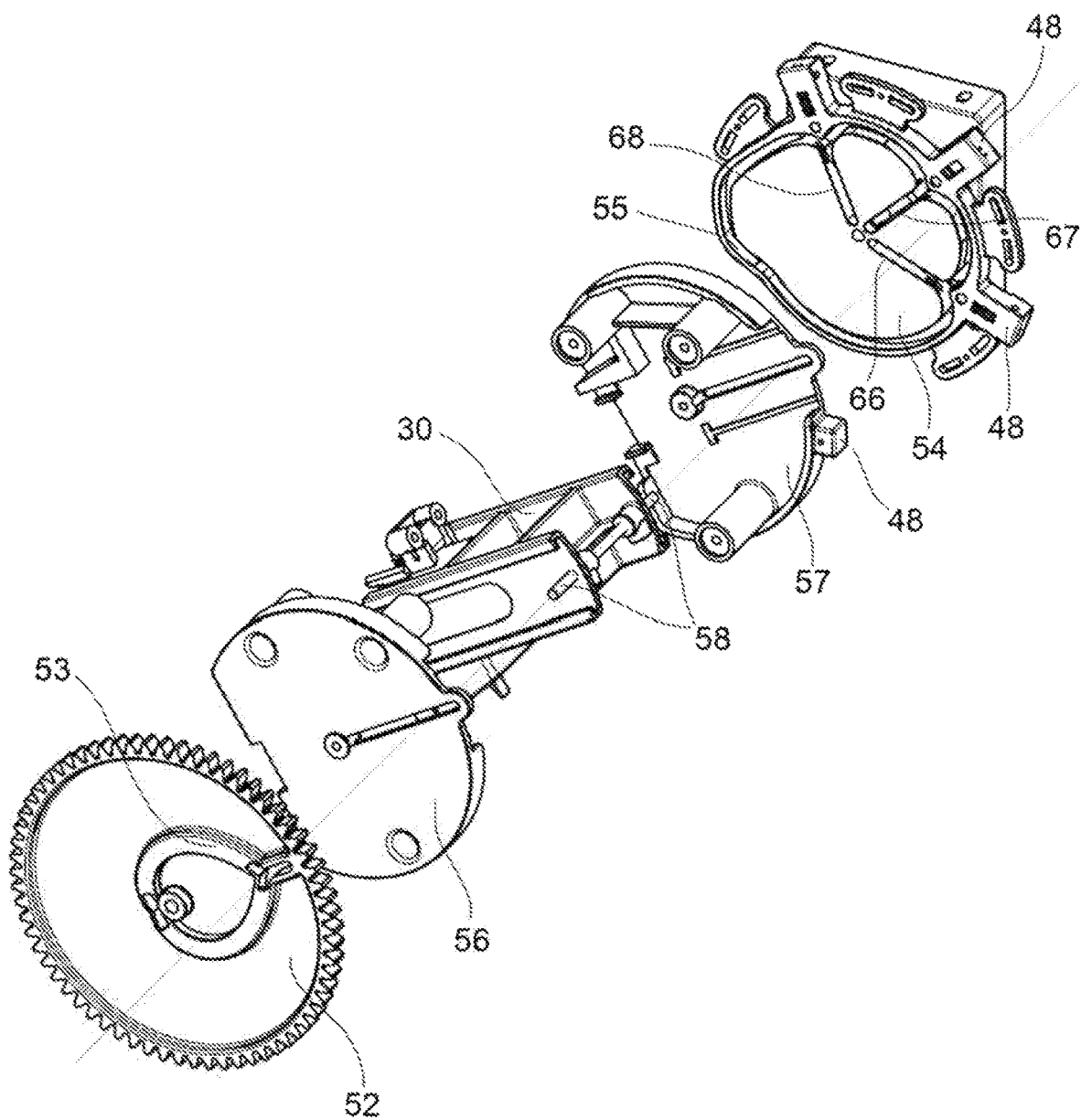
FIG. 24 is an axonometric view with separate parts of the used capsule moving assembly in FIG. 22.
Figure 25:
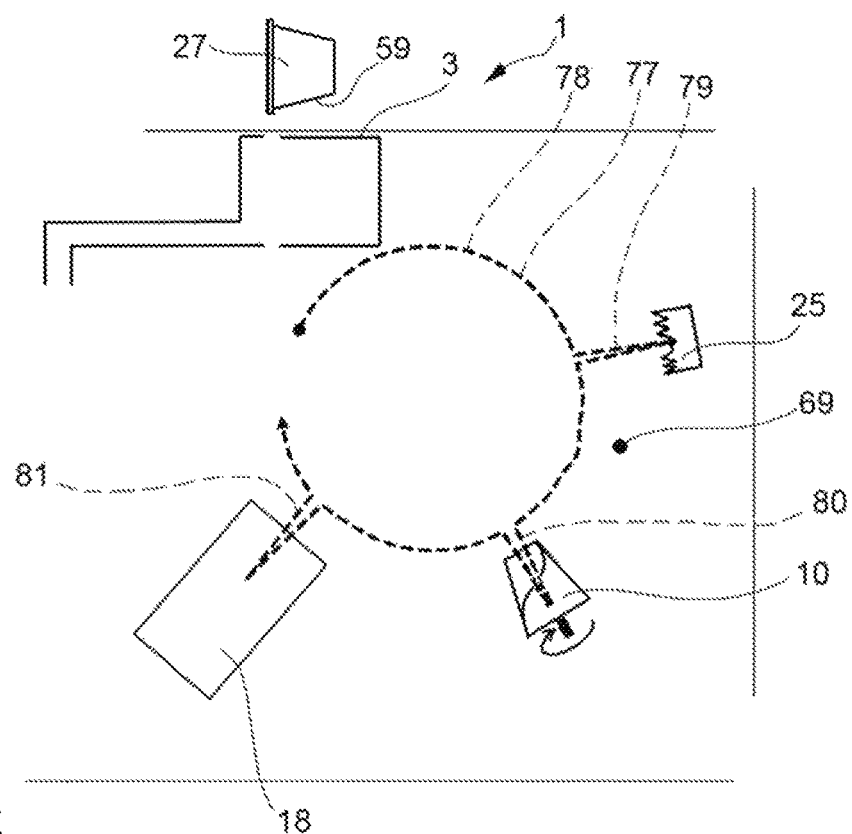
FIGS. 25 to 40 diagrammatically show the different operation steps of the used capsule disposal assembly in an extraction machine for a beverage, e.g. coffee, where the steps of extraction, blocking the used capsule, its rotation, its feeding for cutting the lid, its rotation, the opening of the lid, its feeding to empty its contents, its rotation, its feeding for the collection of the open and emptied capsule in a collection device and the successive steps for different capsules are highlighted.
Figure 26:
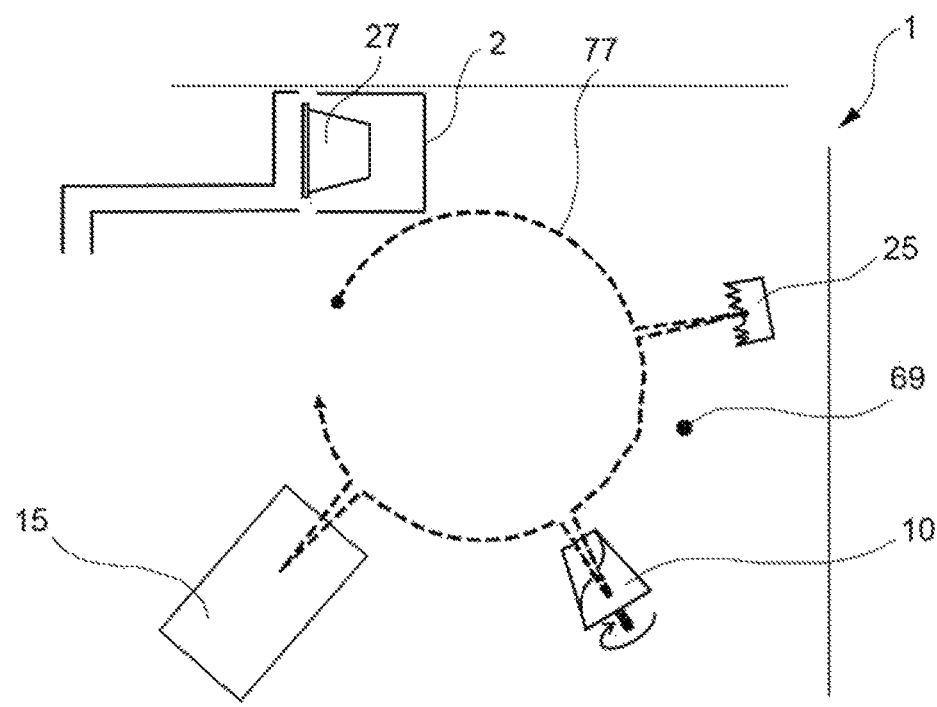
Figure 27:
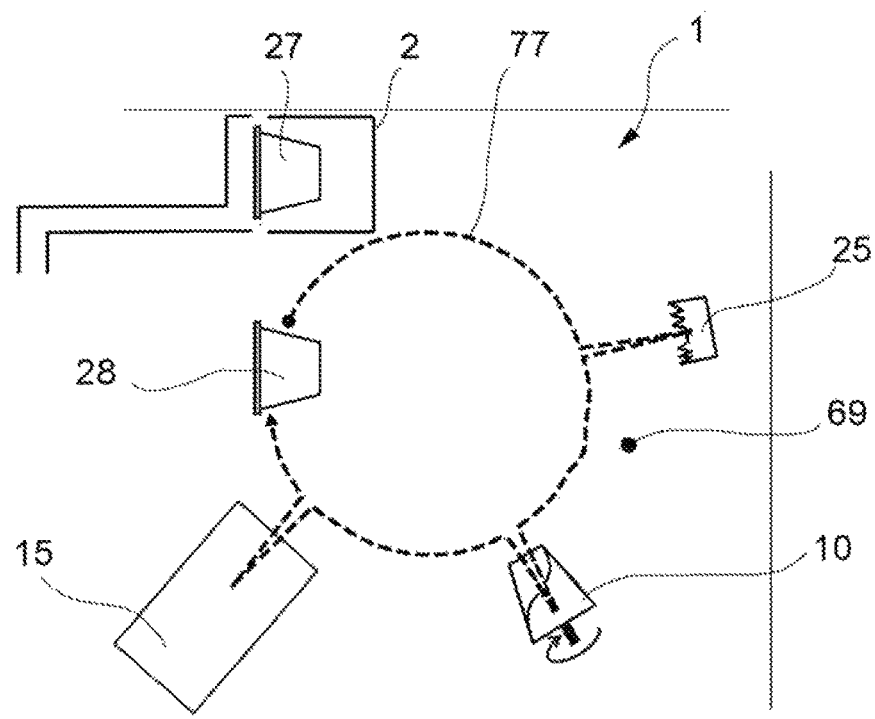
Figure 28:
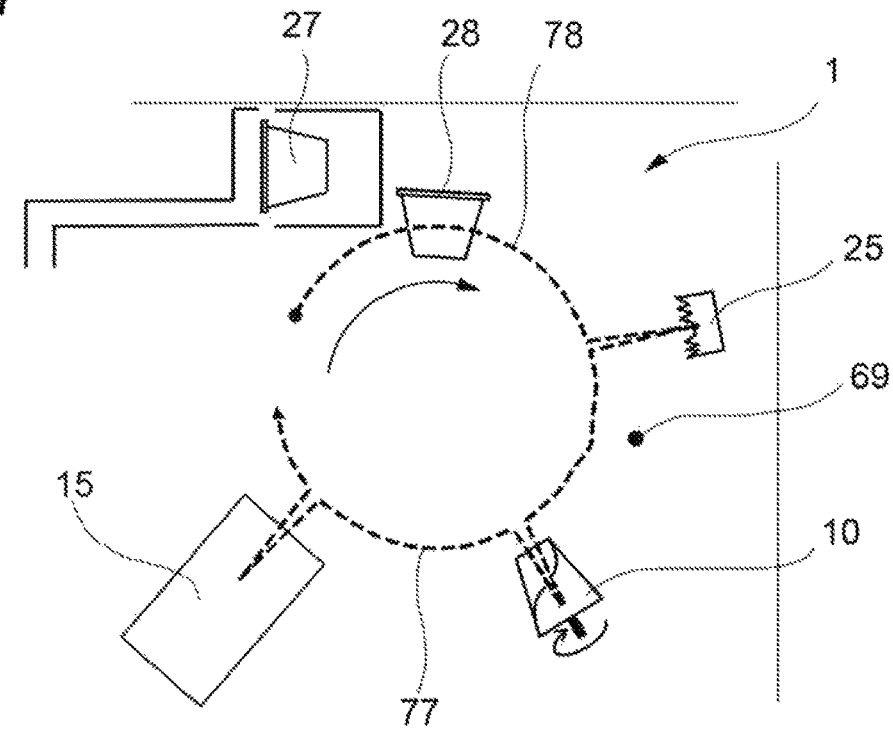
Figure 29:
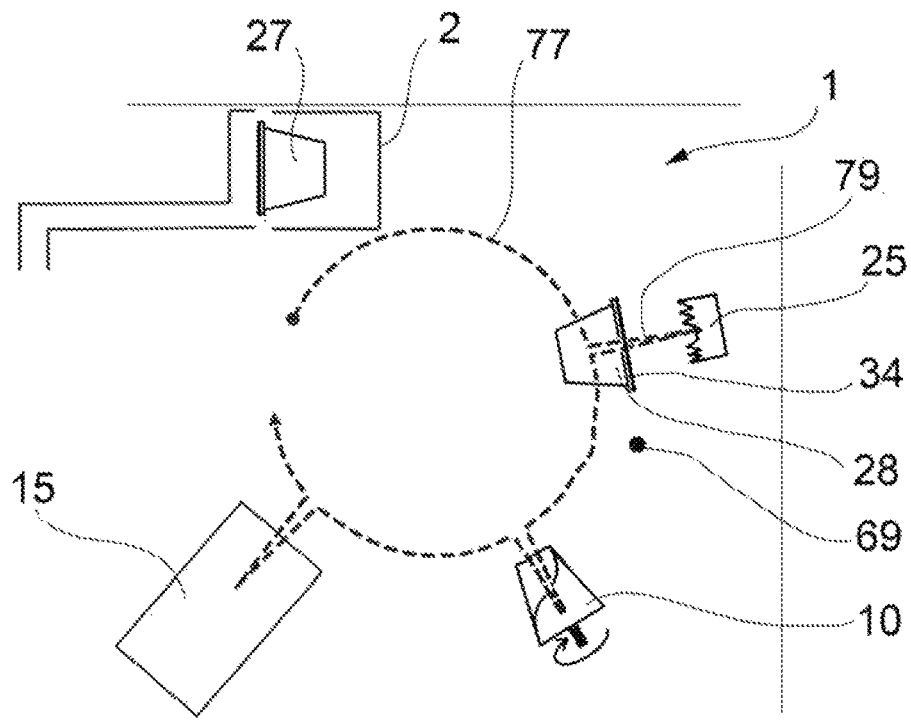
Figure 30:
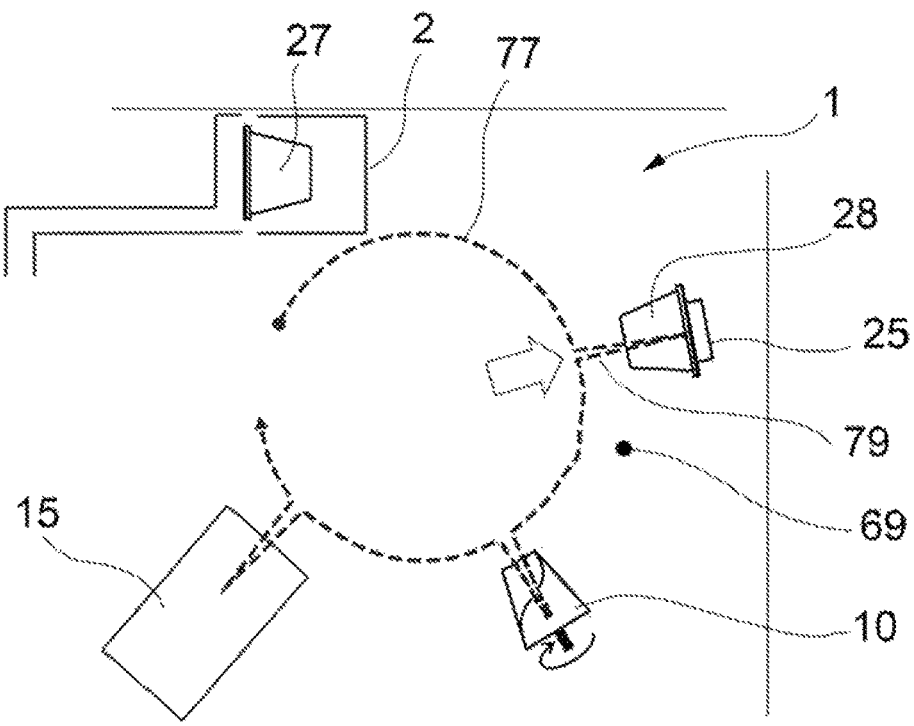
Figure 31:
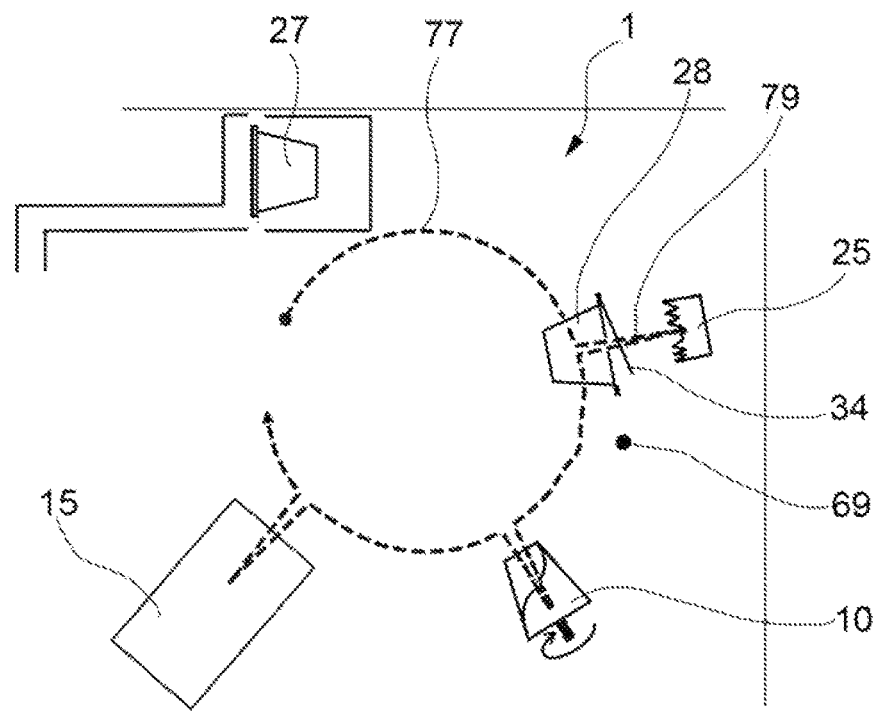
Figure 32:
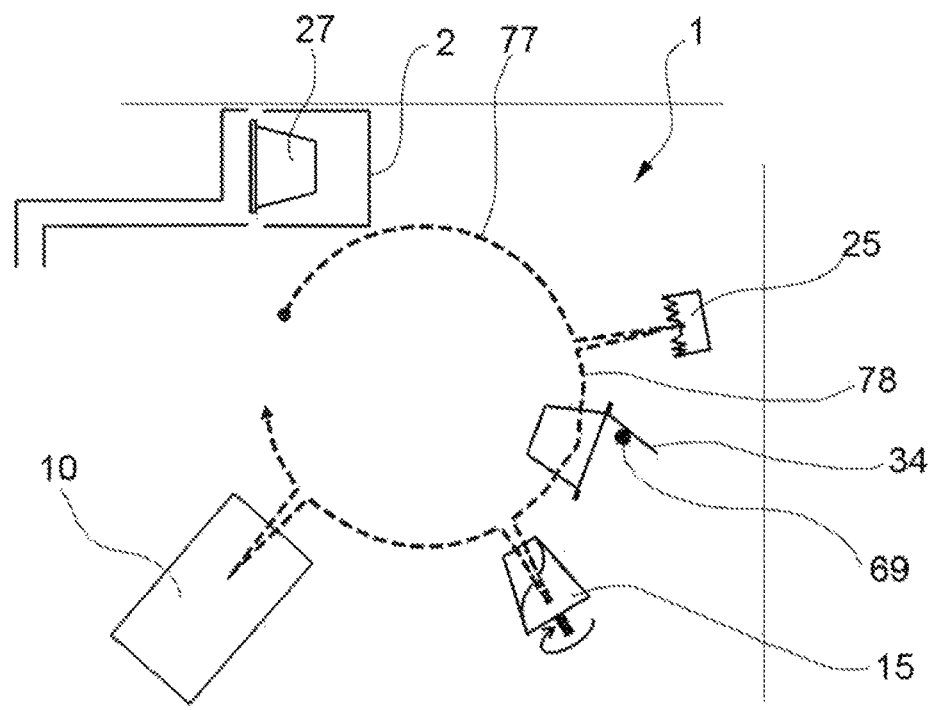
Figure 33:
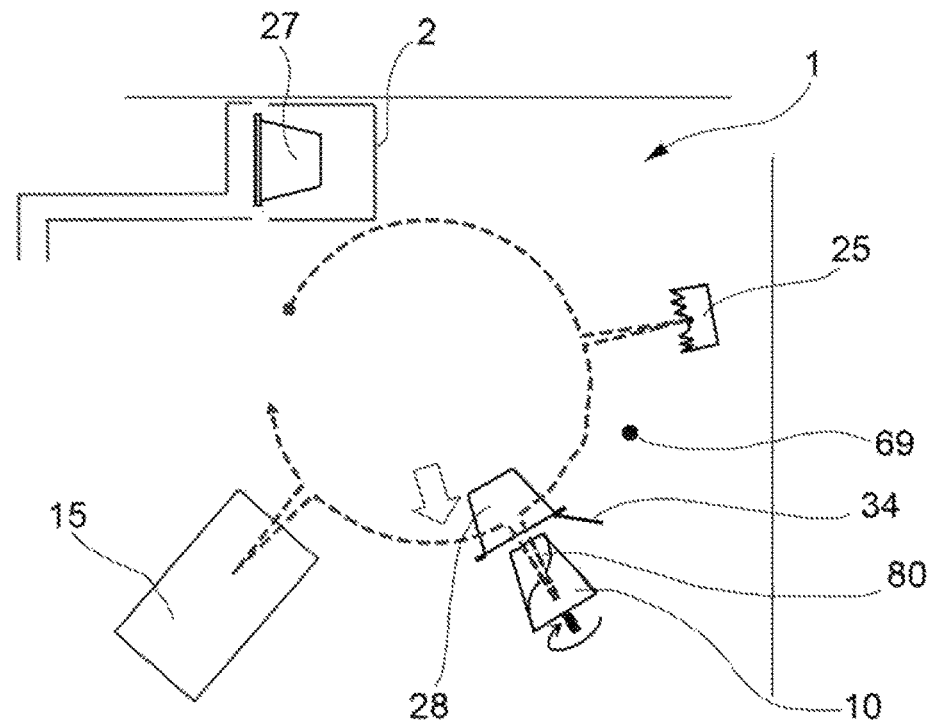
Figure 34:
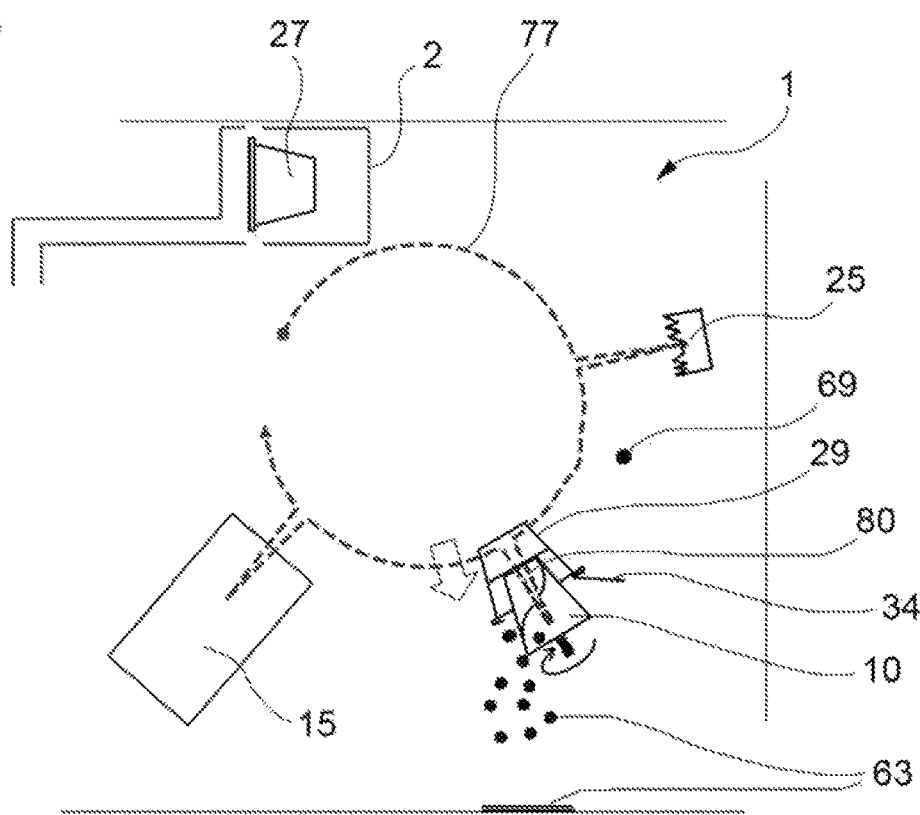
Figure 35:
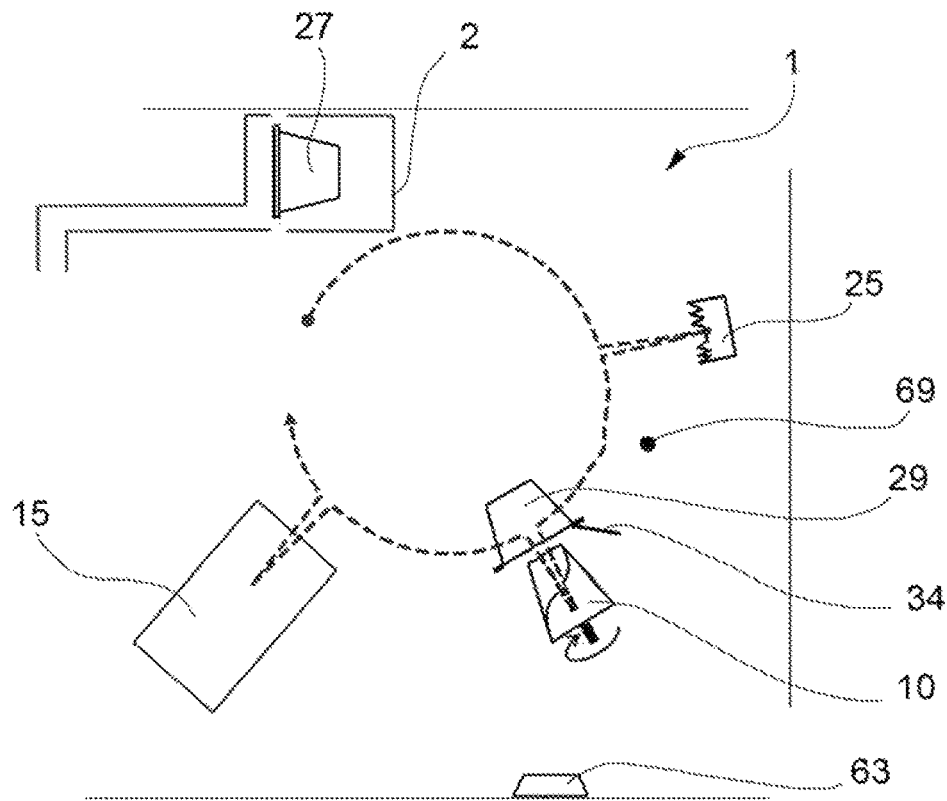
Figure 36:
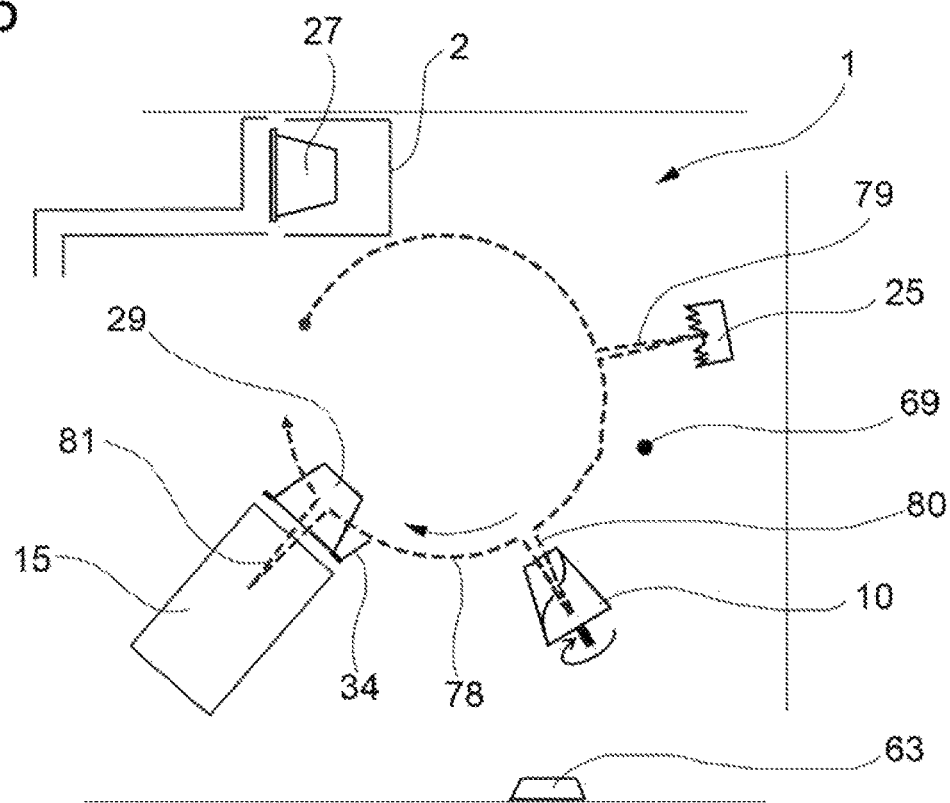
Figure 37:
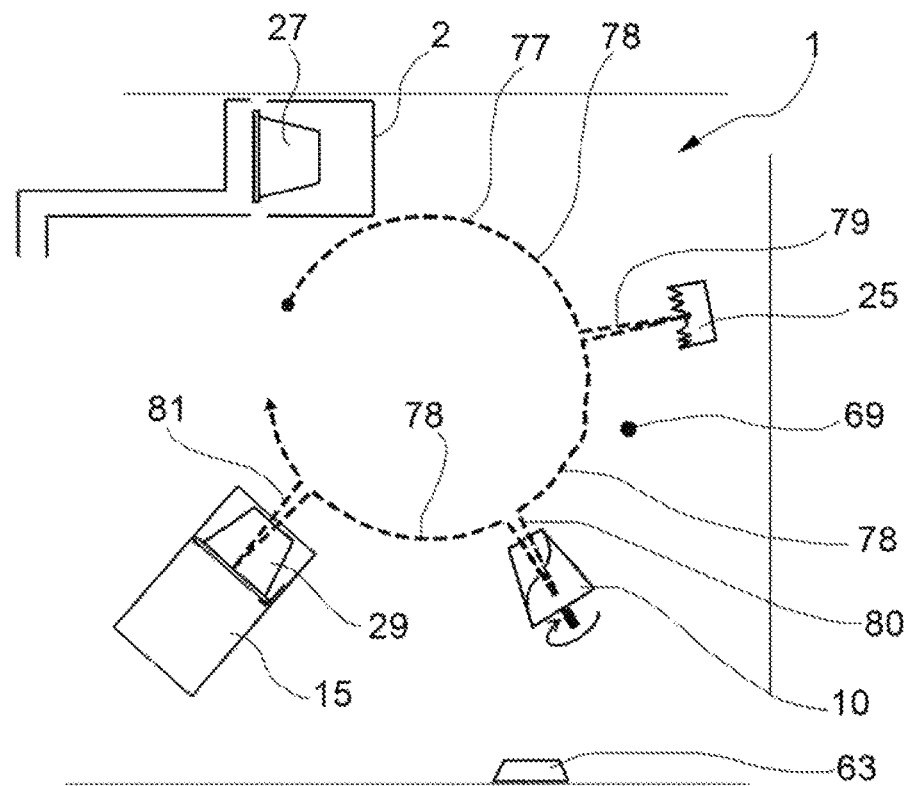
Figure 38:
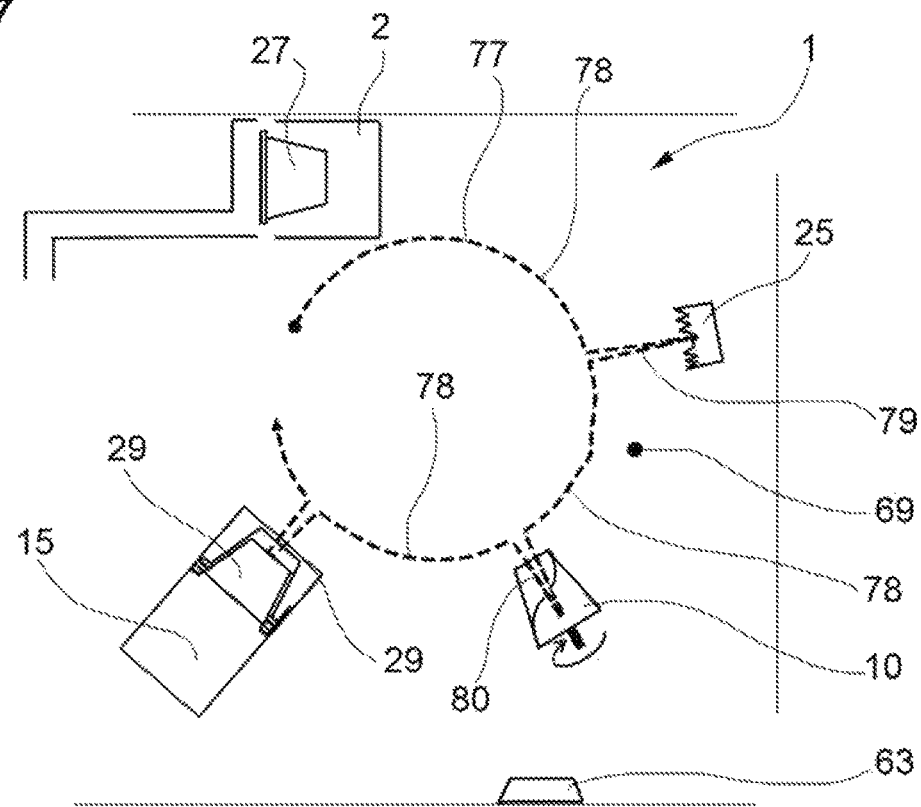
Figure 39:
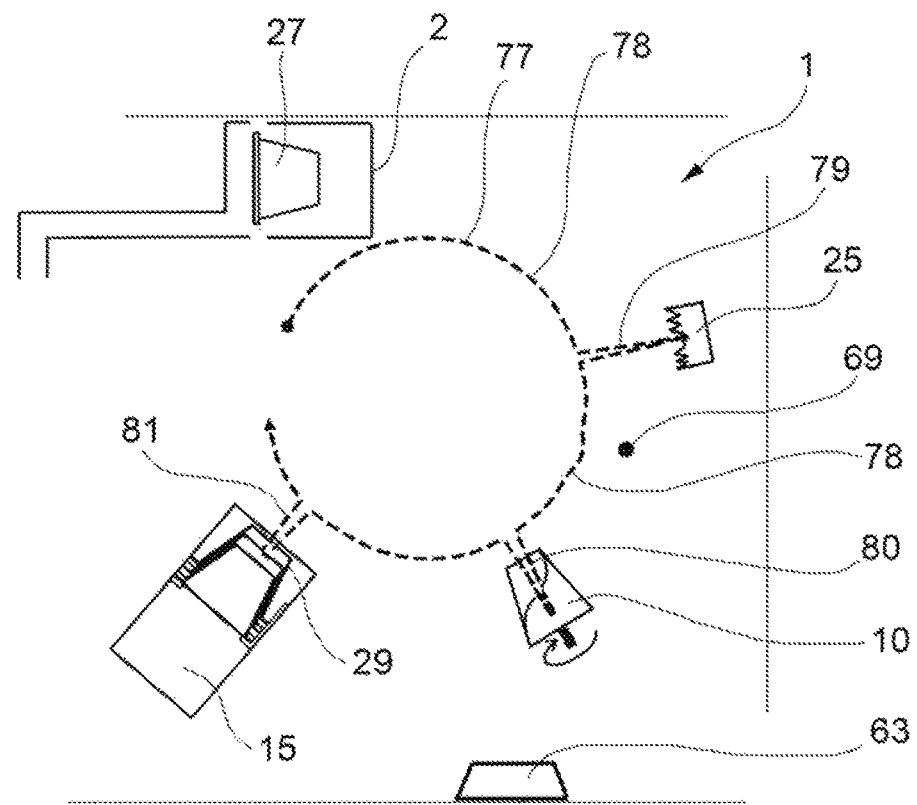
Figure 40:
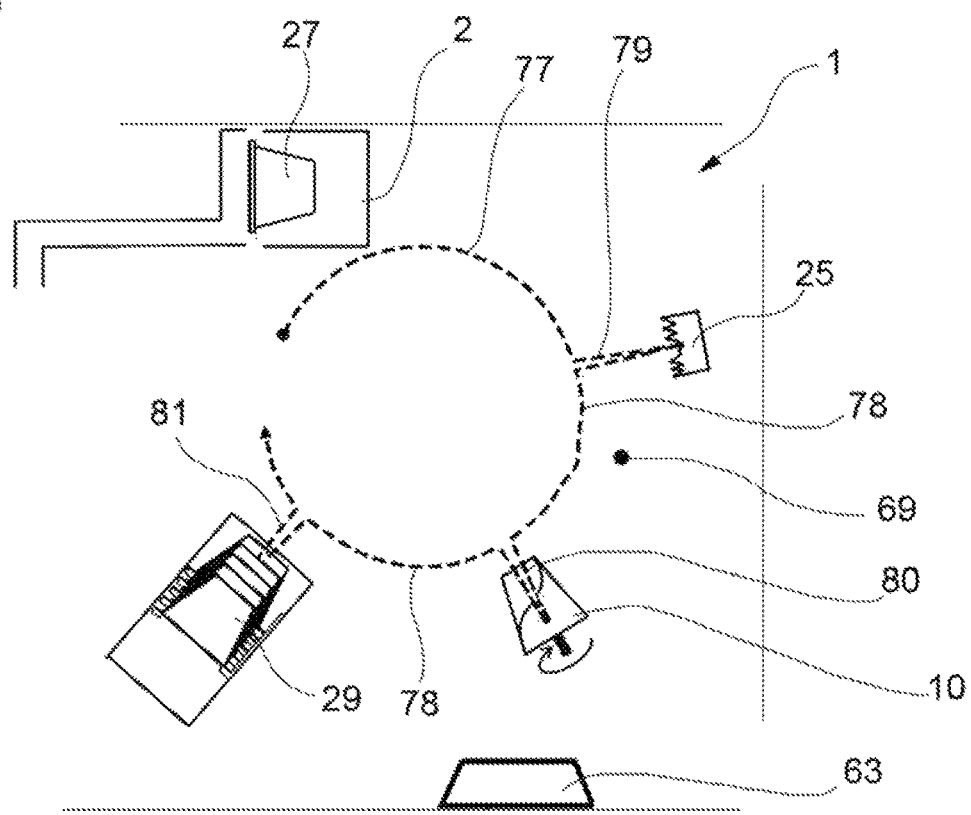
Figure 41:
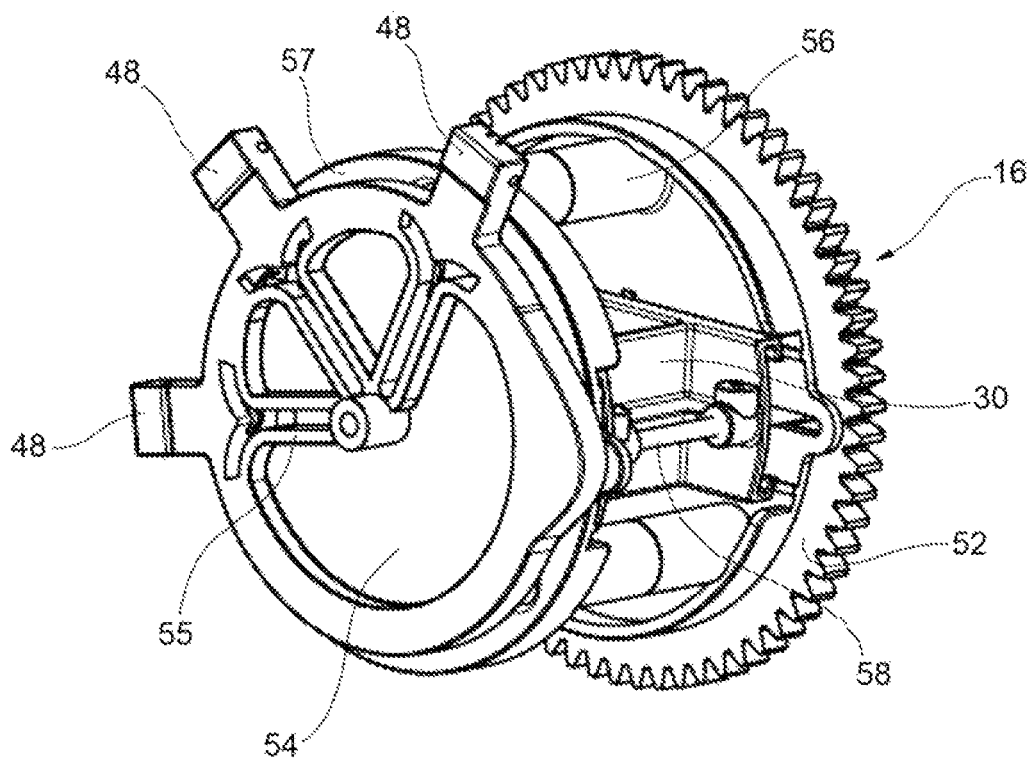
FIGS. 41 and 42 are axonometric views according to two opposing points of view of the used capsule moving assembly in FIG. 22.
Figure 42:
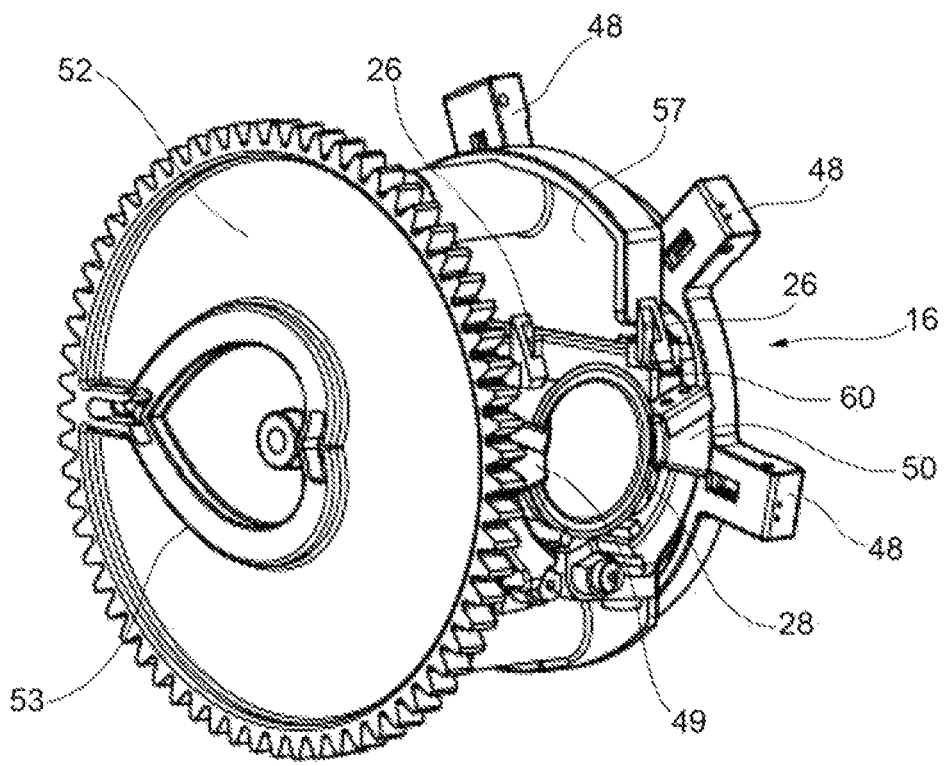
Figure 43:
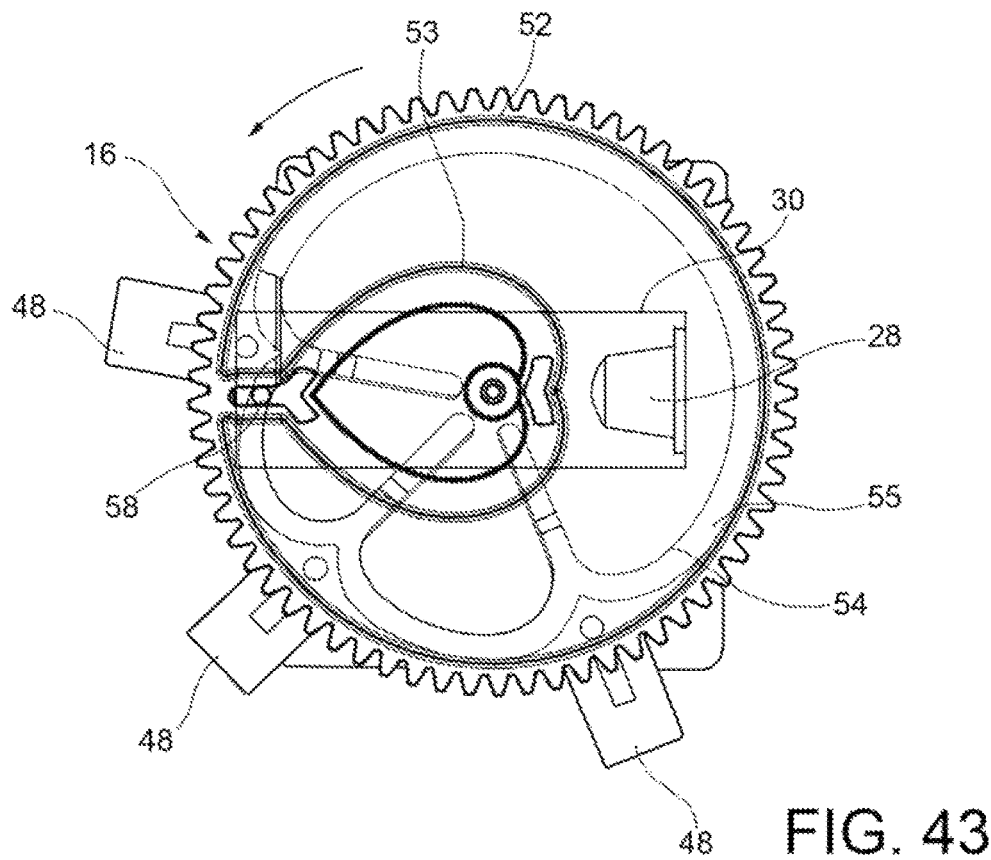
FIGS. 43 to 51 show partial views of different operation steps of the used capsule moving assembly for the rotation, feeding and retraction of the carriage which supports the capsule blocking device.
Figure 44:
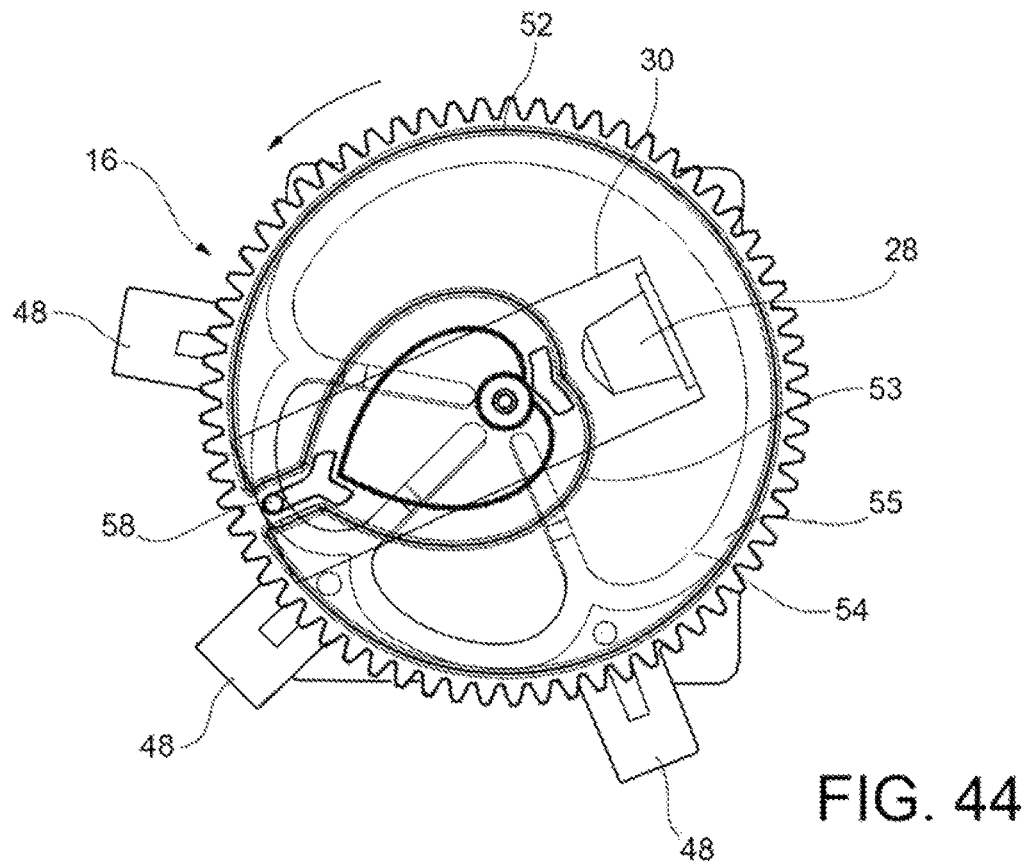
Figure 45:
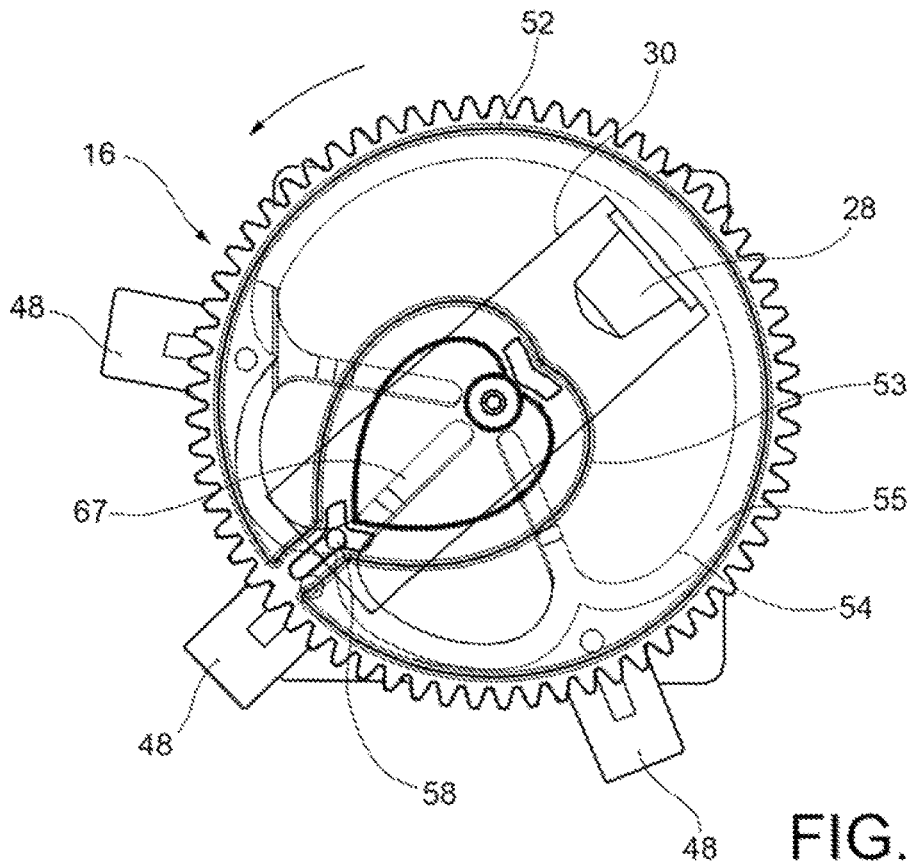
Figure 46:
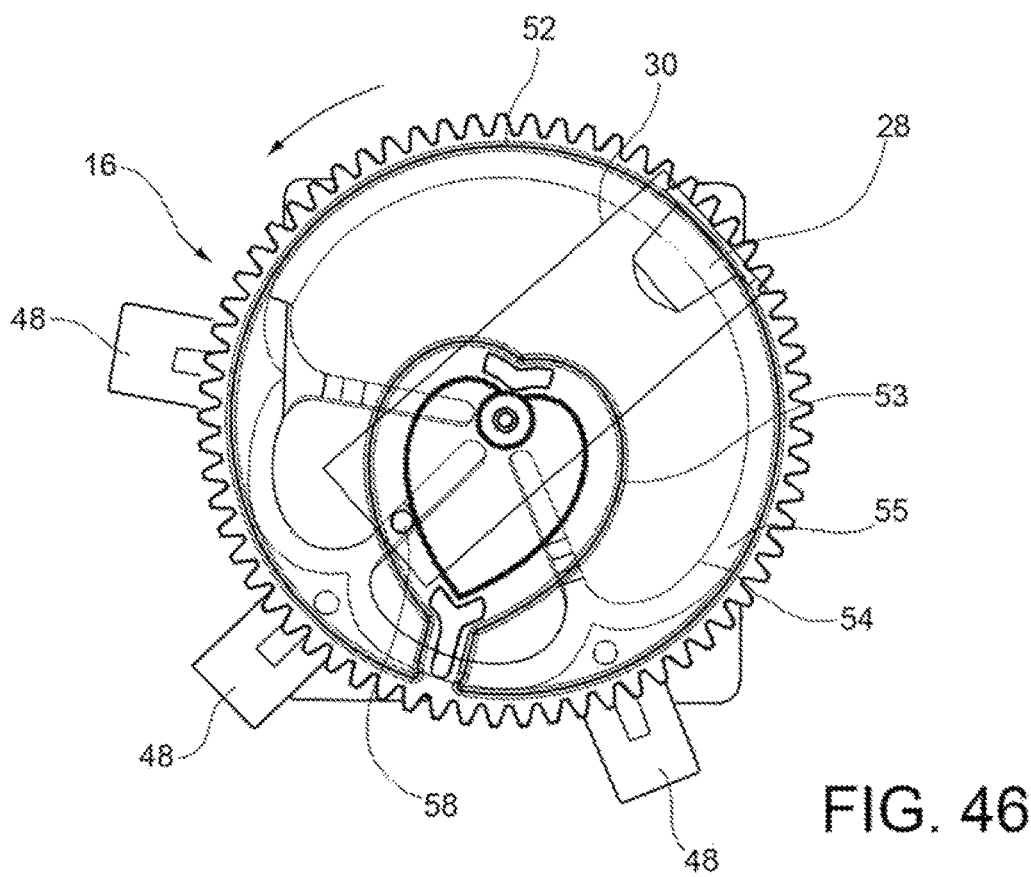
Figure 47:
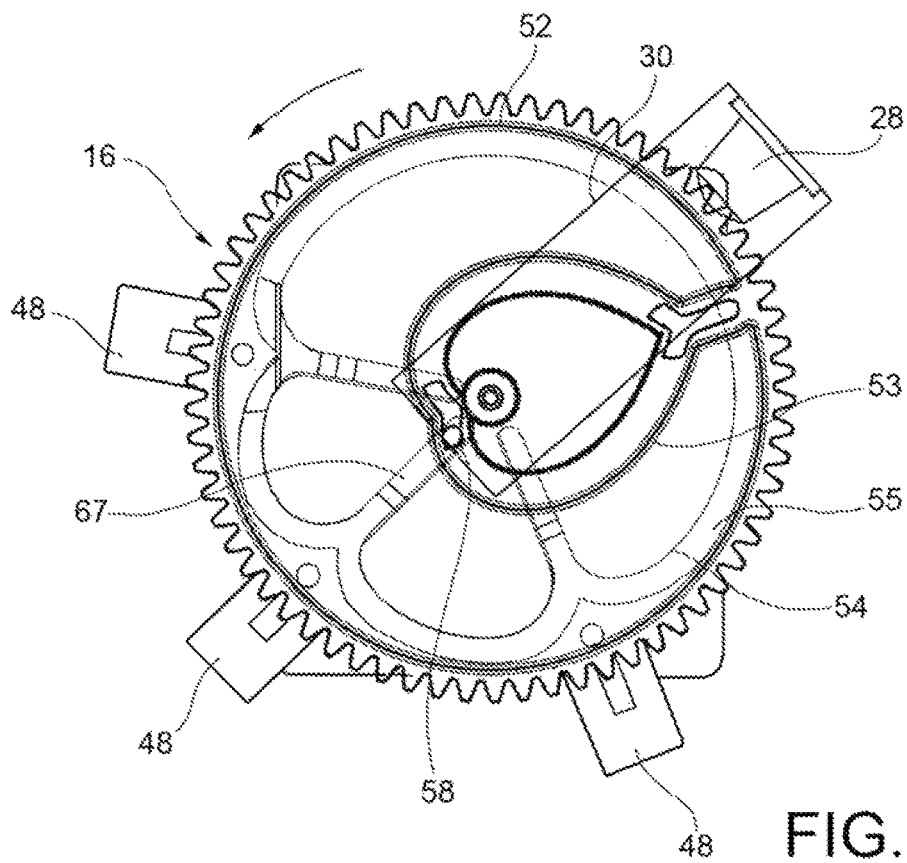
Figure 48:
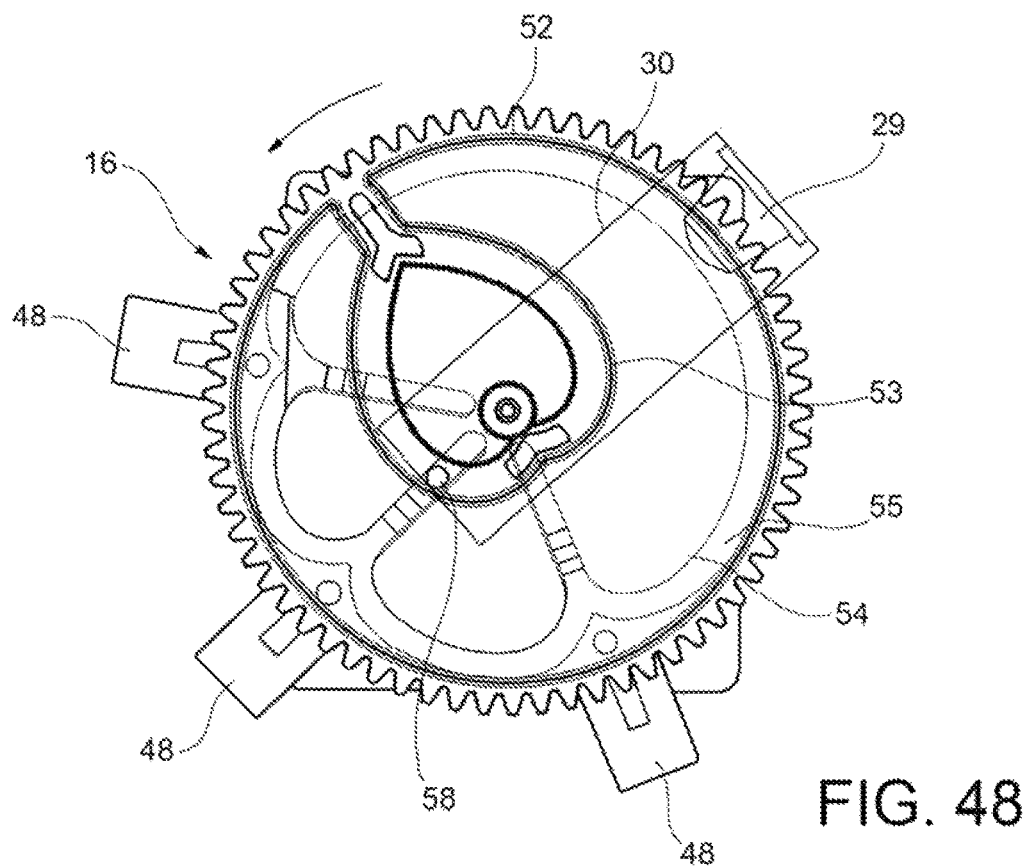
Figure 49:
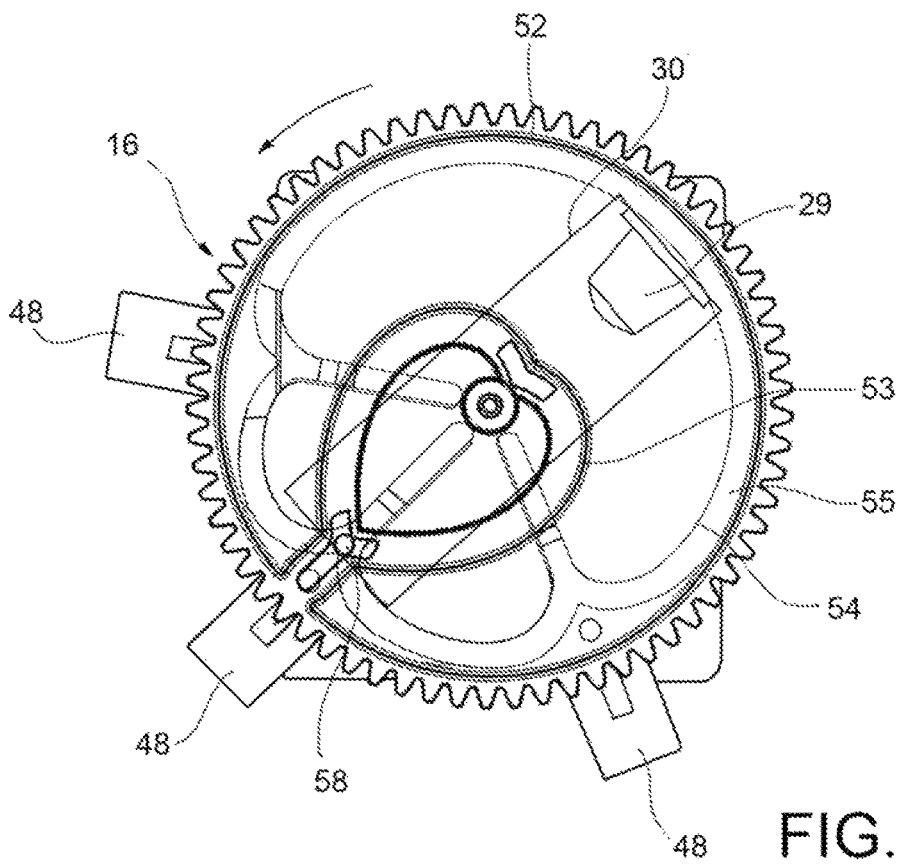
Figure 50:
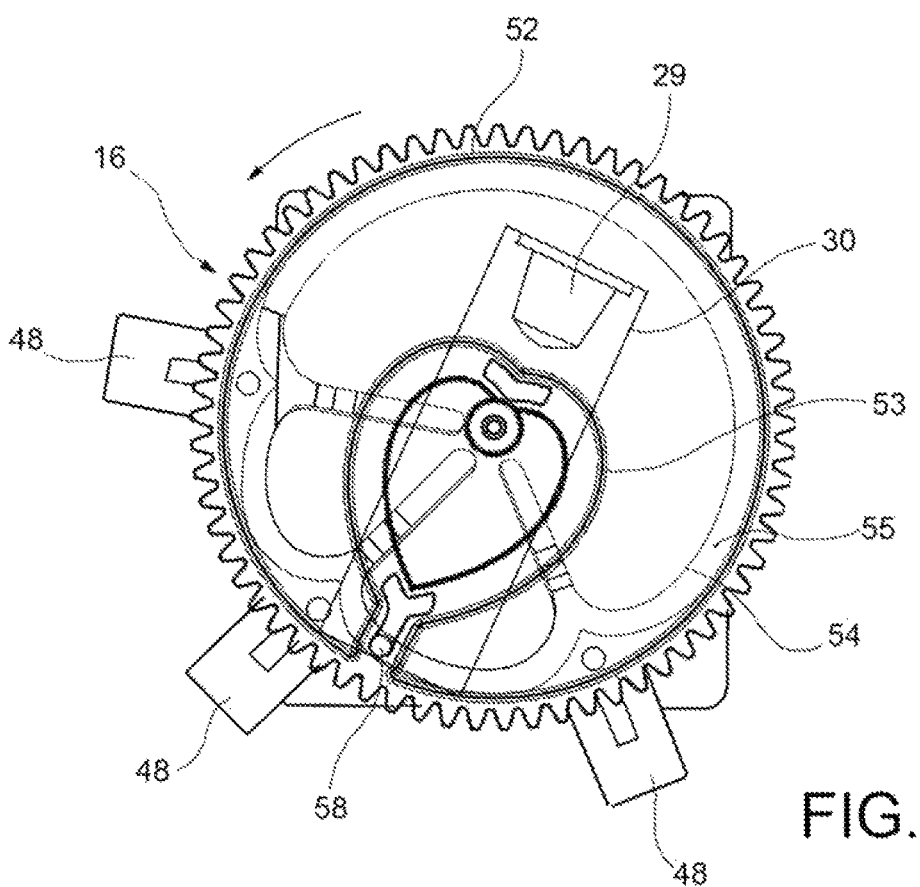
Figure 51:
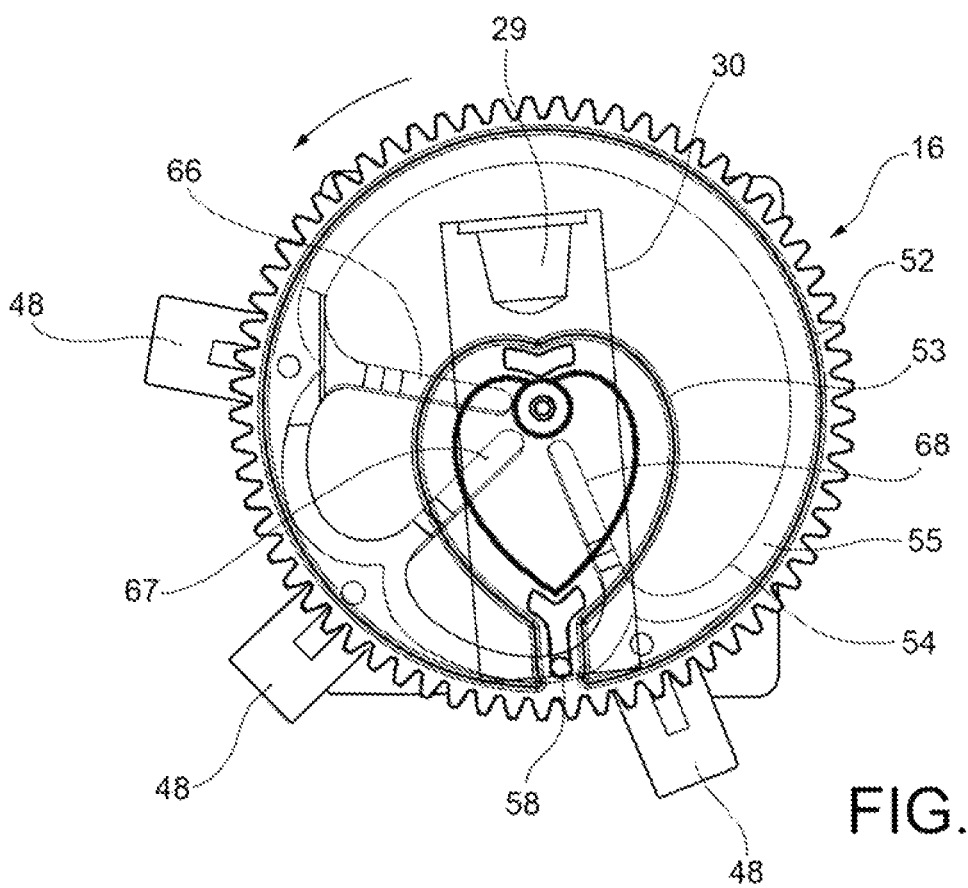
Figure 52:
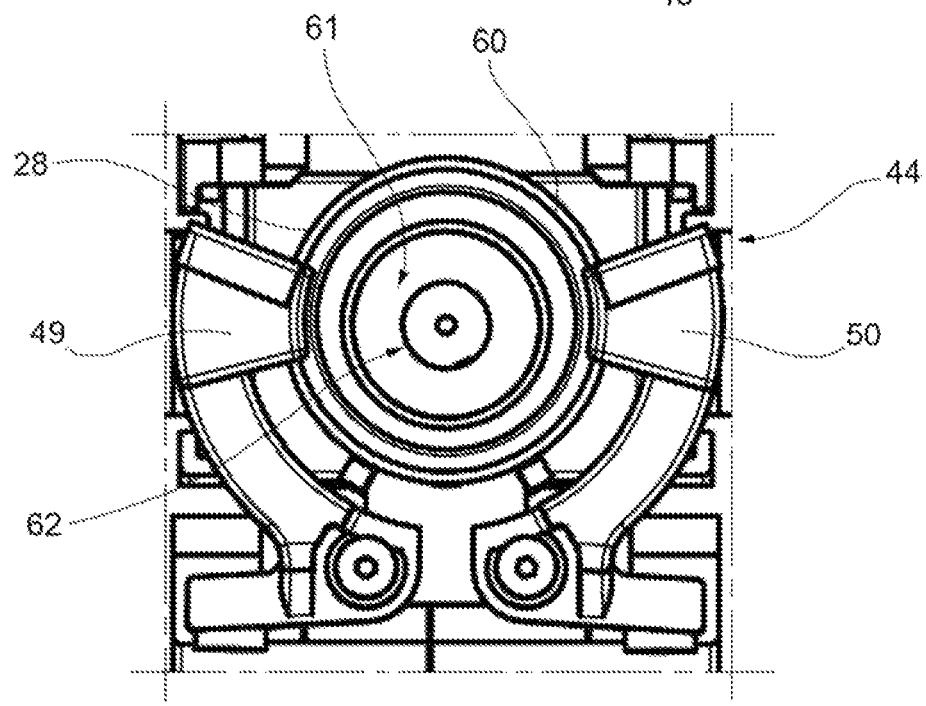
FIG. 52 is a front view of a detail of the capsule blocking device supported by a carriage.
Figure 53:
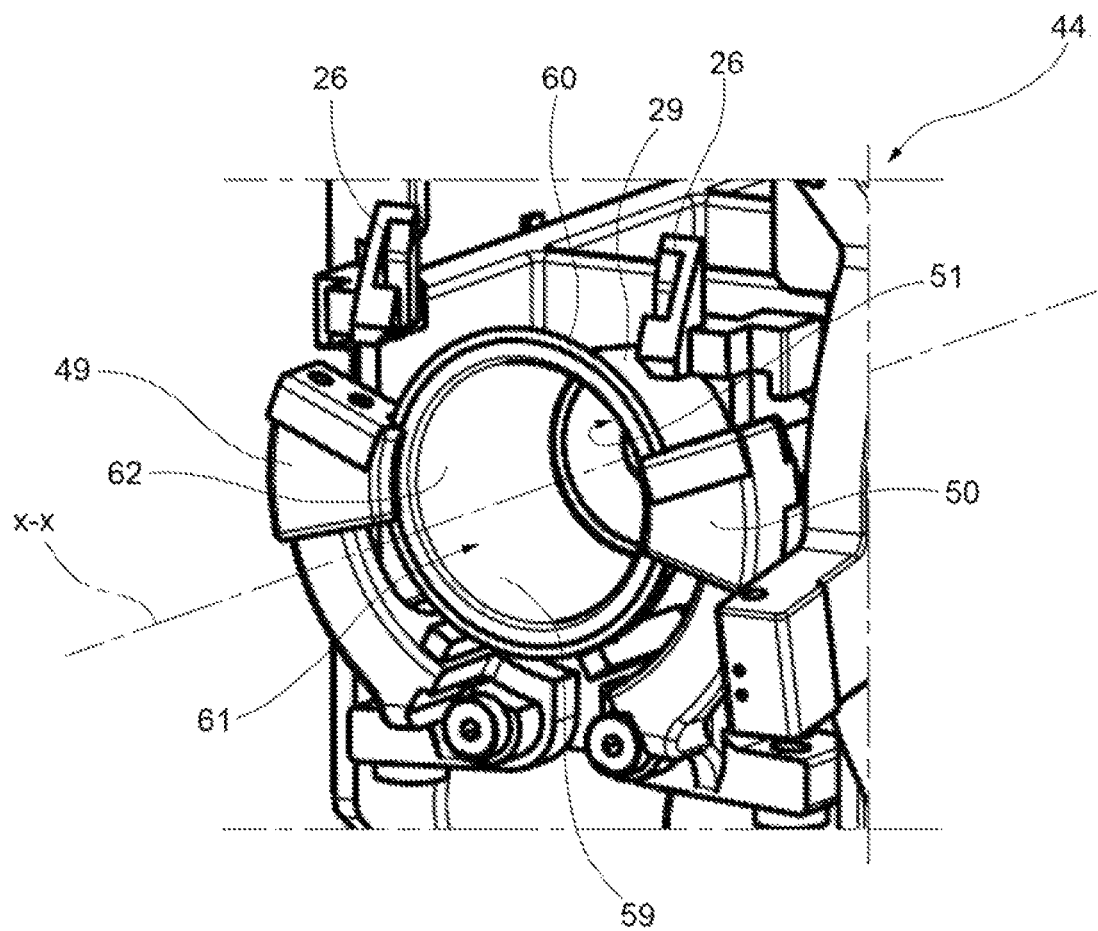
FIG. 53 shows an axonometric view of the detail of the capsule blocking device in FIG. 52.
Figure 54:
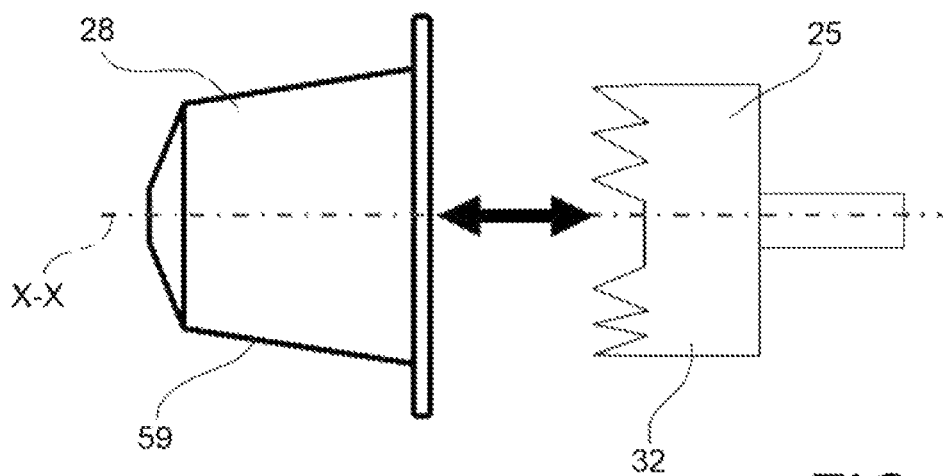
FIGS. 54 to 57 depict the different steps of opening a capsule via a linear movement of the capsule towards a knife so as to prevent each relative rotation between capsule and knife, where the steps of initial partial lifting of the cut capsule lid by at least one initial capsule lid lifting pin are highlighted.
Figure 55:
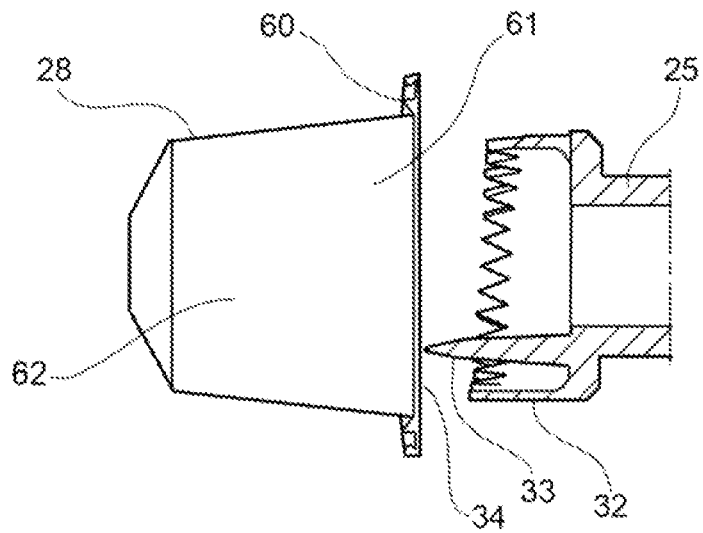
Figure 56:
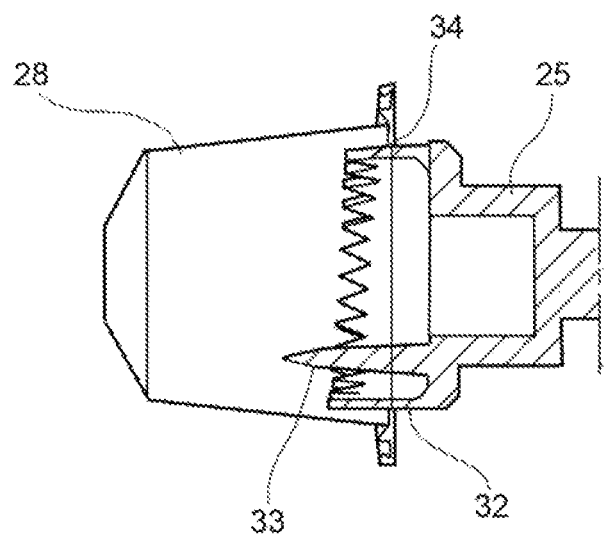
Figure 57:
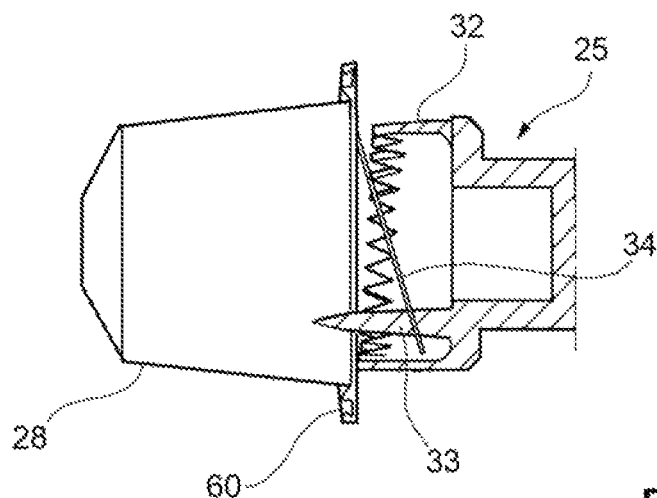
Figure 58:
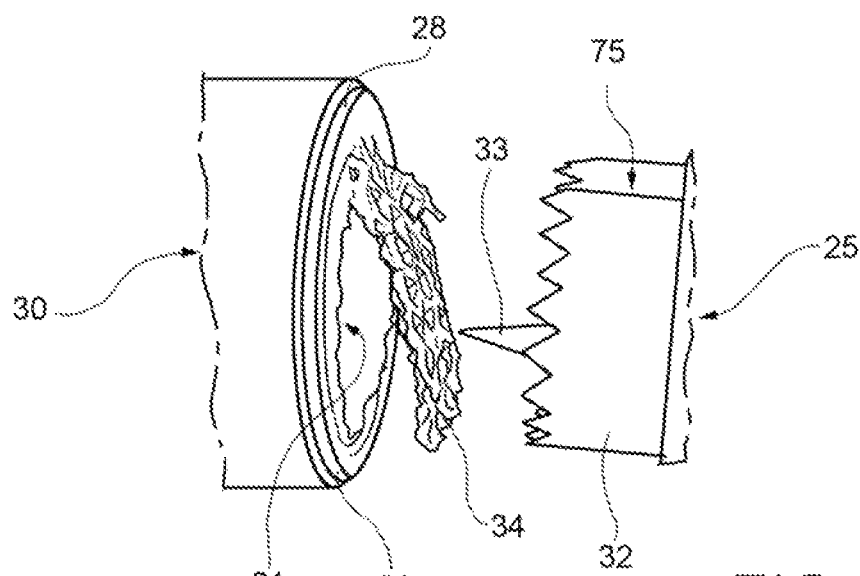
FIG. 58 is an axonometric view of a detail of the step of cutting and opening a capsule.
Figure 59:
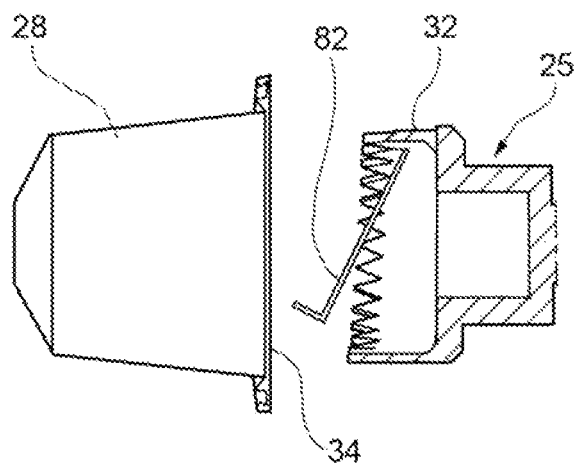
FIG. 59 shows a used capsule cutting device or used capsule opening device, comprising an initial capsule lid lifting spring.
Figure 60:
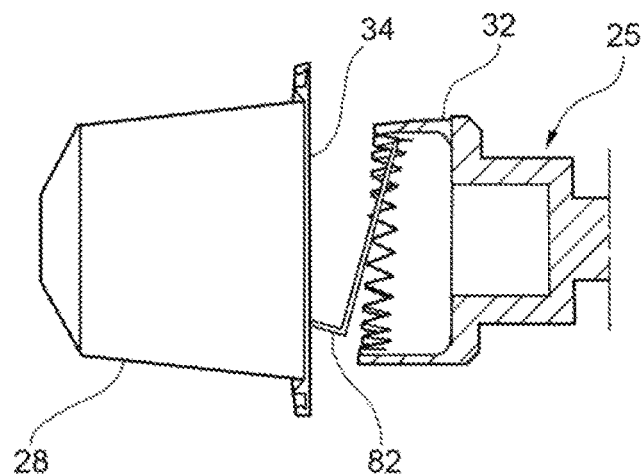
FIGS. 60 to 62 depicts the steps of opening a capsule lid by means of a device as shown in FIG. 59.
Figure 61:
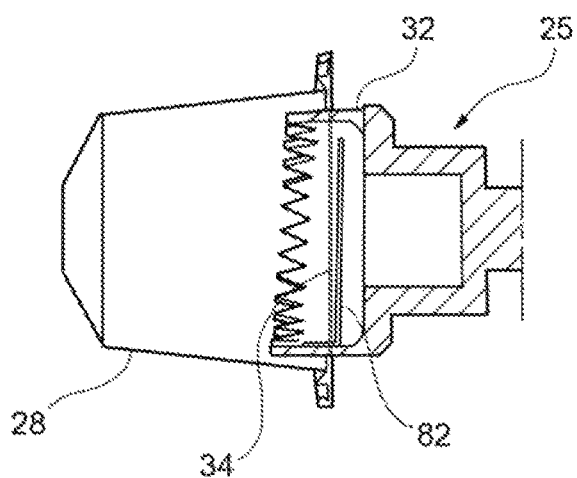
Figure 62:
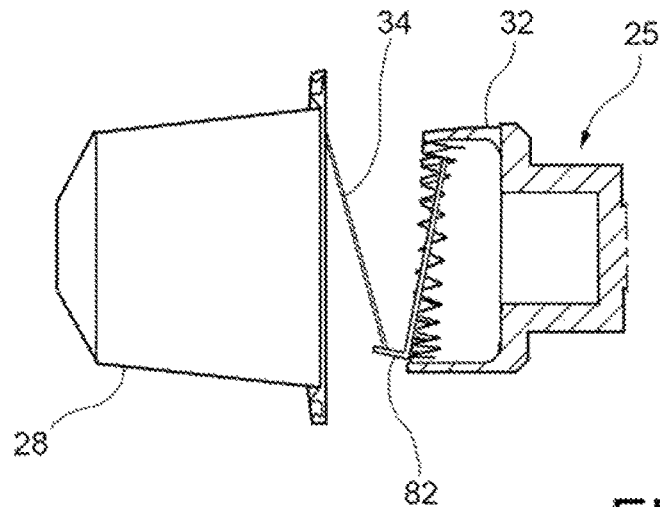
Figure 63:
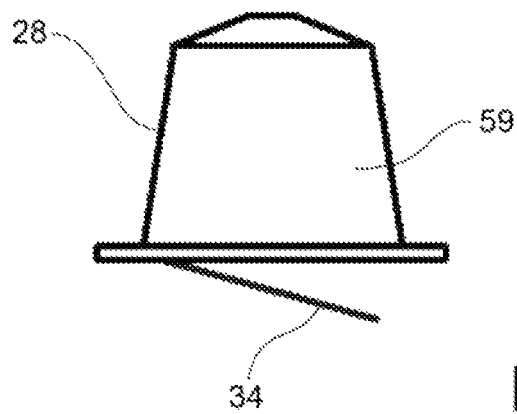
FIGS. 63 to 67 depict the steps of folding a cut and partially open lid by means of a cut capsule lid folding device.
Figure 64:
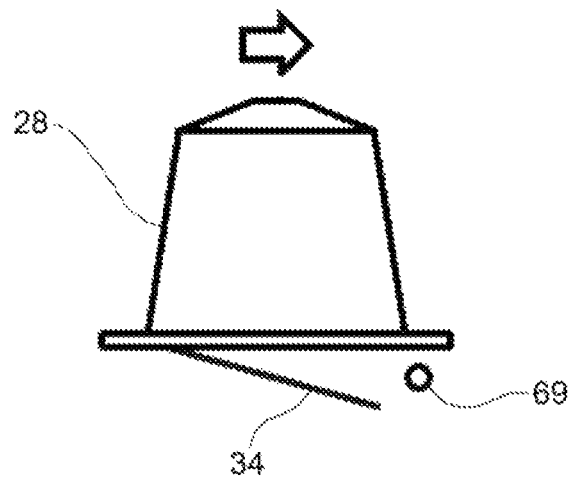
Figure 65:
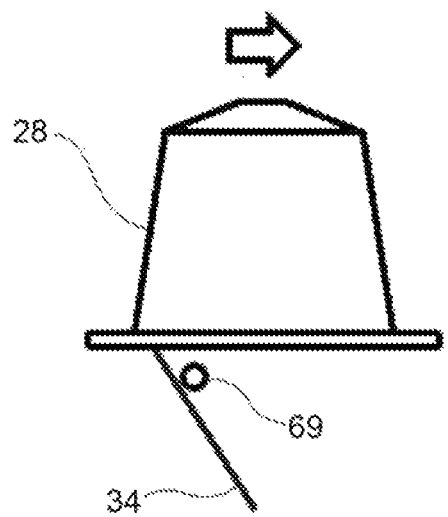
Figure 66:
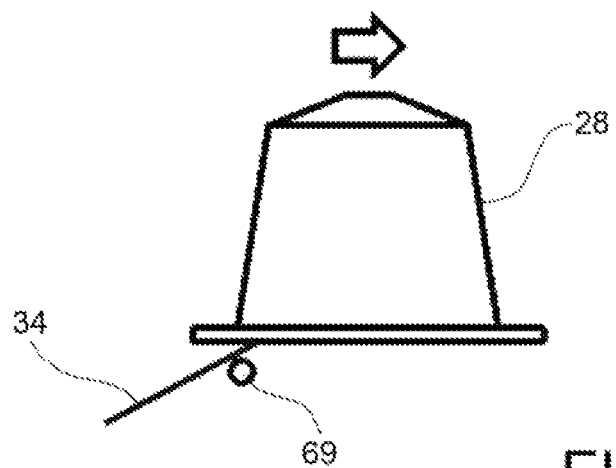
Figure 67:
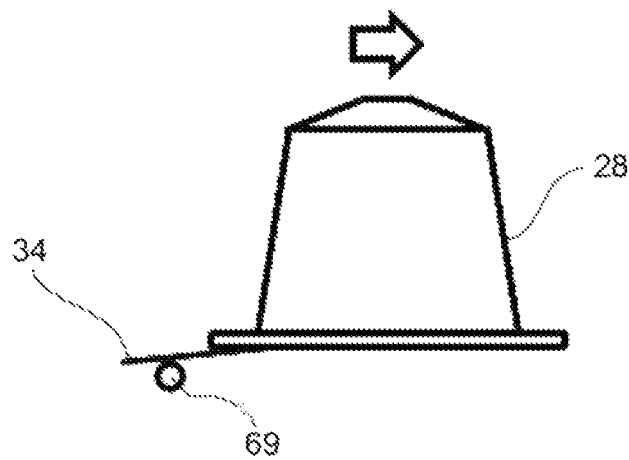
Figure 68:
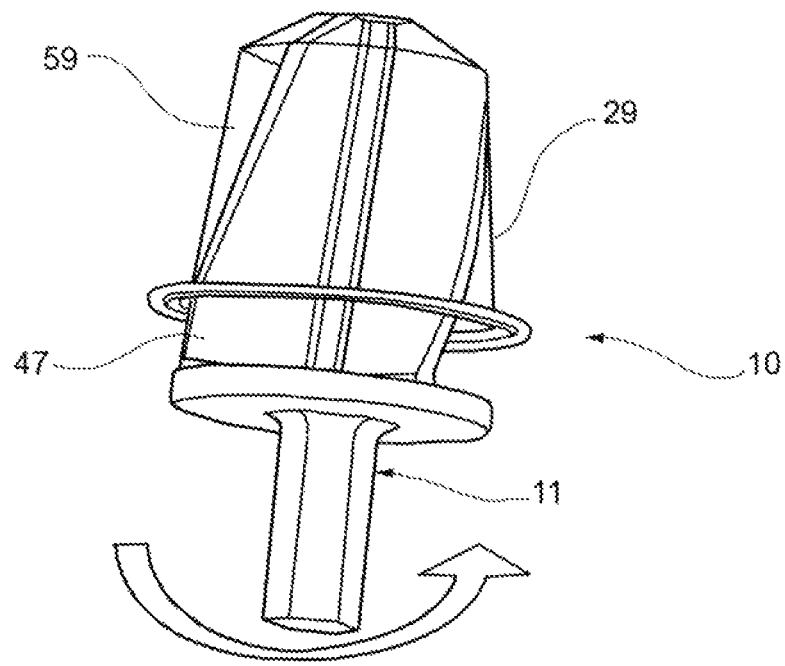
FIG. 68 shows a step of emptying a used and opened capsule, where the capsule is depicted partially transparent.
Figure 69:
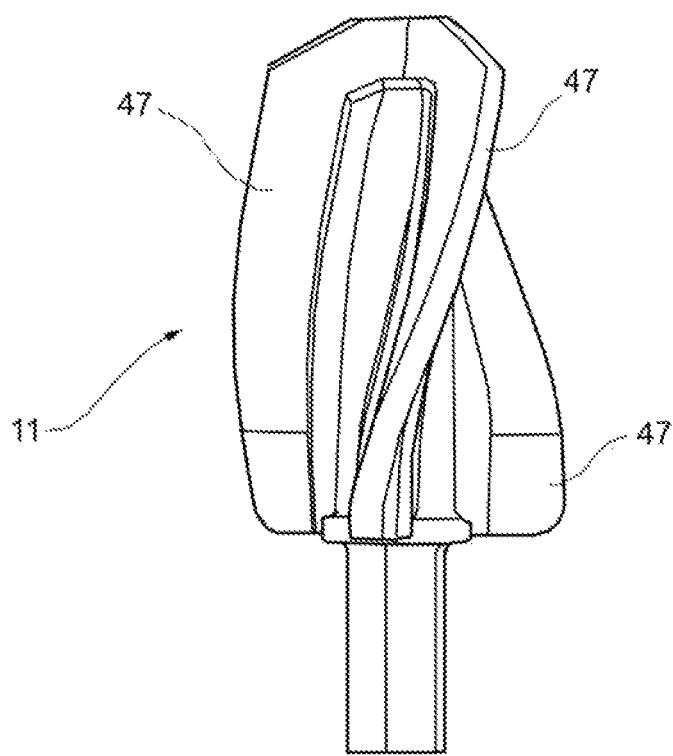
FIGS. 69 and 70 depict axonometric views of a scraper of an emptying device.
Figure 70:
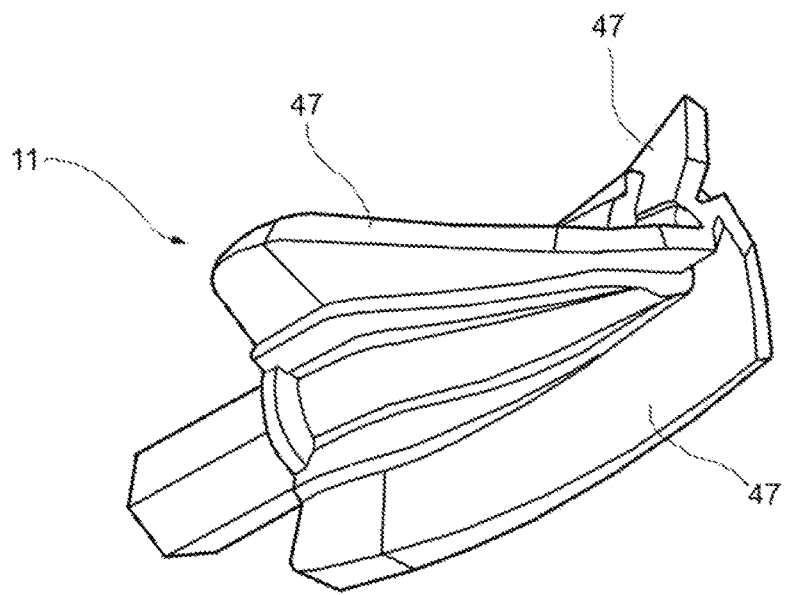
Figure 71:
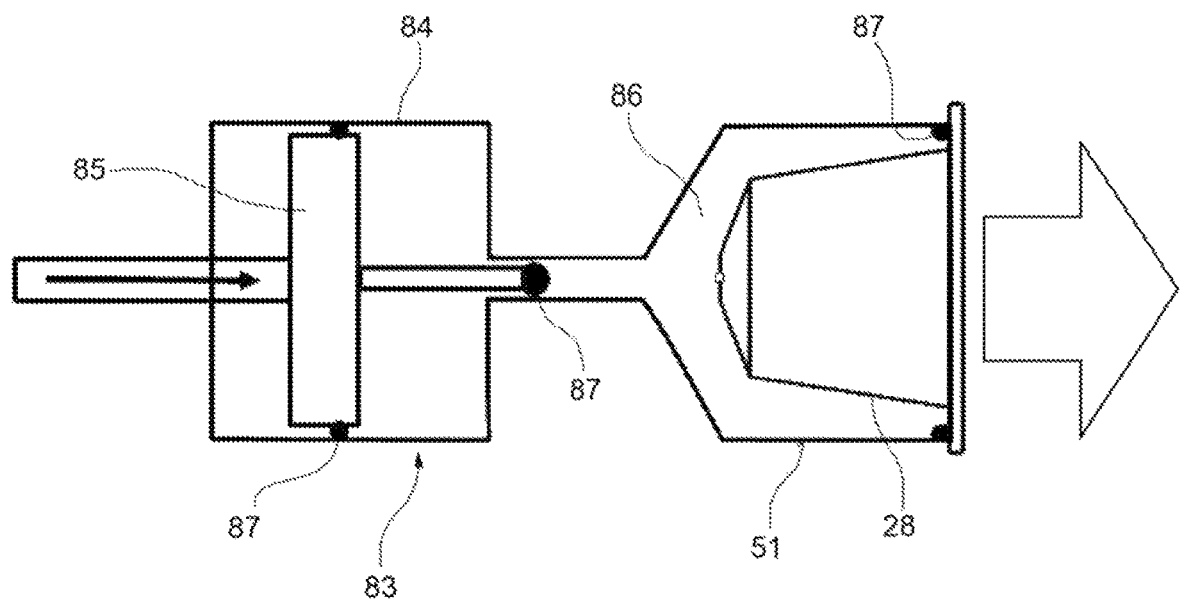
FIG. 71 shows a capsule emptying device comprising a pneumatic device.
Figure 72:
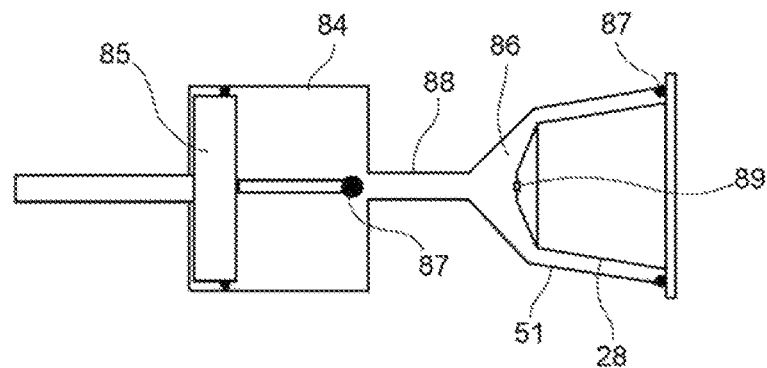
FIGS. 72 to 75 show the steps of operating the emptying device in FIG. 71.
Figure 73:
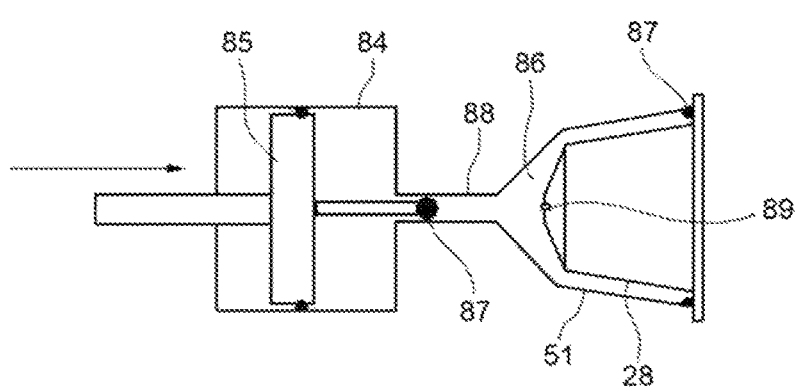
Figure 74:
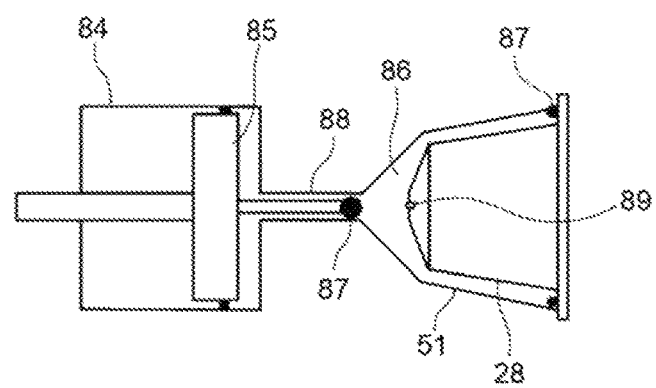
Figure 75:
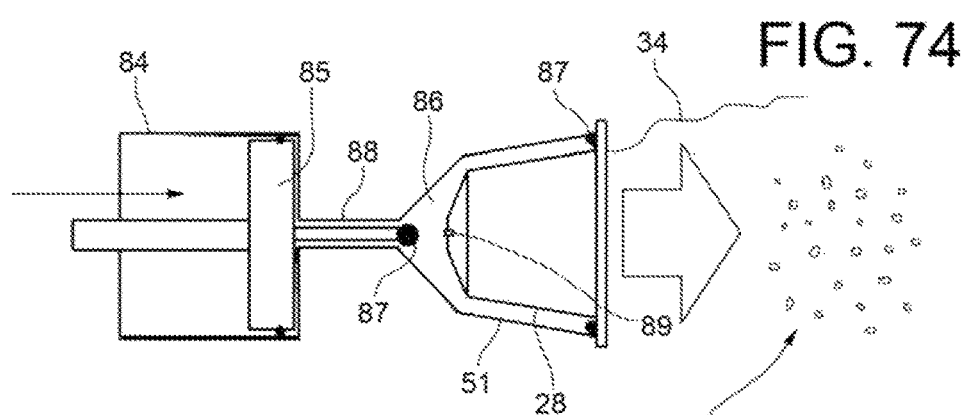
Figure 76:
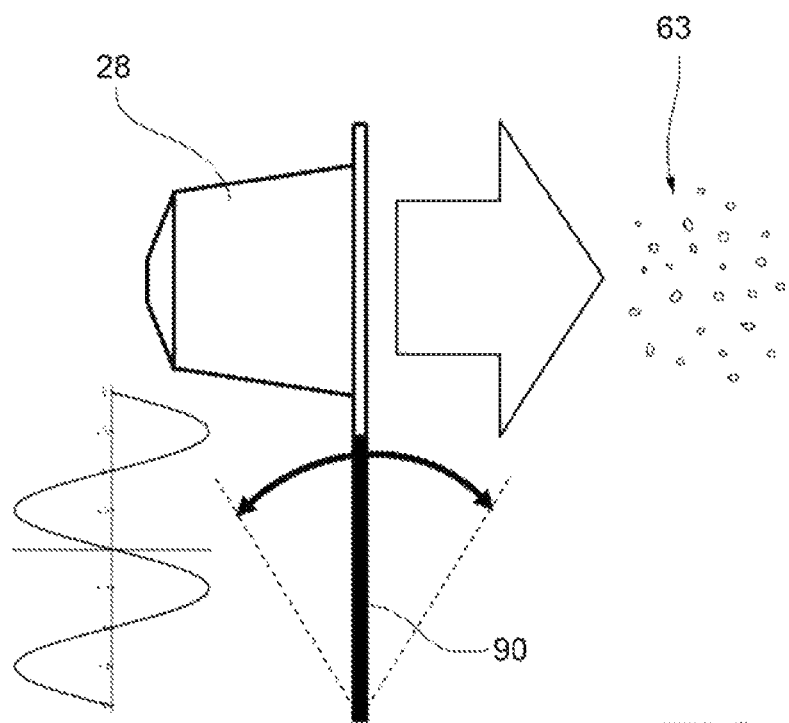
FIG. 76 diagrammatically depicts a device for emptying the contents of a used and opened capsule by vibration.
Figure 77:
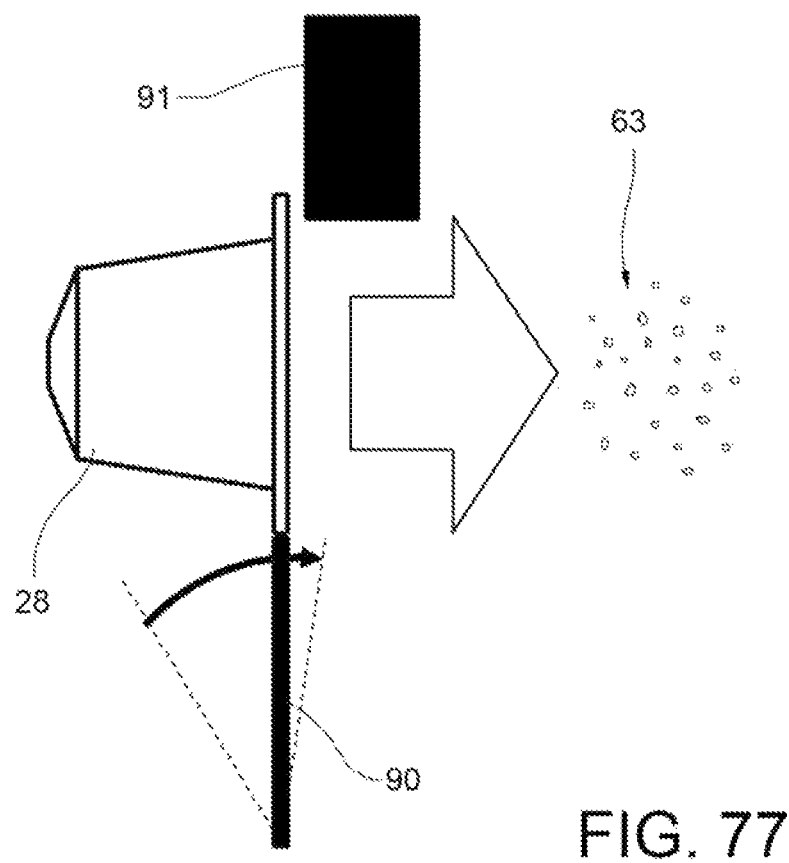
FIG. 77 diagrammatically shows a device for emptying the contents of a used and opened capsule by means of the impact against an abutment stop for a shaking device.

According to a general embodiment, a machine for extracting a beverage, e.g. coffee 1, is provided (FIG. 1).

This machine has an opening and closing mechanism 2 which allows an extraction chamber 3 to be accessed.

The machine has a beverage dispensing spout 4 to drop the extract into a cup (not shown), which cup is usually placed on an underlying cup-holding surface 6 provided above a liquid collection bowl 7.

Said machine has a machine case 8 within which a fluid pump 22 is provided, being fluidly connected in delivery to a heater 23 connected, in turn, to the extraction chamber 3.

Said fluid pump is fluidly connected in suction to a fluid reservoir 9, usually accessible from the outside.

Machine 1 is adapted to extract a beverage from a capsule 27.

When the extraction ends, the used capsule 28 is released from the chamber extraction 3 in a used capsule disposal assembly 96 placed below in order to open the capsule, extract the used content thereof and collect the opened and emptied used capsule 29.

Said capsule has a capsule lid 34 which closes on a capsule edge 60 of a capsule body 59. Through said lid, through a capsule opening 61, access is gained to a capsule chamber 62 containing the substance to be extracted, for example used ground coffee 63.

Said capsule, and in particular said capsule body, extends about a longitudinal capsule body axis X-X, said capsule opening being substantially transverse to said axis.

Said machine 1 comprises a fixed frame 18 inside said machine case 8. Said frame comprises fixed frame guides 70 adapted to slide an extractable frame 17 in front of the machine itself, so as to extract some components of the machine from the case for maintaining and cleaning them.

Said extractable frame 17 comprises extractable frame counter-guides, or extractable frame shoes 71, which slide on fixed frame guides 70.

Said extractable frame 17 also comprises frame sliders 35.

An extracted and used coffee collection bowl 13 and a used capsule collection bowl 5 are encompassed inside machine 1 (FIGS. 2-3 and 20-21).

A coffee collection bowl sliding counter-guide or coffee collection bowl shoes 36 and emptied capsule collection guide 40 slide on said frame sliders 35 of the extractable frame 17.

A used capsule disposal assembly 96 is supported by said frame.

Said used capsule disposal assembly 96 comprises a used capsule moving assembly 97, a used capsule opening assembly 73, a used capsule emptying assembly 94 and a used capsule collecting assembly 95.

Said used capsule moving assembly 97 (FIGS. 22-51) comprises a used capsule moving device or picking and moving device 16.

Said used capsule moving device or picking and moving device 16 is operatively connected to an actuation device, e.g. the electric motor 19.

Said actuation device 19 is operatively connected to a primary transmission 20, and the latter moves said used capsule moving device or picking and moving device 16 by means of a moving device transmission 24.

Said used capsule moving device or picking and moving device 16 comprises a carriage 30.

Said carriage 30 supports a device 44 for blocking the capsule to the carriage, which comprises a first blocking device arm 49 and a second blocking device arm 50, defining a used capsule seat or locking seat 51, in the drawings also indicated in a different embodiment by reference numeral 65.

According to an embodiment, said first and second blocking device arms 49, 50 comprise anti-rotation blades 112 which grasp the edge of said capsule 27 or 28 and keep it in place even during the action of the emptying device 10.

Figure 92:
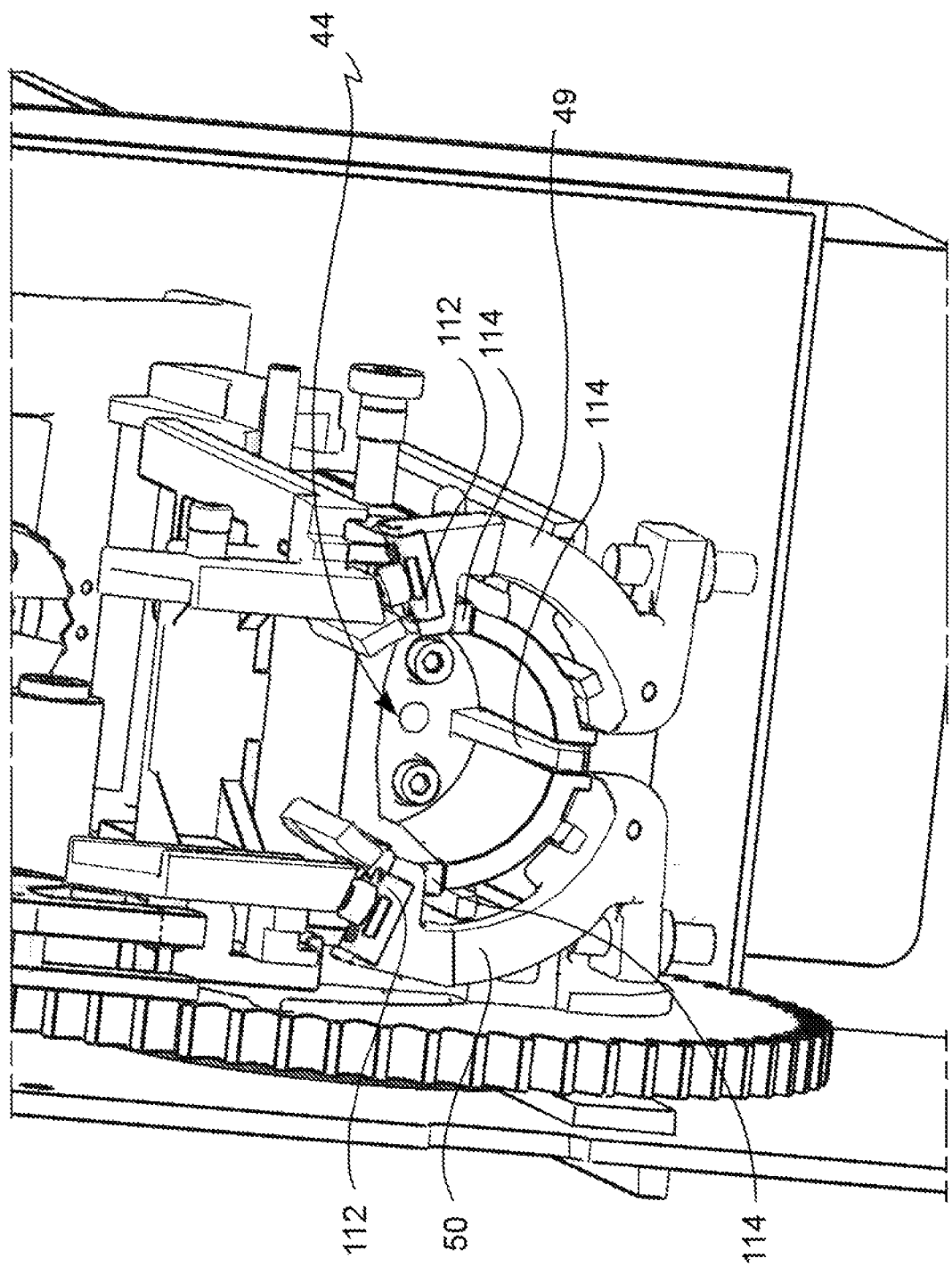
FIGS. 92, 93 and 94 show an axonometric view, a front view and an axonometric view with discrete parts of a detail of the device for blocking the capsule to the carriage.
Figure 93:
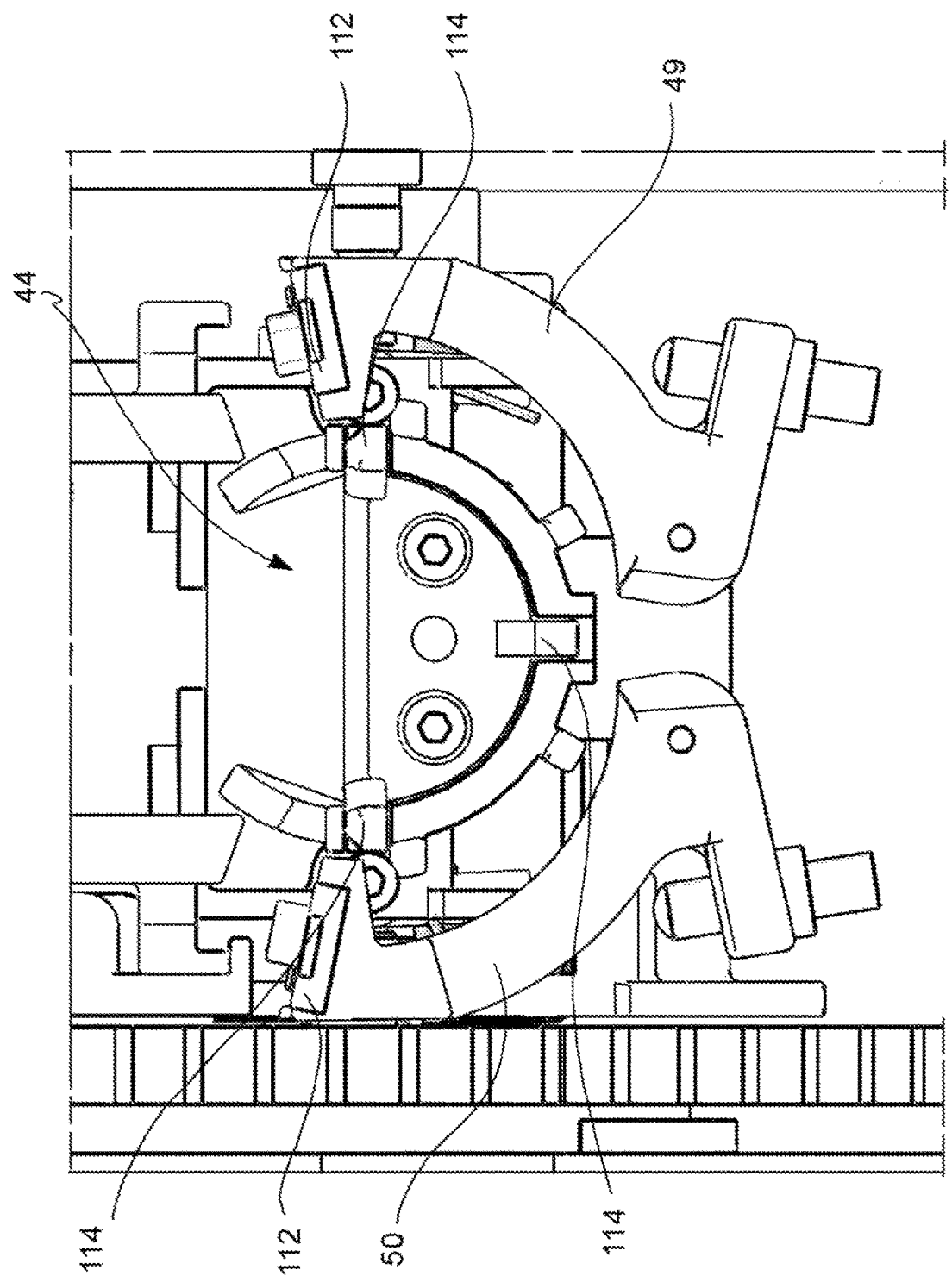
Figure 94:
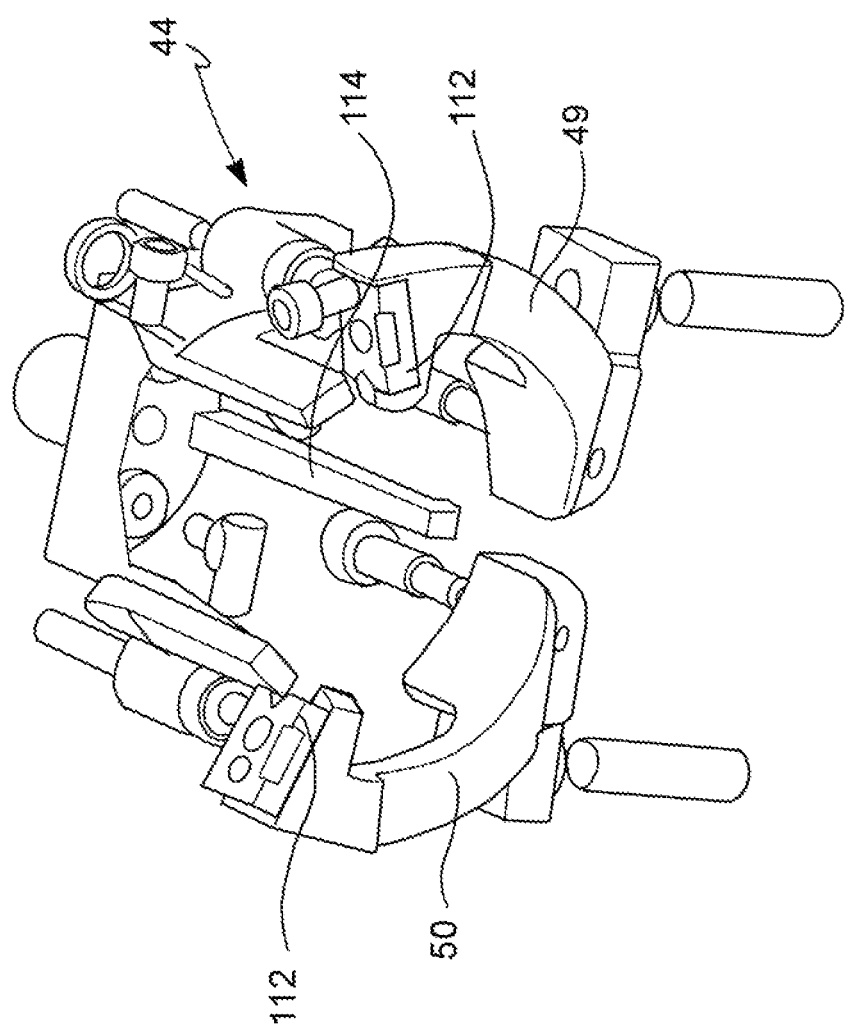

According to an embodiment, said device 44 for blocking the capsule to the carriage comprises a capsule ejection device 113 for ejecting the emptied capsule from said device 44 for blocking the capsule to the carriage and allowing it to fall into a collection bowl 5 or 110. Said capsule ejection device 113 is moved with a linear motion according to the longitudinal capsule body axis X-X. According to an embodiment, said capsule ejection device 113 comprises peripheral arms 114 parallel to each other and adapted to act on the edge of the used and emptied capsule (FIGS. 92-94).

Said capsule blocking device 44 is associated with used capsule drop guides 26 which guide the capsule falling from the extraction chamber 3 into the blocking device.

According to an embodiment, said guides, or used capsule drop guide 26, are adapted to accommodate the annular capsule edge or capsule edge 60, delimiting the capsule opening 61 for guiding it when falling.

According to an embodiment, said guides, or used capsule drop guide 26, are arranged along a substantially vertical plane to allow the used capsule 28 to fall by gravity into the blocking device 44.

According to an embodiment, said guides, or used capsule drop guide 26, are provided in discrete parts and associated with the insertion guides 101 for inserting the capsule 27 into the extraction chamber 3.

According to an embodiment, said guides, or used capsule drop guide 26, are provided in a single piece with the insertion guides 101 for inserting the capsule 27 into the extraction chamber 3.

According to an embodiment, said used capsule drop guides and insertion guides 101 are placed to define a path of the capsule 27 and 28 which takes the capsule 27 in front of a pyramidal body 102 adapted to extract coffee when the capsule is closed in the extraction chamber 3. (FIGS. 79 through 84).

Said insertion guides 101 are adapted to accommodate the annular capsule edge or capsule edge 60, delimiting the capsule opening 61 for taking it in place with the longitudinal capsule body axis X-X thereof aligned with or parallel to the extraction chamber, for example horizontal, to allow said extraction chamber to accommodate said capsule and take it with the capsule lid 34 thereof close to said pyramidal body 102.

According to an embodiment, the insertion guides 101 are placed on a first drop plane of capsule 27 ending with capsule abutment surfaces 103 so as to take the capsule 27 in front of the pyramidal body 102.

According to an embodiment, the portion of insertion guides 101 facing said pyramidal body 102 has a guide enlargement 104 which allows the capsule 27 to pass the insertion guides 101 and be in front of the pyramidal body 102 when accommodated in the extraction chamber 3.

According to an embodiment, said used capsule drop guides 26 are placed on a plane which is parallel to said insertion guides 101 but placed closer to said pyramidal body 102, so as to collect said capsule upon opening the extraction chamber 3.

According to an embodiment, a drop blocking device 105 is between said used capsule drop guides 26.

According to an embodiment, said drop blocking device 105 oscillates from a free passage position, in which it does not interfere with the drop path of the used capsule 28, to a stop position, in which it is interposed in the drop path of the used capsule 28 preventing the used capsule 28 from falling along said used capsule drop guides 26, thus preventing the used capsule 28 from entering in said blocking device 44, for example because this blocking device 44 is not in the appropriate position for receiving the used capsule 28 or is not free to accommodate the used capsule 28 or another malfunction prevents the emptying device 10 or said used capsule moving device or picking and moving device 16 or the used capsule opening assembly 73 from operating.

According to an embodiment, said drop blocking device 105 is elastically biased in a constant manner in the stop position (FIG. 84) and is activated in the free passage position by an acknowledgment from machine 1.

If the machine 1 is used without the used capsule emptying device 10, said drop blocking device is permanently blocked, for example by a used capsule collection container, in the free passage position.

Said used capsule moving device or picking and moving device 16 comprises a first cam element 52, or movable cam.

Said first cam element 52 comprises a first carriage guide 53.

Said used capsule moving device or picking and moving device 16 comprises a second cam element 54, or fixed cam, i.e. fixed to frame 17.

Said second cam element 54 comprises a second carriage guide 55.

Said second cam element 54 is supported to a frame support of the used capsule moving device 76.

Said used capsule moving device or picking and moving device 16 comprises a first carriage support half-shell 56 and a second carriage support half-shell 57 surrounding and slidingly guiding a carriage 30.

Said carriage 30 includes a carriage follower 58 which is engaged in said first carriage guide 53 and in said second carriage guide 55.

Said used capsule moving device or picking and moving device 16 comprises at least one capsule moving device position sensor 48, usually having a movable equipment mounted onto one of the half-shells 56, 57 and a fixed equipment mounted onto said second cam element 54, or fixed cam, or said support to the frame of the moving device 76.

Said second carriage guide 55 comprises at least one linear second guide stretch which forms a used capsule path for cutting the lid, having reference numeral 66.

Said second carriage guide 55 comprises at least one linear second guide stretch which forms the used capsule path for emptying the capsule, having reference numeral 67, and a linear second guide stretch which forms the used capsule path for the collection of emptied capsules, having reference numeral 68.

By means of said guides 53, 55, the carriage follower 58, and thus the carriage and the blocked capsule 28, runs on a used capsule path 77.

Said used capsule path 77 comprises a rotary capsule path stretch 78, as well as a linear capsule cutting path stretch 79, a linear capsule emptying path stretch 80, and a linear capsule collection path stretch 81 (FIGS. 25 to 40).

Said machine 1 further comprises a used capsule opening assembly 73.

Said used capsule opening assembly 73 comprises a used capsule cutting device or used capsule opening device 25.

Said used capsule cutting device or used capsule opening device 25 is associated with at least one, preferably two opposed guides for accompanying the linear cutting carriage, indicated by reference numeral 31 in the drawings.

Said used capsule cutting device or used capsule opening device 25 comprises a knife, or cutting blade 32.

Said knife 32, when acting by cutting a capsule lid 34, generates a knife cutting line 64 the closing of which is preferably avoided, so as to leave at least one flap of lid 34 connected to the capsule body 59.

For this reason, knife 32 has an avoided-cut knife opening 75 which makes the cutting line open and thus discontinue.

Said used capsule cutting device or used capsule opening device 25 also comprises one initial capsule lid lifting pin 33. Said at least one initial capsule lid lifting pin 33 punches or pierces said lid 34 during the cutting operation by temporarily associating with the cut flap of the lid, thus opening it during the retraction of the open capsule 27.

Said pin 33, to facilitate the temporary adhesion of the lid flap, may have a pin side surface toothing 93.

As an alternative to pin 33, an initial capsule lid lifting spring 82 can be used, which by being threaded on the edge of the cut lid flap, holds it and opens it during the retraction of the cut capsule 27.

Said used capsule cutting device or used capsule opening device 25 also comprises a cut capsule lid folding device 69, placed in interference with the cut lid flap, thus counteracting the capsule movement and determining the complete opening of the lid as the capsule passes.

Said cut capsule lid folding device 69 comprises a fork fixed to device 25 and overhangingly protruding to interfere with the cut lid flap during the movement of the capsule after the cutting of the lid.

Figure 85:
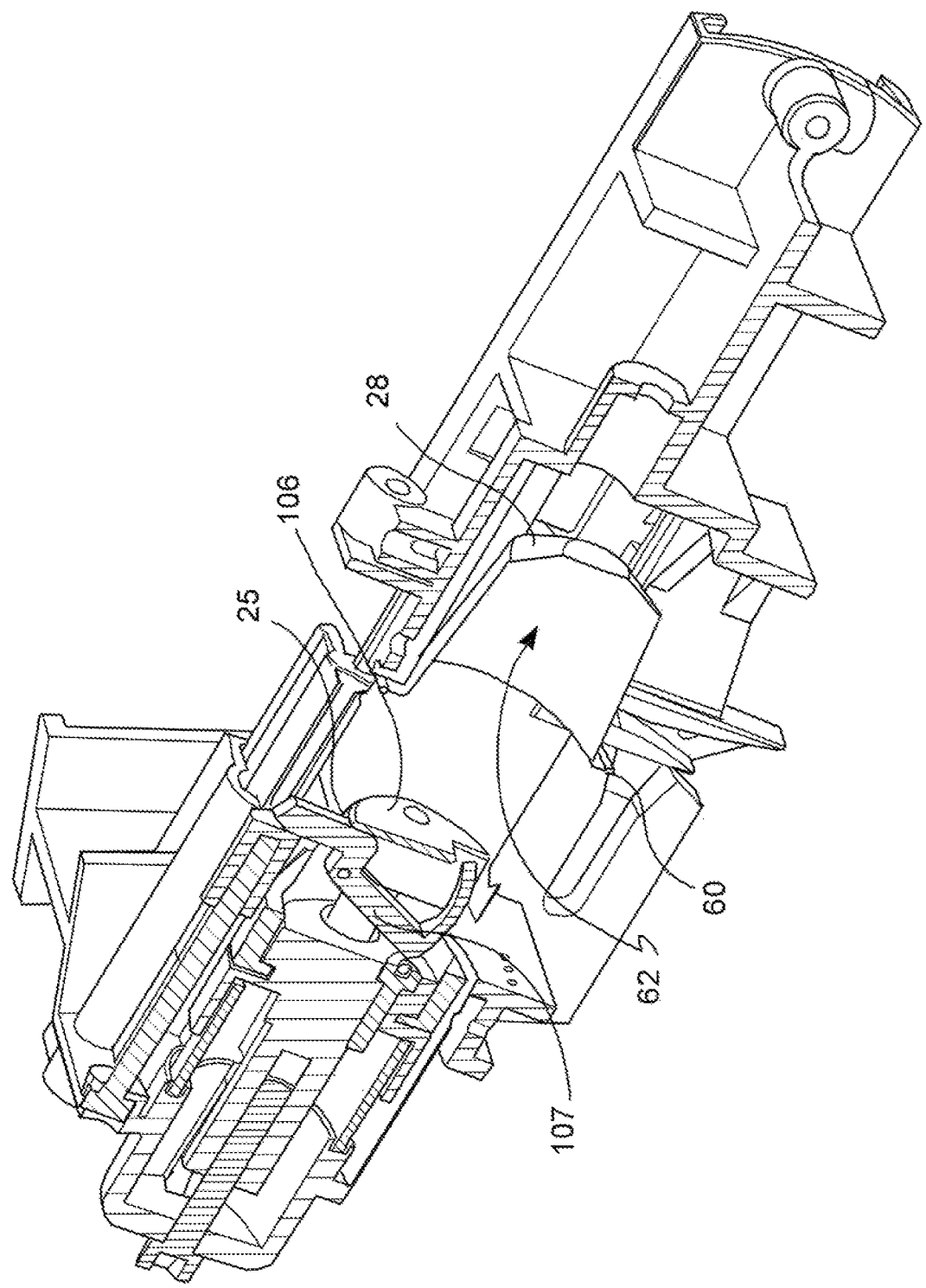
FIGS. 85 to 88 depict a sectioned axonometric view and a sectioned front view of a detail of the used capsule cutting device or used capsule opening device and of the cut capsule lid folding device.

According to an embodiment, said used capsule cutting device or used capsule opening device 25 comprises a support piston 106 placed inside said knife or cutting blade 32. According to an embodiment, said support piston 106 avoids any capsule lids 34, which have been accidentally completely removed, from remaining stacked in the area of the knife or cutting blade 32, and avoids the cutting functionality from being lost over time. According to an embodiment, said support piston 106 forms a support surface for said capsule lid 34 so as to obtain a support which simplifies the lid cutting operations, especially when retracting the knife or cutting blade 32 (FIG. 85).

According to an embodiment, said knife or cutting blade 32 is associated with a cut lid lifting finger 107. Said cut lid lifting finger 107 comprises a rocker lever 108, for example hinged to the support of said knife or cutting blade 32 or to said support device 106.

Figure 88:
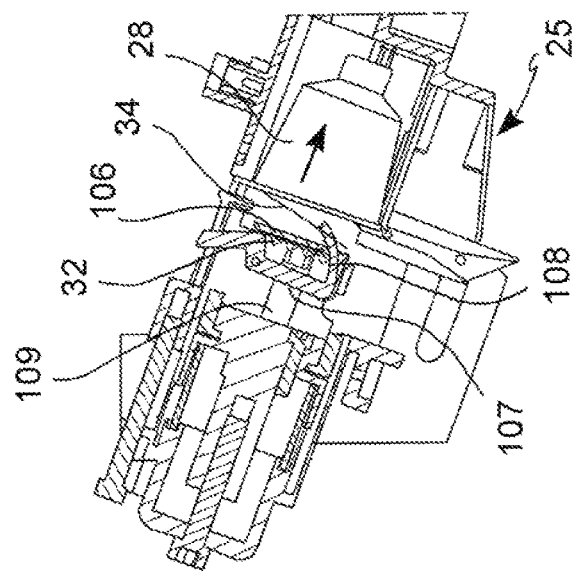
Figure 87:
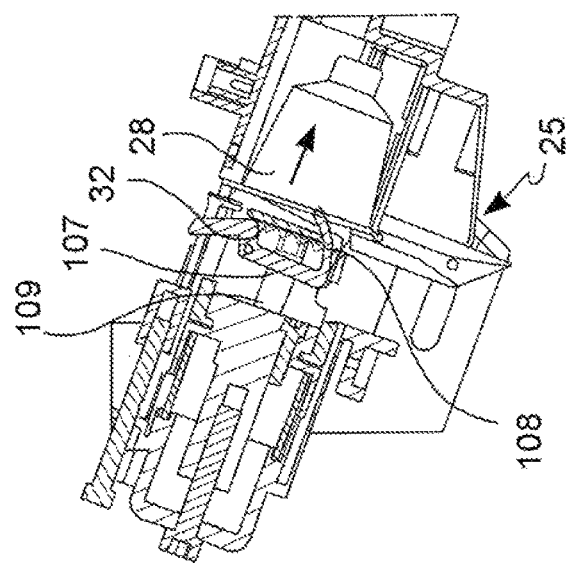
Figure 86:
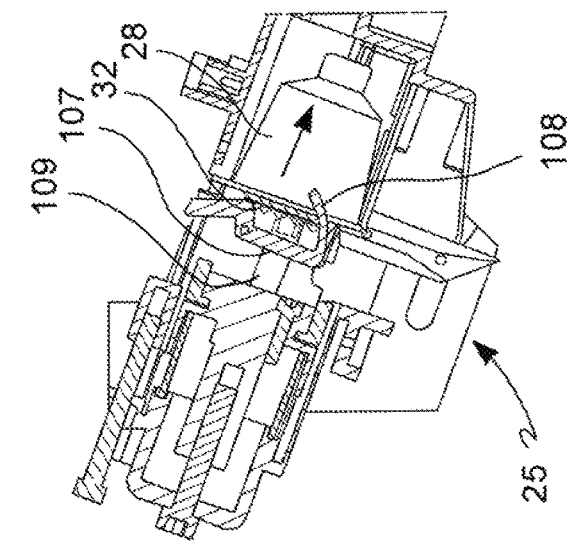

Said rocker lever is oscillatingly controlled [FIGS. 86-88) to follow the movement of the knife or cutting blade 32, so as to enter in the capsule chamber 62 when the lid 34 is cut, and due to the arcuate shape thereof, take the capsule lid 32 undercut and lift it as the knife or cutting blade 32 retracts.

According to an embodiment, said knife or cutting blade 32 is supported by an elastically retractable device 109 so as to retract said knife or cutting blade 32 when the capsule is of the non-openable type, without therefore damaging the cutting blade 32, but allowing the whole linear feeding movement of the capsule cutting device or used capsule opening device 25.

Said machine 1 also comprises a used capsule emptying assembly 94 (FIGS. 7-9 and 20-21 and 68-78).

Said used capsule emptying assembly 94 comprises an emptying device 10.

Said emptying device 10 comprises a scraper 11, preferably but not necessarily a rotating scraper 11.

Said scraper 11 is operatively connected to an emptying device movement mechanism 12 and 21.

The emptying device 10 is associated or associable with an extracted and used coffee collection bowl 13.

According to an embodiment (FIGS. 18-21), said emptying device 10 is associated with a support frame structure of the machine or extractable frame 17 or support structure of the capsule opening and emptying device.

Said extracted and used coffee collection bowl 13 comprises a coffee collection bowl sliding counter-guide, or coffee collection bowl shoes 36, adapted to associate, and slides on said frame sliders 35 present on the extractable frame 17.

Said scraper 11 comprises flexible emptying device elements 47 adapted to associate in non-destructive manner to the inner walls of the capsule chamber 62 for emptying it from its contents, for example used ground coffee 63.

Said scraper 11 also comprises an elastic scraper shortening device 46 adapted to adapt the scraper to capsules of different depth or to compensate for movement tolerances of the capsule during the emptying operation.

Said scraper 11 is operatively connected to an actuator 19 via an emptying device transmission 37.

The transmission comprises an emptying device clutch, for example the magnetic clutch 38, to stop the emptying device 10 in case the scraper impacts against a rigid object instead of the used coffee 63.

Said scraper 11 could alternatively be operated by a second actuation device, e.g. the electric emptying device motor 45.

In this case, scraper 11 is operatively connected to an emptying device movement mechanism 21 connected, in turn, to a second actuation device 45.

As an alternative to the scraper, a pressure emptying device 83 can be used (FIGS. 71-75).

This device has a cylinder 84 within which a piston 85 slides in a sealing manner by means of seals 87, so as to pressurize the air 86 through a thrust conduit 88 having a section which is lower than cylinder 84.

The pressurized air enters the capsule opening created for inserting the extraction fluid 89 and pushes the capsule content 63 out of the capsule chamber 62.

As an alternative to the scraper, an emptying-by-shaking device 90 can be used (FIGS. 76 and 77), which in an alternative embodiment slams the capsule against a shaking device abutment stop 91.

Figure 78:
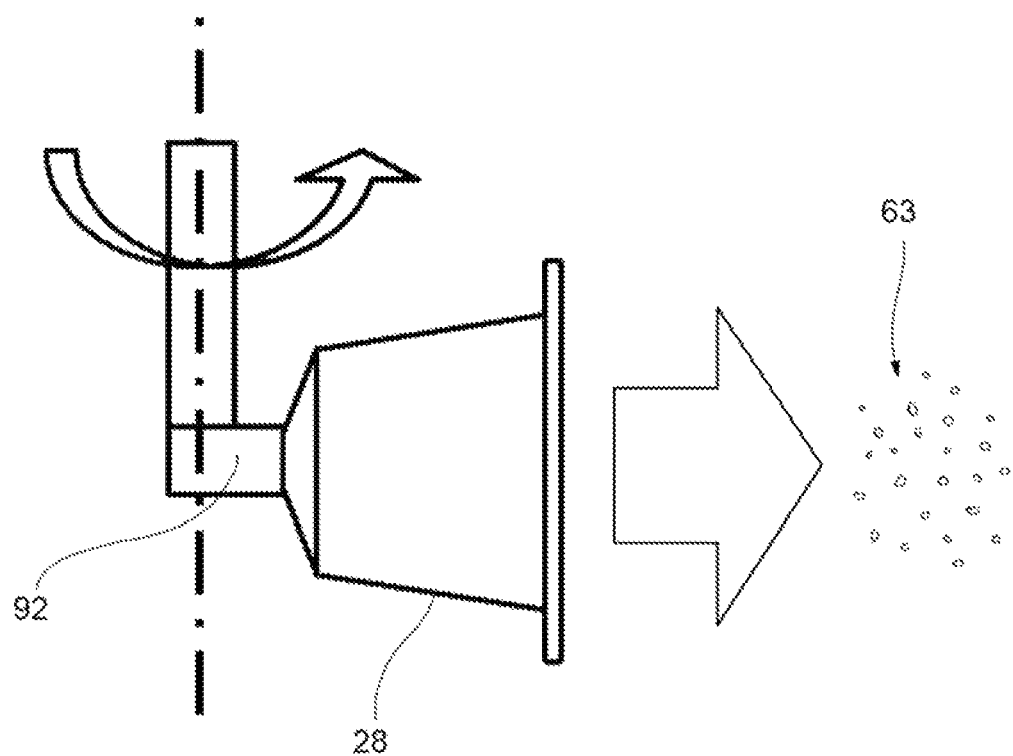
FIG. 78 diagrammatically depicts a device for emptying the contents of a used and opened capsule by means of the centrifugal action exerted by the rotation of the capsule.
Figure 79:
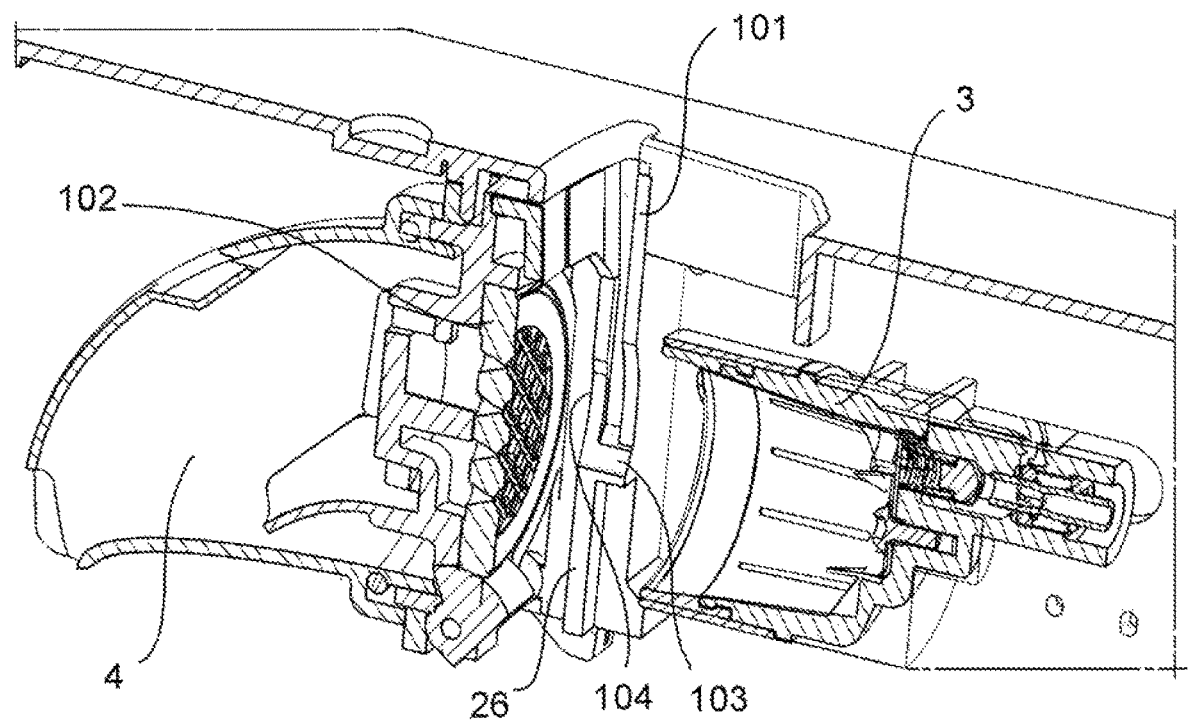
FIGS. 79 and 80 show a sectioned axonometric view and a sectioned front view of a detail of the extraction chamber in an open position, and in which the features of the guides for inserting a capsule into the extraction chamber and of the used capsule drop guides are highlighted.
Figure 80:
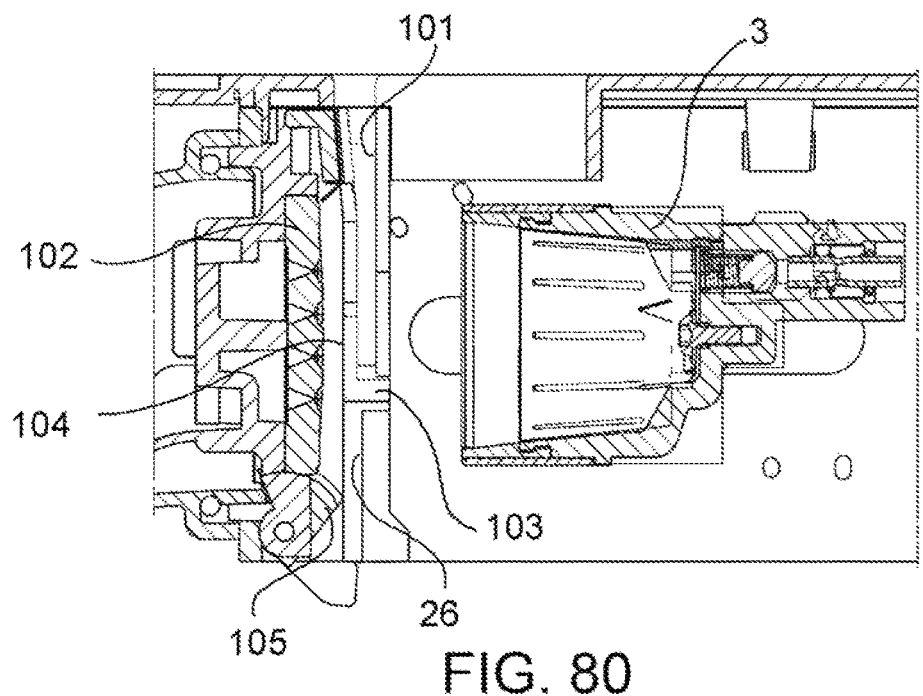
Figure 81:
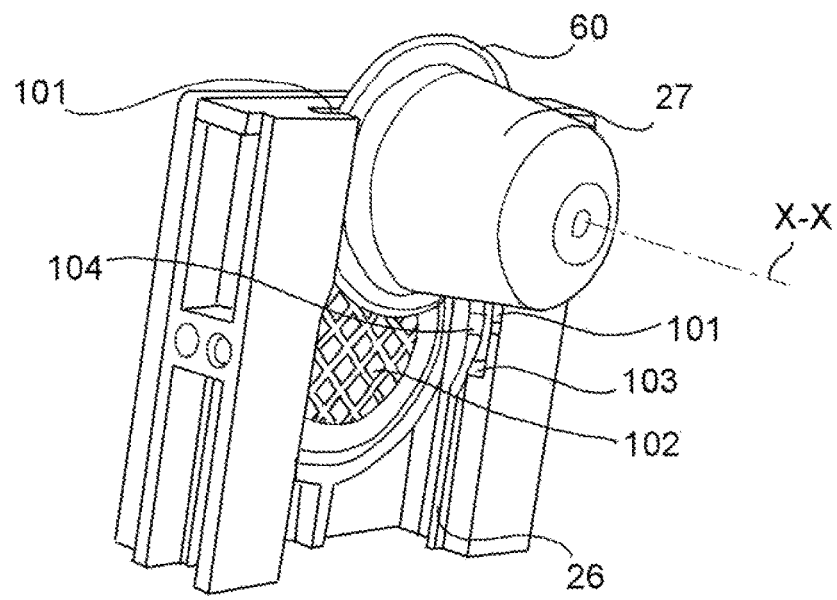
FIGS. 81-84 depict a detail of the guides for inserting a capsule into the extraction chamber and of the used capsule drop guides, as well as of the capsule drop blocking device.
Figures 82, 83:
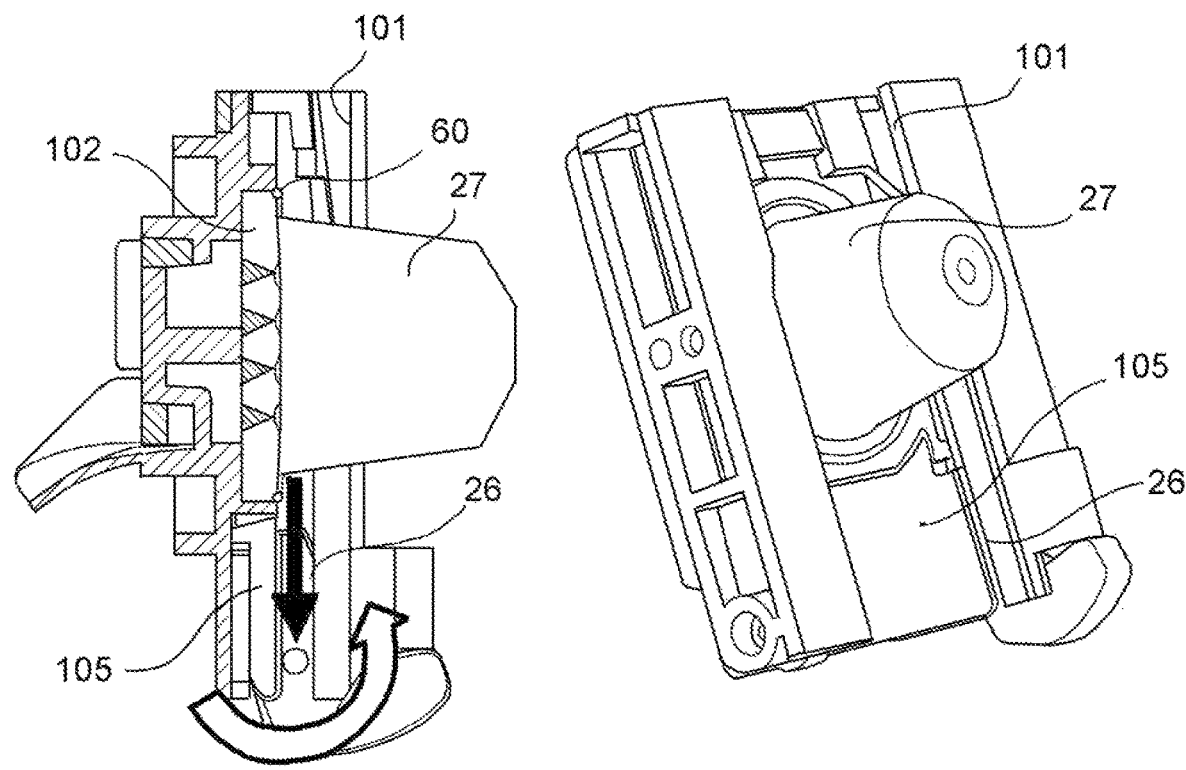
Figure 84:
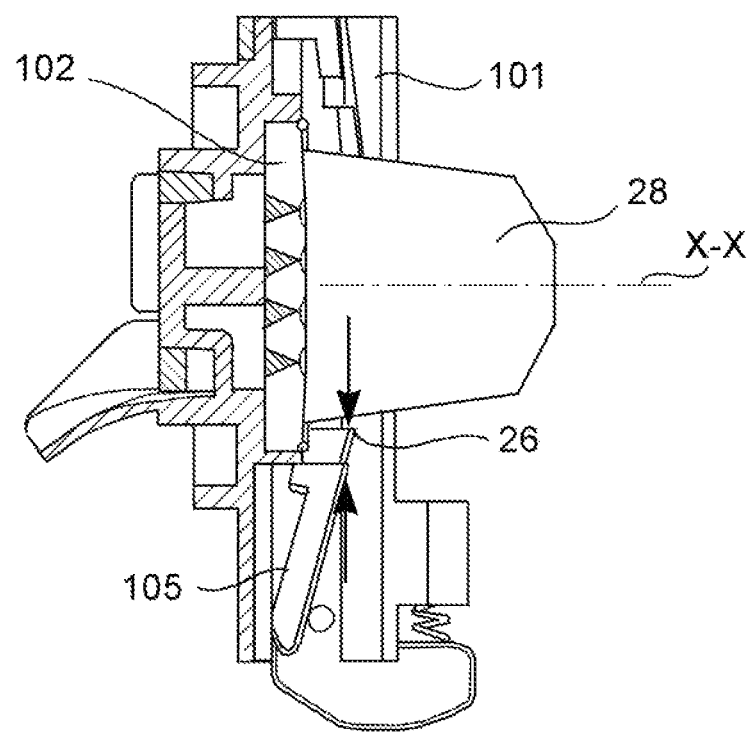

As an alternative to the scraper, an emptying-by-centrifugal-action device 92 is used, as shown in FIG. 78.

Said machine also comprises a used capsule collecting assembly 95.

Said used capsule collecting assembly 95 comprises an opened and emptied capsule collection device 15, placed within an empty used capsule collection bowl 5.

Said empty used capsule collection bowl 5 comprises opened and emptied capsule collection device counter-guides, or capsule collection device shoes 72, which associate and slide on said frame sliders 35 of the extractable frame 17 for the extraction of the empty used capsule collection bowl 5 and the emptying and cleaning thereof.

Said used capsule collecting assembly 95 comprises a device 41 for blocking the capsule to the collection device.

Said device 41 for blocking a capsule to the collection device comprises at least one emptied capsule collection guide 40 adapted to define an opened and emptied capsule collection seat 29.

Said device 41 for blocking a capsule to the collection device comprises at least one opened and emptied used capsule locking spring 39 which hooks as an undercut the last of the capsules collected, by blocking it to the device, preferably packing the opened capsules one into the other.

Said device 41 for blocking a capsule to the collection device comprises at least one blocking device release command 42 which moves away said at least one opened and emptied used capsule locking spring 39 by unhooking and freeing the packed opened and emptied capsules.

Said device 41 for blocking a capsule to the collection device comprises an opened and emptied capsule collection device filling sensor 43.

Said machine 1 also comprises a bowl connection device, empty used capsule collection bowl 5, extracted and used coffee collection bowl 13, such as a magnetic device 14.

According to a general embodiment of the invention, the used capsule disposal assembly 96 is provided as a disposal machine even if it is free from the extraction chamber which is replaced by a used capsule insertion device 74.

According to a general embodiment of the invention, a capsule opening assembly 73 for opening a used capsule 28 is provided.

Said used capsule 28 comprises:
a capsule body 59;
said capsule body 59 comprising a capsule opening 61;
said capsule body 59 extending about a longitudinal capsule axis X-X;
said capsule body 59 defining a capsule chamber 62 receiving a used or extracted or exhausted substance, such as for example used ground coffee 63;
said capsule chamber 62 being closed by a lid 34, or closing film, fixed to said capsule body 59.

Said capsule opening assembly 73 comprises:
a used capsule cutting device 25
said used capsule cutting device 25 comprises a knife 32 or cutting blade;
said assembly comprises a used capsule blocking device 41 adapted to grasp said used capsule 28 in a predetermined position which defines a locking seat 65 leaving said capsule opening 61 closed by said capsule lid 34 exposed;
said assembly comprises a used capsule moving device 16; said used capsule moving device 16 comprises a carriage 30 which supports said used capsule blocking device 41;
said carriage 30 is operatively connected so as to move said used capsule blocking device 41 with respect to said used capsule cutting device 25.

Said relative movement occurs along a predetermined path which comprises at least one linear stretch 66 directed along a direction which is parallel to or coincident with said longitudinal capsule axis X-X, and where along said predetermined linear path stretch 66, a relative rotation of capsule 28 or of knife or cutting blade 32 is avoided.

Furthermore, said knife 32, during said movement along said linear path stretch 66, is adapted to cut a lid portion 34 along a predetermined cutting line 64 to open said capsule chamber 62.

With the capsule opening assembly 73 described above, a capsule opening method can be carried out to open a used capsule 28.

Said used capsule 28 comprises:
a capsule body 59;
said capsule body 59 comprising a capsule opening 61;
said capsule body 59 extending about a longitudinal capsule axis X-X;
said capsule body 59 defining a capsule chamber 62 receiving a used or extracted or exhausted substance, such as for example used ground coffee 63;
said capsule chamber 62 being closed by a lid 34, or closing film, fixed to said capsule body 59;

Said method includes the steps of:
blocking said used capsule 28 in a predetermined position leaving said capsule opening 61 closed by said capsule lid 34 exposed;
providing a used capsule cutting device 25 comprising a knife or cutting blade 32;
moving said used capsule 28 with respect to said used capsule cutting device 25;
said relative movement occurs along a predetermined path which comprises at least one linear stretch 66 directed along a direction which is parallel to or coincident with said longitudinal capsule axis X-X;
avoiding, along said predetermined linear path stretch 66, a relative rotation of capsule 28 or of knife or cutting blade 32;
cutting with said knife 32, during said movement along said linear path stretch 66, a lid portion 34 along a predetermined cutting line 64 to open said capsule chamber 62.

According to a general embodiment of the invention, a capsule emptying assembly 94 for emptying the exhausted content 63 of a used capsule 28 is provided.

Said used capsule 28 comprises:
a capsule body 59;
said capsule body 59 comprises a capsule opening 61;
said capsule body 59 extending about a longitudinal capsule axis X-X;
said capsule body 59 defining a capsule chamber 62 receiving a used or extracted or exhausted substance, such as for example used ground coffee 63;
said capsule chamber 62 being open, but initially closed by a lid 34, or closing film, fixed to said capsule body 59.

Said assembly 94 comprises an emptying device 10. Said emptying device 10 comprises a scraper 11.

Said assembly 94 comprises a used capsule blocking device 41 adapted to grasp said used capsule 28 in a predetermined position which defines a locking seat 65 leaving said capsule opening 61 exposed.

Said assembly comprises a used capsule moving device 16; said used capsule moving device 16 comprises a carriage 30 which supports said used capsule blocking device 41;
said carriage 30 is operatively connected so as to move said used capsule blocking device 41 with respect to said emptying device 10;
said relative movement occurs along a predetermined path which comprises at least one linear path stretch 67 directed along a direction which is parallel to or coincident with said longitudinal capsule axis X-X, and where along said predetermined linear path stretch 67, a rotation of capsule 28 relative to scraper 11 is avoided.

Said scraper 11, at least during said movement along said linear path stretch 67, is adapted to enter in said capsule chamber 62 and remove said used or extracted or exhausted substance, such as for example used ground coffee 63.

According to general embodiment of the invention, a capsule emptying method is provided, for emptying a used capsule 28.

Said used capsule 28 comprises:
a capsule body 59;
said capsule body 59 comprising a capsule opening 61;
said capsule body 59 extending about a longitudinal capsule axis X-X;
said capsule body 59 defining a capsule chamber 62 receiving a used or extracted or exhausted substance, such as for example used ground coffee 63;
said capsule chamber 62 being initially closed by a lid 34, or closing film, fixed to said capsule body 59.

Said method includes the steps of:
blocking said used capsule 28 in a predetermined position leaving said capsule opening 61 closed by said capsule lid 34 exposed;
providing an emptying device 10; said emptying device 10 comprises a scraper 11;
moving said used capsule 28 with respect to said emptying device 10;
said relative movement occurs along a predetermined path which comprises at least one linear stretch 67 directed along a direction which is parallel to or coincident with said longitudinal capsule axis X-X;
avoiding, along said predetermined linear path stretch 67, a rotation of capsule 28;
entering, at least during said movement along said linear path stretch 67, with said scraper 11 in said capsule chamber 62 and removing said used or extracted or exhausted substance, such as for example used ground coffee 63.

According to a general embodiment of the invention, a capsule collecting assembly 95 for the collection of capsules 29 emptied of the exhausted content 63 thereof is provided.

Said emptied capsule 29 comprises:
a capsule body 59;
said capsule body 59 comprises a capsule opening 61;
said capsule body 59 extending about a longitudinal capsule axis X-X;
said capsule body 59 defining a capsule chamber 62 which was adapted to receive a used or extracted or exhausted substance, such as for example used ground coffee 63;
said capsule chamber 62 being open, but initially closed by a lid 34, or closing film, fixed to said capsule body 59.

Said assembly 95 comprises an emptied capsule collection device 15.

Said emptied capsule collection device 10 comprises a capsule collection seat delimited by at least one emptied capsule collection guide 40.

Said assembly 95 comprises a used capsule blocking device adapted to grasp said emptied capsule 29 in a predetermined position which defines a locking seat 65 leaving said capsule opening 61 exposed;
said assembly comprises a used capsule moving device 16; said used capsule moving device 16 comprises a carriage 30 which supports said used capsule blocking device 41;
and where said carriage 30 is operatively connected so as to move said used capsule blocking device 41 with respect to said collection device 15;
and where said relative movement occurs along a predetermined path which comprises at least one linear path stretch directed along a direction which is parallel to or coincident with said longitudinal capsule axis X-X, and where along said predetermined linear path stretch 68, a rotation of capsule 28 with respect to the at least one collection guide 40 is avoided.

According to an embodiment, the emptied capsules are released from the device 44 for blocking the capsule to the carriage and freely fall in an emptied capsule collection bowl 5 or 110, for example separate from the extracted and used coffee collection bowl 13.

Figure 95:
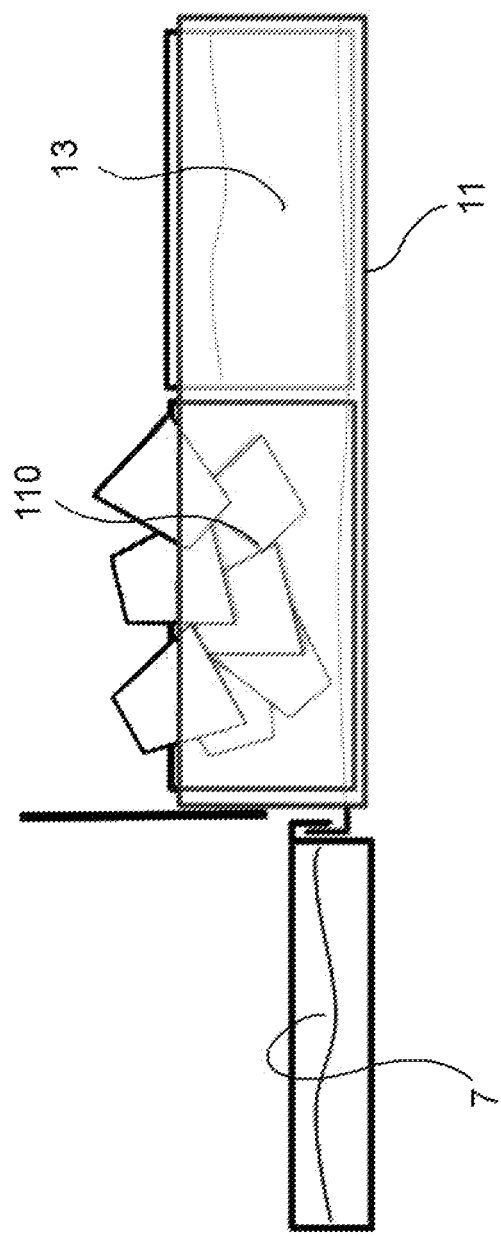
FIG. 95 diagrammatically depicts a sectioned side view of the geometric coupling between the liquid collection bowl and the single bowl holder which supports the emptied capsule collection bowl and the used coffee collection bowl.

According to an embodiment, the bowl 110 for randomly collecting the emptied capsules and the extracted and used coffee collection bowl 13 are inserted into a single bowl holder 111 for extracting them simultaneously from the machine 1 or device 73 (FIG. 95).

According to an embodiment, the liquid collection bowl 7 is geometrically connected to said single bowl holder 111 by means of a detachable geometric undercut coupling by lifting the liquid collection bowl 7.

According to an embodiment, said emptied capsule collection device 15 stacks a plurality of emptied capsules 29.

According to an embodiment, said capsule collecting assembly 95 comprises:
- a capsule blocking device 41;
- at least one opened and emptied used capsule locking spring 39;
- a blocking device release command 42;

According to an embodiment, said capsule collecting assembly 95 comprises an opened and emptied capsule collection device filling sensor 43.

According to a general embodiment of the invention, a capsule collection method for collecting a used and empty capsule 29 is provided.

Said used and empty capsule 29 comprises:
- a capsule body 59;
- said capsule body 59 comprising a capsule opening 61;
- said capsule body 59 extending about a longitudinal capsule axis X-X;
- said capsule body 59 defining a capsule chamber 62 receiving a used or extracted or exhausted substance, such as for example used ground coffee 63;
- said capsule chamber 62 being initially closed by a lid 34, or closing film, fixed to said capsule body 59;

Said method includes the steps of:
- blocking said used capsule 28 in a predetermined position leaving said capsule opening 61 closed by said capsule lid 34 exposed;
- providing a collection device 15;
- moving said used capsule blocking device 41 with respect to said collection device 15 along a predetermined path which comprises at least one linear path stretch 68 directed along a direction which is parallel to or coincident with said longitudinal capsule axis X-X;
- avoiding, along said predetermined linear patch stretch 68, a rotation of capsule 28 with respect to the at least one collection guide 40;
- releasing said used and empty capsule 29 in said collection device 15.

According to an embodiment of the method, during the movement along said predetermined linear patch stretch 68, taking the capsule body 59 within at least one emptied capsule collection guide 40.

According to an embodiment of the method, a step of blocking said capsule body 59 within at least one emptied capsule collection guide 40 is provided.

According to a general embodiment of the invention, a used capsule disposal assembly 96 is provided, where said assembly 96 comprises:
- a used capsule moving assembly 97;
- a used capsule opening assembly 73;
- a used capsule emptying assembly 94;
- a used capsule collecting assembly 95.

According to a general embodiment of the invention, there is provided a machine 1 for extracting a beverage, for example coffee, where said machine comprises:
- a beverage extraction chamber 3;
- a used capsule opening assembly 73 comprising at least one used capsule cutting device or used capsule opening device 25;
- a fixed frame 18 fastened to machine 1;
- an extractable frame 17 slidingly connected to said fixed frame 18 so as to extract it from said machine 1;
- where said used capsule opening assembly 73 is connected to said extractable frame 17.

According to an embodiment, said machine 1 comprises:
- a used capsule emptying assembly 94 comprising at least one emptying device 10;
- said used capsule emptying assembly 94 is removably connected to said extractable frame 17 so as to be extracted from said machine 1 and from said extractable frame 17 without extracting the extractable frame 17 from machine 1.

In light of these features of the used capsule emptying assembly 94, the used capsule emptying assembly 94 can be frequently extracted from machine 1, thus allowing to discharge the used substance separated from the capsule body and clean said assembly and the extracted and used coffee collection bowl 13.

According to an embodiment, said fixed frame 18 comprises fixed frame guides 70 on which extractable frame counter-guides, or extractable frame shoes 71 slide, associated with said extractable frame 17 and sliding thereon for the extraction of the extractable frame 17 from said fixed frame 18.

According to an embodiment, said machine 1 comprises a liquid collection bowl 7 with which a cup-holding surface 8 is associated, placed below a beverage dispensing spout 4, said liquid collection bowl 7 being separable from said machine to allow the operations of emptying and cleaning.

According to an embodiment, said machine 1 comprises an empty used capsule collection bowl 5 associated with said opened and emptied capsule collection device 15.

According to an embodiment, said empty used capsule collection bowl 5 being separable from said machine to allow the operations of emptying and cleaning.

According to an embodiment, said empty used capsule collection bowl 5 comprises opened and emptied capsule collection device counter-guides, or capsule collection device shoes 72, which ca be associated with frame sliders 35 of an extractable frame 17 for said empty used capsule collection bowl 5 to slide with respect to said extractable frame 17.

According to an embodiment, said machine 1 comprises an extracted and used coffee collection bowl 13 associated with said emptying device 10.

According to an embodiment, said machine 1 comprises an extracted and used coffee collection bowl 13 separably associated with said emptying device 10.

According to an embodiment, said extracted and used coffee collection bowl 13 being separable from said machine to allow the operations of emptying and cleaning.

According to an embodiment, said extracted and used coffee collection bowl 13 comprises coffee collection bowl sliding counter-guides, or coffee collection bowl shoes 36 adapted to cooperate with frame sliders 35 of an extractable frame 17 for said extracted and used coffee collection bowl 13 to slide with respect to said extractable frame 17.

According to a general embodiment, a method of extracting a beverage from a capsule 27 comprising a substance, for example coffee, is provided.

Said capsule comprises:
- a capsule body 59;
- said capsule body 59 comprises a capsule opening 61;
- said capsule body 59 extending about a longitudinal capsule axis X-X;

said capsule body 59 defining a capsule chamber 62 receiving a used or extracted or exhausted substance, such as for example used ground coffee 63;

said capsule chamber 62 being initially closed by a lid 34, or closing film, fixed to said capsule body 59.

Said method comprises the steps of:

extracting the beverage;

taking the used capsule 28 into a blocking device 44;

moving the used capsule 28 by taking it in front of a used capsule cutting device or used capsule opening device 25;

moving the used capsule 28 along a linear capsule cutting path stretch 79 which is parallel to or coincident with the longitudinal axis X-X of said used capsule 28;

cutting the lid 34 of said used capsule;

moving the used capsule 28 by taking it in front of an emptying device 10;

moving the used capsule 28 along a linear capsule emptying path stretch 80 which is parallel to or coincident with the longitudinal axis X-X of said used capsule 28;

emptying the contents 63 of said used capsule 28;

moving the opened and emptied used capsule 29 by taking it in front of an opened and emptied used capsule collection device 15;

moving the opened and emptied used capsule 29 along a capsule collection path stretch 81;

collecting said opened and emptied used capsule 29.

According to an embodiment, said knife 32, during said motion along said linear path stretch 66, is adapted to cut a lid portion 34 along a predetermined cutting line 64 in order to open said capsule chamber 62, while avoiding said lid 34 from being completely separated from said capsule body 59.

According to an embodiment, said knife 32, during said motion along said linear path stretch 66, is adapted to cut a lid portion 34 along a predetermined cutting line 64 in order to open said capsule chamber 62, while avoiding said capsule body 59 from being broken or collapsed.

According to an embodiment, said used capsule blocking device 41 linearly moves on said used capsule cutting device 25, and where said used capsule cutting device 25 is firmly connected to said extractable frame 17.

According to an embodiment, said capsule body 59 comprises a capsule edge 60 delimiting a capsule opening 61;

and where said knife, or cutting blade, 32 comprises a circular body for cutting said capsule lid 34 along a cutting line of knife 64, arranged close to said edge capsule 60.

According to an embodiment, said knife, or cutting blade, comprises an open circular body which delimits an avoided-cut knife opening 75 which allows to leave said capsule lid 34 connected to the capsule body 59 even after cutting, so that the capsule lid 34 is adapted to be lifted outwards and open the capsule opening 61.

According to an embodiment, said knife, or cutting blade, 32 comprises a ring-shaped body.

According to an embodiment, said knife, or cutting blade, comprises a cylindrical body with a cutting edge having a circumferential sector.

According to an embodiment, said knife, or cutting blade, 32 comprises a cutting edge provided with a toothing.

According to an embodiment, said used capsule cutting device or used capsule opening device 25 comprises at least one initial capsule lid lifting pin 33 adapted to pierce said capsule lid 34 while remaining removably engaged.

According to an embodiment, said at least one initial capsule lid lifting pin 33 is conical or frustoconical in shape.

According to an embodiment, said at least one initial capsule lid lifting pin 33 has a side surface on which pin side surface toothing 93 is provided, adapted to engage the edges of the tear formed in the capsule lid 34 by said pin 33.

According to an embodiment, said at least one initial capsule lid lifting pin 33 has a shape which creates friction with the capsule lid 34 when interacting therewith, so as to at least partially lift the lid when it moves away from the capsule body.

According to an embodiment, said at least one initial capsule lid lifting pin 33 consists of two pins.

According to an embodiment, said at least one initial capsule lid lifting pin 33 is arranged within said knife 32 so as to punch the capsule lid area 34 cut by knife 32.

According to an embodiment, said used capsule opening assembly 73 comprises an initial capsule lid lifting spring 82; and where said initial capsule lid lifting spring 82 is placed within said knife 32 and so as to engage the lid edge created by the cut produced by knife 32 and lift said cut lid when knife 32 moves away from the used capsule 28.

According to an embodiment, said initial capsule lid lifting spring 82 has an "S"-shaped section.

According to an embodiment, said capsule body 59 comprises a capsule edge 60 delimiting a capsule opening 61;

and where a capsule blocking device 44 comprises at least one blocking device arm 49, 50 adapted to engage and grasp said capsule edge 60 to lock said capsule 28 to a carriage 30 of a used capsule moving device or picking and moving device 16.

According to an embodiment, said capsule body 59 comprises a capsule edge 60 delimiting a capsule opening 61;

and where a capsule blocking device 44 comprises first and second blocking device arms 49, 50 opposite to each other and adapted to engage and grasp said capsule edge 60 to lock said capsule 28 firmly to a carriage 30 of a used capsule moving device or picking and moving device 16.

According to an embodiment, said used capsule emptying assembly 94 comprises a scraper 11.

According to an embodiment, said scraper 11 comprises flexible emptying device elements 47 adapted to engage the walls of the capsule body 59 which delimit the capsule chamber 62 for better emptying the contents of said used capsule 28.

According to an embodiment, said scraper 11 comprises a scraper body with spirally wound teeth.

According to an embodiment, said scraper 11 comprises a scraper body with spirally wound teeth at least partially made of a flexible and elastic material.

According to an embodiment, said scraper 11 comprises a scraper body with three teeth.

According to an embodiment, said used capsule emptying assembly 94 comprises an emptying device movement mechanism 21 which moves the emptying device 10 and where said emptying device movement mechanism 21 takes the motion from an actuation device 19, such as an electric motor.

According to an embodiment, said used capsule emptying assembly 94 comprises an emptying device movement mechanism 21 which moves the emptying device 10 and where said emptying device movement mechanism 21 takes the motion from an actuation device 19, such as a single electric motor, which actuation device 19 also moves the used capsule moving device or picking and moving device 16.

According to an embodiment, said used capsule emptying assembly 94 comprises an emptying device movement mechanism 21 which moves the emptying device 10 and where said emptying device movement mechanism 21 takes the motion from an actuation device 19 connected thereto by means of an emptying device transmission 37 which connects to said actuation device 19 by means of an emptying device clutch 38, for example a magnetic clutch.

According to an embodiment, the assembly comprises:
- an actuation device, for example an electric motor 19, connected to a primary transmission 20;
- said primary transmission 20 is connected to an emptying device movement mechanism 21 which moves said emptying device 10 by means of an emptying device transmission 37;
- said primary transmission 20 is connected to a moving device transmission 24 and moves a used capsule moving device or picking and moving device 16.

According to an embodiment, the assembly comprises:
- an emptying device movement mechanism 21 which moves said used capsule 28 along a used capsule path 77 comprising:
- at least one rotary capsule path stretch 78;
- a linear capsule cutting path stretch 79 to take said capsule 28 in cooperation with a used capsule cutting device 25;
- a linear capsule emptying path stretch 80 to take said capsule 28 in cooperation with an emptying device 10;
- a linear capsule collecting path stretch 81 to take said capsule 28 in cooperation with an opened and emptied capsule collection device 15.

According to an embodiment, the assembly comprises:
- an opened and emptied capsule collection device 15;
- said opened and emptied capsule collection device 15 comprises an emptied capsule blocking device 41 adapted to block the emptied capsules released from the carriage blocking device 44 to the collection device;
- said opened and emptied capsule collection device 15 comprises at least one emptied capsule collection guide 40 which guides the emptied capsule 29 into a seat adapted to stack a plurality of emptied capsules 29 by inserting each of them into the capsule chamber 62 of the next one;
- said opened and emptied capsule collection device 15 comprises at least one opened and emptied used capsule locking spring 39 adapted to block said emptied capsule or to block the plurality of emptied capsules 29;
- said opened and emptied capsule collection device 15 comprises a blocking device release command 42 adapted to act on said opened and emptied used capsule locking spring 39 in order to disengage it from the emptied capsules 29 and release the emptied capsules 29 for emptying and cleaning the opened and emptied capsule collection device 15;
- said opened and emptied capsule collection device 15 comprises an opened and emptied capsule collection device filling sensor 43 adapted to indicate the filling of device 15 and the need to extract it from machine 1 and empty it.

According to an embodiment, said opened and emptied capsule collection device 15 is at least partially accommodated in an empty used capsule collection bowl 5 for collecting any liquid still present in the empty capsule 29 and the empty capsules 29 themselves.

According to a general embodiment of the invention, a used capsule moving assembly 97 is provided.

Said capsule 27; 28; 29 comprises:
- a capsule body 59;
- said capsule body 59 comprises a capsule opening 61;
- said capsule body 59 extending about a longitudinal capsule axis X-X;
- said capsule body 59 defines a capsule chamber 62 adapted to receive a used or extracted or exhausted substance, such as for example used ground coffee 63;
- said capsule chamber 62 being initially closed by a lid 34, or closing film, fixed to said capsule body 59;

Said assembly 97 comprises:
- a capsule blocking device 41 which leaves the capsule opening 61 accessible;
- a used capsule moving device or picking and moving device 16;
- said used capsule moving device 16, or picking and moving device 16, supports said capsule blocking device 41;
- said used capsule moving device or picking and moving device 16 moves said capsule blocking device 41 by taking it in front of a used capsule cutting device 25, or used capsule opening device 25, or cutting device 25, adapted to partially open said lid 34;
- said used capsule moving device or picking and moving device 16 moves said capsule blocking device 41 by taking it in front of an emptying device 10, adapted to empty said used or extracted or exhausted substance, such as for example used ground coffee 63, from said capsule body 59 without breaking or otherwise destroying said capsule body 59;
- said used capsule moving device or picking and moving device 16 moves said capsule blocking device 41 by taking it in front of an opened and emptied capsule collection device 15, or collection device 10, adapted to collect said capsule body 59 from which said used or extracted or exhausted substance, such as for example used ground coffee 63, has been emptied.

Said used capsule moving device 16 displaces said capsule blocking device 41 along a linear path 66, 67, 68 at least when said capsule blocking device 41 is placed so as to take said capsule body 59 with the longitudinal capsule axis X-X thereof in front of each of said cutting device 25, emptying device 10, and collection device 10, and wherein said linear paths 66, 67, 68 are coincident with or parallel to said longitudinal capsule axis X-X.

According to a general embodiment, a method for moving a capsule 28 is provided.

Said capsule comprises:
- a capsule body 59;
- said capsule body 59 comprising a capsule opening 61;
- said capsule body 59 extending about a longitudinal capsule axis X-X;
- said capsule body 59 defining a capsule chamber 62 receiving a used or extracted or exhausted substance, such as for example used ground coffee 63;
- said capsule chamber 62 being initially closed by a lid 34, or closing film, fixed to said capsule body 59;

Said method comprises the steps of:
- taking capsule 28 into a capsule blocking device 44;
- moving capsule 28 by taking it in front of a used capsule cutting device or used capsule opening device 25;
- moving capsule 28 along a linear capsule cutting path stretch 79 which is parallel to or coincident with the longitudinal axis X-X of said used capsule 28;
- moving the used capsule 28 by taking it in front of an emptying device 10;

moving the used capsule 28 along a linear capsule emptying path stretch 80 which is parallel to or coincident with the longitudinal axis X-X of said used capsule 28;

moving the opened and emptied used capsule 29 by taking it in front of an opened and emptied capsule collection device 15;

moving the opened and emptied used capsule 29 along a capsule collection path stretch 81.

According to an embodiment, said used capsule moving device or picking and moving device 16 moves said capsule blocking device 44 along a capsule path 77;

said capsule path 77 comprises a linear capsule cutting path stretch 79;

a linear capsule emptying path stretch 80 and a linear capsule collecting path stretch 81.

According to an embodiment, said linear path stretches 79, 80, 81 are connected together by means of a rotary capsule path stretch 78.

According to an embodiment, said linear path stretches 79, 80, 81 take said capsule opening 61 to either said cutting device 25 or said emptying device 10 or said collection device 10.

According to an embodiment, said actuation device 19, e.g. an electric motor, to drive the motion of the used capsule moving device or picking and moving device 16 is operatively connected to said emptying device 10 in order to avoid further actuators.

Figure 91:
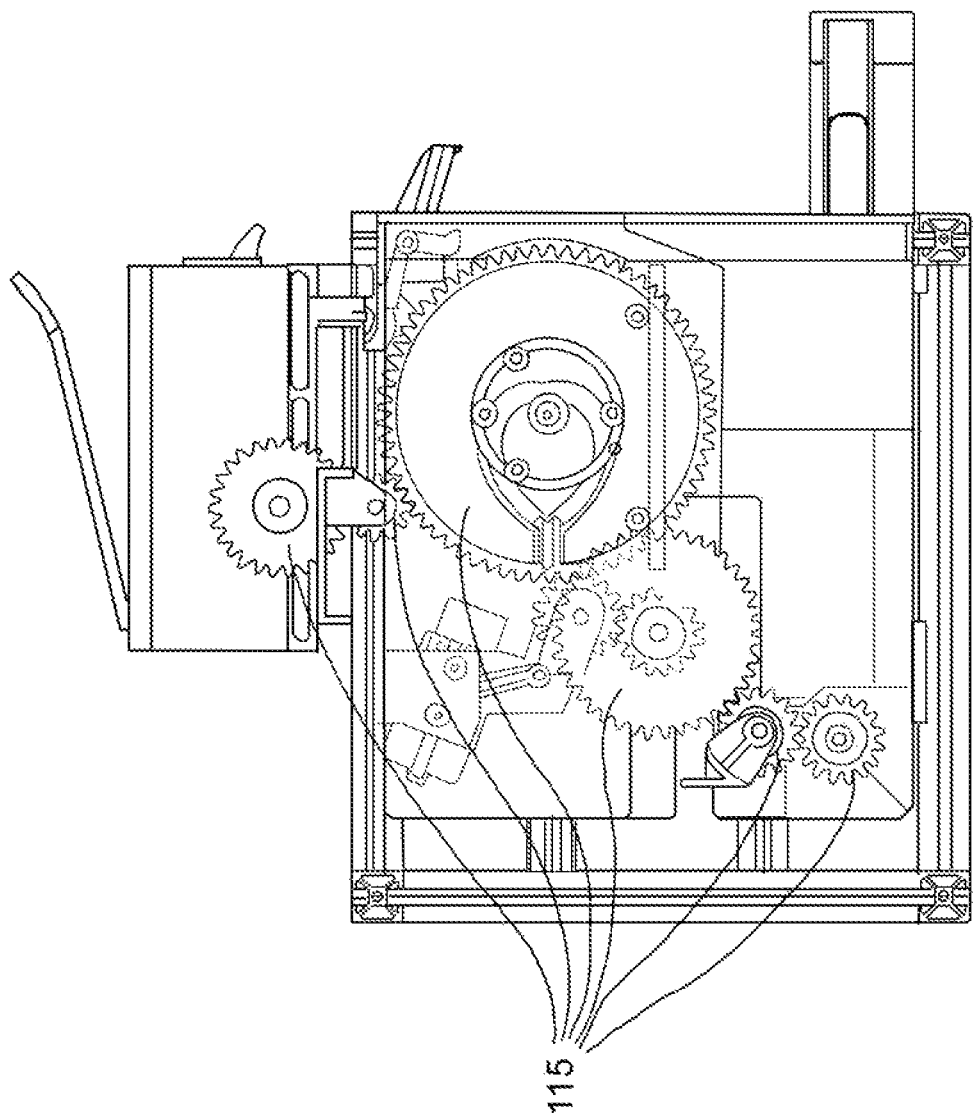
FIG. 91 shows a front view of the detail of the gear cascade which returns the motion from the single motor to the various devices.

For example, FIG. 91 shows a possible gear cascade 115 which, according to the correct ratio, transmits motion from a single motor to the emptying device 10, the used capsule moving device or picking and moving device 16, the used capsule cutting device or used capsule opening device 25, the opened and emptied capsule collection device 15, the device 44 for blocking the capsule to the carriage, and the cut capsule lid folding device 69.

According to an embodiment, a used capsule moving device or picking and moving device 16 comprises:

a first cam element 52 operatively connected to an actuation device 19;

said first cam element 52 comprises a first carriage guide 53 for guiding a carriage 30 along a predetermined used capsule path 77;

said used capsule moving device or picking and moving device 16 further comprises a second cam element 54 connected to a frame support 76 of the used capsule moving device, said frame support 76 being connected to a frame 17;

said second cam element 54 comprises a second carriage guide 55 for guiding said carriage 30 along a predetermined used capsule path 77.

According to an embodiment, said first cam element 52 is connected to a moving device transmission 24 operatively connected to said actuation device 19.

According to an embodiment, said first cam element 52 is connected to a moving device transmission 24 connected to a primary transmission 20 connected to said actuation device 19.

According to an embodiment, said carriage 30 comprises a carriage follower 58 engaged in said first carriage guide 53.

According to an embodiment, said carriage 30 comprises a carriage follower 58 engaged in said second carriage guide 55.

According to an embodiment, said carriage 30 comprises a single carriage follower 58 engaged in both said first carriage guide 53 and said second carriage guide 55 for a roto-translational motion of the carriage 30 and the capsule blocking device 44 supported thereto and of the used capsule 28 blocked in said capsule blocking device 44.

According to an embodiment, said carriage 30 is supported by a first carriage support half-shell 56 and a second carriage support half-shell 57 connected to each other to support said carriage 30.

According to an embodiment, said second carriage support half-shell 57 faces said second cam element 54 or fixed cam.

According to an embodiment, said second carriage support half-shell 57 comprises at least one movable equipment of a capsule moving device position sensor 48 which interfaces with at least one stationary equipment of said capsule moving device position sensor 48 in order to detect the position of said carriage 30.

According to an embodiment, said second carriage support half-shell 57 comprises at least one movable equipment of a capsule moving device position sensor 48 which interfaces with at least one stationary equipment of said capsule moving device position sensor 48 in order to activate the opening of said capsule blocking device 44 supported to said carriage 30.

According to an embodiment, said first carriage guide 53 of said first rotating cam element 52 moves and guides said carriage follower 58 determining the speed and acceleration of the carriage follower 58.

According to an embodiment, said second carriage guide 55 of said second fixed or non-rotating cam element 54 guides said carriage follower 58 determining the trajectory of said carriage follower 58.

According to an embodiment, said second carriage guide 55 comprises at least a second guide linear stretch 66 which forms a used capsule path for cutting the lid.

According to an embodiment, said second carriage guide 55 comprises at least a second guide linear stretch 67 which forms a used capsule path for emptying the capsule.

According to an embodiment, said second carriage guide 55 comprises at least a second guide linear stretch 68 which forms a used capsule path for collecting the emptied capsules.

According to an embodiment, there is provided a machine 1 for extracting a beverage, e.g. coffee, where said machine comprises:

a beverage extraction chamber 3;

a used capsule moving assembly 97 comprising at least one used capsule moving device or picking and moving device 16 according to any one of the above embodiments.

According to an embodiment, there is provided a machine 1 for extracting a beverage, e.g. coffee, where said machine comprises:

a beverage extraction chamber 3;

a used capsule moving assembly 97 comprising at least one used capsule moving device or picking and moving device 16;

a fixed frame 18 fastened to machine 1;

an extractable frame 17 slidingly connected to said fixed frame 18 so as to extract it from said machine 1;

where said used capsule moving assembly 97 is connected to said extractable frame 17.

According to a general embodiment of the invention, a used capsule actuating assembly for opening a capsule is provided.

Said capsule having a body said body having an edge which delimits an opening said body extends about a longitudinal axis said body defines a chamber to accommodate a substance such as for example ground coffee the chamber being closed by a lid fastened to said body.

Said assembly comprises a capsule support.

Said capsule support defining a seat, said seat defining a longitudinal axis for receiving the capsule where, when the capsule is accommodated in the seat, the longitudinal axis of the capsule is coincident with or parallel to said longitudinal axis of the seat.

Said assembly comprises a mechanism for displacing said capsule-holder to place the capsule accommodated therein in front of a cutting station, an emptying station and a collection station in sequence;

said mechanism comprising and actuator to drive the rotation of the mechanism;

said mechanism linearly displaces said capsule support when the capsule support is placed in front of each of the aforesaid stations.

With the features described above and separately or jointly provided, where applicable, in particular embodiments, the aforesaid requirements are met by achieving the aforementioned advantages.

Those skilled in the art can make several changes and adaptations to the embodiments described above, and replace elements with others which are functionally equivalent, in order to meet contingent and specific needs, without however departing from the scope of the following claims.

REFERENCE SYMBOLS 1 machine for extracting a beverage, e.g. coffee
2 opening and closing mechanism
3 extraction chamber
4 beverage dispensing spout
5 empty used capsule collection bowl
6 cup-holding surface
7 liquid collection bowl
8 machine case
9 fluid tank
10 emptying device
11 scraper
12 emptying device movement mechanism
13 extracted and used coffee collection bowl
14 bowl connecting device, for example magnetic
15 opened and emptied capsule collection device
16 used capsule moving device or picking and moving device
17 extractable frame
18 fixed frame
19 actuation device, e.g. electric motor
20 primary transmission
21 emptying device movement mechanism
22 fluid pump
23 heater
24 moving device transmission
25 used capsule cutting device or used capsule opening device
26 used capsule drop guide
27 capsule
28 used capsule
29 opened and emptied used capsule
30 carriage
31 linear cutting carriage accompanying guide
32 knife or cutting blade
33 initial capsule lid lifting pin
34 capsule lid
35 frame sliders
36 coffee collection bowl sliding counter-guide or coffee collection bowl shoes
37 emptying device transmission
38 emptying device clutch, for example magnetic clutch
39 opened and emptied used capsule locking spring
40 emptied capsule collection guide
41 device for blocking the capsule to the collection device
42 blocking device release command
43 opened and emptied capsule collection device filling sensor
44 device for blocking the capsule to the carriage
45 second actuation device, e.g. electric motor, of the emptying device
46 elastic scraper shortening device
47 flexible emptying device elements
48 capsule moving device position sensor
49 first blocking device arm
50 second blocking device arm
51 used capsule seat or locking seat
52 first cam element
53 first carriage guide (rotary and translational motion)—rotating cam
54 second cam element
55 second carriage guide (rotary and translational motion)—fixed cam
56 first carriage support half-shell
57 second carriage support half-shell
58 carriage follower
59 capsule body
60 capsule edge
61 capsule opening
62 capsule chamber
63 used ground coffee
64 knife cutting line
65 locking seat
66 linear second guide stretch which forms a used capsule path for cutting the lid
67 linear second guide stretch which forms a used capsule path for emptying the capsule
68 linear second guide stretch which forms a used capsule path for collecting the emptied capsules
69 cut capsule lid folding device
70 fixed frame guides
71 extractable frame counter-guides or extractable frame shoes
72 opened and emptied capsule collection device counter-guides or capsule collection device shoes
73 used capsule opening assembly
74 used capsule insertion device
75 avoided-cut knife opening
76 frame support of the used capsule moving device or picking and moving device
77 used capsule path
78 rotary capsule path stretch
79 linear capsule cutting path stretch
80 linear capsule emptying path stretch
81 linear capsule collection path stretch
82 initial capsule lid lifting spring
83 pressure emptying device
84 cylinder
85 piston
86 pressurized air 87 seals
88 thrust conduit
89 capsule opening for the insertion of extraction fluid
90 emptying-by-shaking device
91 abutment stop for shaking device
92 emptying-by-centrifugal-action device
93 pin side surface toothing
94 Used capsule emptying assembly
95 Used capsule collecting assembly
96 Used capsule disposal assembly
97 Used capsule moving assembly
101 insertion guides
102 pyramidal body
103 capsule abutment surfaces
104 guide enlargement
105 drop blocking device
106 support piston
107 cut lid lifting finger
108 rocker lever
109 elastically retractable device
110 emptied capsule collection bowl
111 single bowl holder
112 anti-rotation blades
113 capsule ejection device
114 peripheral arms
115 gear cascade
X-X longitudinal capsule body axis

What is claimed is:

1. A used capsule moving assembly, wherein a capsule comprises:
   a capsule body;
   said capsule body comprising a capsule opening;
   said capsule body extending about a longitudinal capsule axis;
   said capsule body defining a capsule chamber adapted to receive a used or extracted or exhausted substance, including used ground coffee; and
   said capsule chamber being initially closed by a lid, or closing film, fixed to said capsule body;
   wherein said used capsule moving assembly comprises:
   a capsule blocking device that leaves the capsule opening accessible;
   a used capsule moving device or picking and moving device;
   said used capsule moving device or picking and moving device supports said capsule blocking device;
   said used capsule moving device or picking and moving device moves the capsule blocking device by taking it in front of a used capsule cutting device, or used capsule opening device, or cutting device, adapted to partially open said lid;
   said used capsule moving device or picking and moving device moves the capsule blocking device by taking it in front of an emptying device, adapted to empty said used or extracted or exhausted substance, including used ground coffee, from the capsule body without breaking or destroying the capsule body;
   said used capsule moving device or picking and moving device moves the capsule blocking device by taking it in front of an opened and emptied capsule collection device, or collection device, adapted to collect the-capsule body from which said used or extracted or exhausted substance, including used ground coffee, has been removed;
   wherein said used capsule moving device or picking and moving device displaces said capsule blocking device along a linear path at least when said capsule blocking device is placed so as to take the capsule body with the longitudinal capsule axis thereof in front of each of said cutting device, emptying device, and collection device; and
   wherein the linear paths are coincident with or parallel to the longitudinal capsule axis.

2. The used capsule moving assembly of claim 1, wherein:
   the used capsule moving device or picking and moving device moves a capsule blocking device along a used capsule path;
   said used capsule path comprises a linear capsule cutting path stretch;
   said used capsule path comprises a linear capsule emptying path stretch;
   said used capsule path comprises a linear capsule collection path stretch;
   said linear capsule path stretches are joined to one another by a rotary capsule path stretch; and
   said linear capsule path stretches take said capsule opening to either said cutting device or said emptying device or said collection device.

3. The used capsule moving assembly of claim 1, wherein:
   an actuation device, including an electric motor is operatively connected to the emptying device to drive motion of the used capsule moving device or picking and moving device, avoiding further separate actuators;
   the used capsule moving device or picking and moving device comprises:
      a first movable cam element operatively connected to the actuation device; and
      said first movable cam element comprises a first carriage guide for guiding a carriage along a predetermined used capsule path;
   said used capsule moving device or picking and moving device comprises a second fixed cam element connected to a frame support of the used capsule moving device or picking and moving device, said frame support being connected to an extractable frame;
   said second fixed cam element comprises a second carriage guide for guiding said carriage along a predetermined used capsule path; and
   said first movable cam element is connected to a moving device transmission operatively connected to the actuation device;
   and/or wherein:
   said first movable cam element is connected to a moving device transmission connected to a primary transmission connected to the actuation device;
   and wherein:
   said carriage comprises a carriage follower engaged in said first carriage guide;
   and/or wherein:
   said carriage comprises a carriage follower engaged in said second carriage guide;
   and/or wherein:
   said carriage comprises a single carriage follower engaged in both said first carriage guide and said second carriage guide for a roto-translational motion of the carriage and the capsule blocking device supported to the carriage and of the used capsule blocked in said capsule blocking device;
   wherein:
   said carriage is supported by a first carriage support half-shell and a second carriage support half-shell connected to each other to support said carriage;

wherein:
said second carriage support half-shell faces said second fixed cam cam element;
wherein:
said second carriage support half-shell comprises at least one movable equipment of a capsule moving device position sensor that interfaces with at least one stationary equipment of said capsule moving device position sensor to detect a position of said carriage;
and/or wherein:
said second carriage support half-shell comprises at least one movable equipment of a capsule moving device position sensor that interfaces with at least one stationary equipment of said capsule moving device position sensor to activate opening of said capsule blocking device supported to said carriage;
wherein:
said first carriage guide of said first movable cam element moves and guides said carriage follower determining speed and acceleration of the carriage follower;
wherein:
said second carriage guide of said second fixed cam element guides said carriage follower determining a trajectory of said carriage follower;
wherein:
said second carriage guide comprises at least one linear second guide stretch that forms a used capsule path for cutting the lid;
wherein:
said second carriage guide comprises at least one linear second guide stretch that forms a used capsule path for emptying the capsule;
and wherein:
said second carriage guide comprises at least one linear second guide stretch that forms a used capsule path for collecting emptied capsules.

4. The used capsule moving assembly of claim 1,
wherein the assembly comprises:
  a capsule emptying assembly for emptying the used or extracted or exhausted substance of a used capsule, wherein:
said capsule emptying assembly comprises an emptying device; and
said emptying device comprises a scraper;
wherein:
said assembly comprises a used capsule blocking device adapted to grasp said used capsule in a predetermined position that defines a locking seat leaving said capsule opening exposed;
said used capsule moving assembly comprises a used capsule moving device; said used capsule moving device comprises a carriage that supports said used capsule blocking device;
and wherein said carriage is operatively connected to move said used capsule blocking device with respect to said emptying device;
and wherein a relative movement occurs along a predetermined path comprising at least one linear path stretch directed along a direction parallel to or coincident with said longitudinal capsule axis,
and wherein along said at least one linear path stretch, a rotation of the used capsule relative to the scraper is avoided;
  and wherein said scraper, at least during said relative movement along said at least one linear path stretch, is adapted to enter in said capsule chamber and remove said used or extracted or exhausted substance, including used ground coffee;
and wherein:
said assembly further comprises:
  a capsule collecting assembly for collection of capsules emptied of the used or extracted or exhausted substance,
  an emptied capsule comprising:
    a capsule body;
    said capsule body comprising a capsule opening;
    said capsule body extending about a longitudinal capsule axis;
    said capsule body defining a capsule chamber adapted to receive the used or extracted or exhausted substance, including used ground coffee;
    said capsule chamber being open, but initially closed by a lid, or closing film, fixed to said capsule body;
wherein:
said capsule collecting assembly comprises an opened and emptied capsule collection device;
said opened and emptied capsule collection device comprises a capsule collection seat delimited by at least one emptied capsule collection guide;
wherein:
said assembly comprises a used capsule blocking device adapted to grasp said emptied capsule in a predetermined position that defines a locking seat leaving said capsule opening exposed;
said assembly comprises a used capsule moving device; said used capsule moving device comprises a carriage that supports said used capsule blocking device;
and wherein said carriage is operatively connected to move said used capsule blocking device with respect to said opened and emptied capsule collection device;
and wherein a relative movement occurs along a predetermined path comprising at least one linear path stretch directed along a direction which is parallel to or coincident with said longitudinal capsule axis, and wherein along said at least one linear path stretch, a rotation of the used capsule with respect to the at least one collection guide is avoided;
and wherein:
said capsule body comprises a capsule edge delimiting a capsule opening;
and wherein a capsule blocking device comprises at least one blocking device arm adapted to engage and grasp said capsule edge to block said used capsule to the carriage of the used capsule moving device or picking and moving device;
and/or wherein:
said capsule body comprises a capsule edge delimiting a capsule opening;
and wherein a capsule blocking device comprises first and second blocking device arms opposite to each other and adapted to engage and grasp said capsule edge to block said used capsule firmly to the carriage of the used capsule moving device or picking and moving device;
and/or wherein:
said assembly comprises a used capsule emptying assembly; wherein
said used capsule emptying assembly comprises a scraper; wherein
said scraper comprises flexible emptying device elements adapted to engage the walls of the capsule body delimiting the capsule chamber for better emptying contents of said used capsule;

wherein:
said scraper comprises a scraper body with spiral-wound teeth;
and/or wherein:
said scraper comprises a scraper body with spiral-wound teeth at least partially made of a flexible and elastic material;
and/or wherein:
said scraper comprises a scraper body with three teeth;
and/or wherein:
said used capsule emptying assembly comprises an emptying device movement mechanism that moves the emptying device and wherein said emptying device movement mechanism takes motion from an actuation device, including an electric motor;
and/or wherein:
said used capsule emptying assembly comprises an emptying device movement mechanism that moves the emptying device and wherein said emptying device movement mechanism takes motion from an actuation device, including a single electric motor, the actuation device moving also the used capsule moving device or picking and moving device;
and/or wherein:
said used capsule emptying assembly comprises an emptying device movement mechanism that moves the emptying device and wherein said emptying device movement mechanism takes the motion from an actuation device connected thereto by an emptying device transmission that connects to said actuation device by emptying device clutch, including a magnetic clutch;
and/or wherein:
said assembly comprises:
an actuation device, including an electric motor, connected to a primary transmission;
said primary transmission is connected to an emptying device movement mechanism that moves the emptying device by an emptying device transmission; and
said primary transmission is connected to a moving device transmission and moves the used capsule moving device or picking and moving device;
and/or wherein:
said used capsule emptying assembly comprises:
an emptying device movement mechanism that moves said used capsule along a used capsule path comprising:
at least one rotary capsule path stretch;
a linear capsule cutting path stretch to take said used capsule in cooperation with a used capsule cutting device;
a linear capsule emptying path stretch to take said used capsule in cooperation with an emptying device; and
a linear capsule collection path stretch to take said used capsule in cooperation with the opened and emptied capsule collection device;
and/or wherein:
said used capsule emptying assembly comprises:
an opened and emptied capsule collection device;
said opened and emptied capsule collection device comprises an emptied capsule blocking device adapted to block the emptied capsules released from the carriage blocking device to the opened and emptied capsule collection device;
said opened and emptied capsule collection device comprises at least one emptied capsule collection guide that guides the emptied capsule into a seat adapted to stack a plurality of emptied capsules by inserting each emptied capsule into the capsule chamber of an adjacent one;
and wherein:
said opened and emptied capsule collection device comprises at least one opened and emptied used capsule locking spring adapted to block said emptied capsule or to block the plurality of emptied capsules;
and wherein:
said opened and emptied capsule collection device comprises a blocking device release command adapted to act on said opened and emptied used capsule locking spring to disengage it from the emptied capsules and release the emptied capsules for emptying and cleaning the opened and emptied capsule collection device;
and wherein:
said opened and emptied capsule collection device comprises an opened and emptied capsule collection device filling sensor adapted to indicate filling of the opened and emptied capsule collection device and the need to extract it from a machine and empty it;
and wherein:
said opened and emptied capsule collection device is at least partially accommodated in an empty used capsule collection bowl for collecting any liquid still present in the empty capsule and the emptied capsules themselves.

5. A machine for extracting a beverage, including coffee, wherein
said machine comprises:
a beverage extraction chamber;
a used capsule moving assembly, wherein a capsule comprises a capsule body, said capsule body comprising a capsule opening, said capsule body extending about a longitudinal capsule axis, said capsule body defining a capsule chamber adapted to receive a used or extracted or exhausted substance, including used ground coffee, said capsule chamber being initially closed by a lid, or closing film, fixed to said capsule body, the used capsule moving assembly comprising a capsule blocking device that leaves the capsule opening accessible, and at least one used capsule moving device or picking and moving device that supports and moves the capsule blocking device by taking it in front of a used capsule cutting device, or used capsule opening device, or cutting device, adapted to partially open said lid, in front of an emptying device, adapted to empty said used or extracted or exhausted substance, including used ground coffee, from the capsule body without breaking or destroying the capsule body, and in front of an opened and emptied capsule collection device, or collection device, adapted to collect the capsule body from which said used or extracted or exhausted substance, including used ground coffee, has been emptied;
wherein
said used capsule moving device displaces said capsule blocking device along a linear path at least when said capsule blocking device is placed so as to take the capsule body with the longitudinal capsule axis in front of each of said cutting device, emptying device, and collection device;
and wherein
linear paths are coincident with or parallel to the longitudinal capsule axis.

6. The machine of claim 5, wherein
said machine further comprises:
- a beverage extraction chamber;
- a used capsule moving assembly comprising at least one used capsule moving device or picking and moving device;
- a fixed frame fastened to the machine;
- an extractable frame slidingly connected to said fixed frame to extract it from said machine;

wherein
- said used capsule moving assembly is connected to said extractable frame.

7. A method for moving a used capsule;
said used capsule comprising:
- a capsule body;
- said capsule body comprising a capsule opening;
- said capsule body extending about a longitudinal capsule axis;
- said capsule body defining a capsule chamber receiving a used or extracted or exhausted substance, including used ground coffee;
- said capsule chamber being initially closed by a lid, or closing film, fixed to said capsule body;

wherein said method comprises:
- taking the used capsule into a capsule blocking device;
- moving the used capsule by taking it in front of a used capsule cutting device or used capsule opening device;
- moving the used capsule along a linear capsule cutting path stretch parallel to or coincident with the longitudinal capsule axis (X-X);
- moving the used capsule by taking it in front of an emptying device;
- moving the used capsule) along a linear capsule emptying path stretch parallel to or coincident with the longitudinal capsule axis (X-X);
- moving an opened and emptied used capsule by taking it in front of an opened and emptied capsule collection device; and
- moving the opened and emptied used capsule along a linear capsule collection path stretch.

* * * * *

UNITED STATES PATENT AND TRADEMARK OFFICE
CERTIFICATE OF CORRECTION

| | | |
|---|---|---|
| PATENT NO. | : 11,759,046 B2 | Page 1 of 1 |
| APPLICATION NO. | : 16/982227 | |
| DATED | : September 19, 2023 | |
| INVENTOR(S) | : Benedetti et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this
Twentieth Day of May, 2025

Coke Morgan Stewart
*Acting Director of the United States Patent and Trademark Office*